United States Patent
Neilson et al.

(10) Patent No.: US 12,545,751 B2
(45) Date of Patent: *Feb. 10, 2026

(54) ATTENUATED POST-METALLOCENE CATALYSTS

(71) Applicant: Dow Global Technologies LLC, Midland, MI (US)

(72) Inventors: Bethany M. Neilson, Manvel, TX (US); Roger L. Kuhlman, Lake Jackson, TX (US); Rhett A. Baillie, Pearland, TX (US); John F. Szul, Hurricane, WV (US)

(73) Assignee: Dow Global Technologies LLC, Midland, MI (US)

( * ) Notice: Subject to any disclaimer, the term of this patent is extended or adjusted under 35 U.S.C. 154(b) by 564 days.

This patent is subject to a terminal disclaimer.

(21) Appl. No.: 17/995,864

(22) PCT Filed: May 26, 2021

(86) PCT No.: PCT/US2021/034139
§ 371 (c)(1),
(2) Date: Oct. 10, 2022

(87) PCT Pub. No.: WO2021/242800
PCT Pub. Date: Dec. 2, 2021

(65) Prior Publication Data
US 2023/0151126 A1 May 18, 2023

Related U.S. Application Data

(60) Provisional application No. 63/031,638, filed on May 29, 2020.

(51) Int. Cl.
| | | |
|---|---|---|
| *C08F 4/659* | (2006.01) | |
| *C08F 4/611* | (2006.01) | |
| *C08F 4/76* | (2006.01) | |

(52) U.S. Cl.
CPC .......... *C08F 4/659* (2013.01); *C08F 4/65912* (2013.01); *C08F 4/611* (2013.01); *C08F 4/76* (2013.01)

(58) Field of Classification Search
None
See application file for complete search history.

(56) References Cited

U.S. PATENT DOCUMENTS

| | | |
|---|---|---|
| 3,709,853 A | 1/1973 | Karapinka |
| 4,003,712 A | 1/1977 | Miller |
| 4,011,382 A | 3/1977 | Levine et al. |
| 4,302,566 A | 11/1981 | Karol et al. |
| 4,453,399 A | 6/1984 | Thompson |
| 4,543,399 A | 9/1985 | Jenkins, III et al. |
| 4,588,790 A | 5/1986 | Jenkins, III et al. |
| 4,665,208 A | 5/1987 | Welborn, Jr. et al. |
| 4,874,734 A | 10/1989 | Kioka et al. |
| 4,882,400 A | 11/1989 | Dumain et al. |
| 4,908,463 A | 3/1990 | Bottelberghe |
| 4,924,018 A | 5/1990 | Bottelberghe |
| 4,952,540 A | 8/1990 | Kioka et al. |
| 4,968,827 A | 11/1990 | Davis |
| 4,988,783 A | 1/1991 | Beran et al. |
| 4,994,534 A | 2/1991 | Rhee et al. |
| 5,091,352 A | 2/1992 | Kioka et al. |
| 5,103,031 A | 4/1992 | Smith, Jr. |
| 5,157,137 A | 10/1992 | Sangokoya |
| 5,204,419 A | 4/1993 | Tsutsui et al. |

(Continued)

FOREIGN PATENT DOCUMENTS

| | | |
|---|---|---|
| CA | 3117995 | 5/2020 |
| EP | 0188914 | 7/1986 |

(Continued)

OTHER PUBLICATIONS

Uozumi, T. et al., "Isospecific Propylene Polymerization Using the [ArN(CH2)3NAr]TiCl2/Al(iBu)3/Ph3CB(C6F5)4 Catalyst System in the Presence of Cyclohexene". Macromolecular Chemistry and Physics 2001, 202(17), 3279-3283 . (Year: 2001).*

(Continued)

*Primary Examiner* — Richard A. Huhn

(57) ABSTRACT

A method of making an attenuated-light-off post-metallocene catalyst ("attenuated post-metallocene catalyst" or "attenuated P-M catalyst"), the method comprising combining a faster-light-off catalyst with an effective amount of a kinetics modifier compound of formula (A1), (B1), or (C1): $R^5$—C≡C—$R^6$ (A1), $(R^5)_2$C=C=C($R^6$)$_2$ (B1), or $(R^5)(R^7)$C=C($R^6$)($R^7$) (C1) as defined herein under effective reaction conditions to give an attenuated post-metallocene catalyst that exhibits an attenuated light-off kinetics profile (relative to that of the faster-light-off catalyst); wherein the faster-light-off catalyst has been made by activating a post-metallocene precatalyst (i.e., an unactivated "coordination entity" or "ligand-metal complex") of structural formula (I): $(D)_d M(T)_t (Q)_q (X)_x$ (I) as defined herein; and related methods, compositions and uses.

14 Claims, No Drawings

(56) References Cited

U.S. PATENT DOCUMENTS

| | | |
|---|---|---|
| 5,206,199 A | 4/1993 | Kioka et al. |
| 5,235,081 A | 8/1993 | Sangokoya |
| 5,248,801 A | 9/1993 | Sangokoya |
| 5,308,815 A | 5/1994 | Sangokoya |
| 5,329,032 A | 7/1994 | Tran et al. |
| 5,352,749 A | 10/1994 | DeChellis et al. |
| 5,391,529 A | 2/1995 | Sangokoya |
| 5,391,793 A | 2/1995 | Marks et al. |
| 5,462,999 A | 10/1995 | Griffin et al. |
| 5,541,270 A | 7/1996 | Chinh et al. |
| 5,624,878 A | 4/1997 | Devore et al. |
| 5,627,242 A | 5/1997 | Jacobsen et al. |
| 5,648,310 A | 7/1997 | Wasserman et al. |
| 5,665,818 A | 9/1997 | Tilston et al. |
| 5,677,375 A | 10/1997 | Rifi et al. |
| 5,688,880 A | 11/1997 | Spencer et al. |
| 5,693,838 A | 12/1997 | Sangokoya et al. |
| 5,919,983 A | 7/1999 | Rosen et al. |
| 5,965,477 A | 10/1999 | Sivaram et al. |
| 5,965,677 A | 10/1999 | Stephan et al. |
| 5,972,510 A | 10/1999 | O'Hare et al. |
| 6,034,187 A | 3/2000 | Maehama et al. |
| 6,083,339 A | 7/2000 | Peters et al. |
| 6,489,408 B2 | 12/2002 | Mawson et al. |
| 6,803,339 B2 | 10/2004 | Hall et al. |
| 6,967,184 B2 | 11/2005 | Wenzel et al. |
| 6,995,219 B2 | 2/2006 | Borealis |
| 7,705,157 B2 | 4/2010 | Leclerc et al. |
| 7,873,112 B2 | 1/2011 | Nakamura |
| 8,291,115 B2 | 10/2012 | Bitterlich |
| 8,455,601 B2 | 6/2013 | Kolb et al. |
| 8,609,794 B2 | 12/2013 | Klosin et al. |
| 8,835,577 B2 | 9/2014 | Rix et al. |
| 9,000,108 B2 | 4/2015 | Klosin et al. |
| 9,029,487 B2 | 5/2015 | Klosin et al. |
| 9,234,060 B2 | 1/2016 | Kao et al. |
| 9,718,900 B2 | 8/2017 | Giesbrecht |
| 10,150,825 B2 | 12/2018 | Nishida et al. |
| 10,494,455 B2 | 12/2019 | Banat et al. |
| 2003/0104927 A1* | 6/2003 | Hall .................. C08F 10/00 502/118 |
| 2009/0111956 A1 | 4/2009 | Boone et al. |
| 2009/0306323 A1 | 12/2009 | Kolb et al. |
| 2013/0104927 A1 | 5/2013 | Hurst |
| 2013/0345373 A1* | 12/2013 | McDaniel .............. C08F 2/40 252/182.28 |
| 2017/0081444 A1 | 3/2017 | Wang et al. |
| 2017/0101494 A1 | 4/2017 | Fontaine et al. |
| 2017/0137550 A1 | 5/2017 | Ewart et al. |
| 2018/0002464 A1 | 1/2018 | Fontaine et al. |
| 2018/0079836 A1 | 3/2018 | Locklear et al. |
| 2018/0282452 A1 | 10/2018 | Fontaine et al. |
| 2018/0298128 A1 | 10/2018 | Harlan et al. |
| 2020/0131283 A1 | 4/2020 | Young et al. |

FOREIGN PATENT DOCUMENTS

| | | | |
|---|---|---|---|
| EP | 0279586 | 8/1988 | |
| EP | 0511665 | 11/1992 | |
| EP | 0561476 | 9/1993 | |
| EP | 0594218 | 4/1994 | |
| EP | 0649992 | 4/1995 | |
| EP | 0748823 | 12/1996 | |
| EP | 0767184 | 4/1997 | |
| EP | 0794200 | 9/1997 | |
| EP | 0634421 | 10/1997 | |
| EP | 0802202 | 10/1997 | |
| EP | 0802203 | 10/1997 | |
| EP | 810233 | 5/1998 | |
| EP | 2121776 | 11/2011 | |
| EP | 1778738 | 5/2014 | |
| EP | 2609123 | 12/2017 | |
| WO | 199410180 | 5/1994 | |
| WO | 199947598 | 9/1999 | |
| WO | 199948605 | 9/1999 | |
| WO | 199950311 | 10/1999 | |
| WO | 199960033 | 11/1999 | |
| WO | 2006066126 | 6/2006 | |
| WO | 2009064404 | 5/2009 | |
| WO | 2009064452 | 5/2009 | |
| WO | 2009064482 | 5/2009 | |
| WO | 2011087520 | 7/2011 | |
| WO | 2012027448 | 3/2012 | |
| WO | 2013070601 | 5/2013 | |
| WO | 2014105411 | 7/2014 | |
| WO | 2016172097 | 10/2016 | |
| WO | 2017058858 | 4/2017 | |
| WO | 2017058981 | 4/2017 | |
| WO | 2018022975 | 2/2018 | |
| WO | 2018183056 | 10/2018 | |
| WO | 2020055893 | 3/2020 | |
| WO | WO-2020096734 A1 * | 5/2020 | ............... C07F 7/00 |

OTHER PUBLICATIONS

Cabosil TS-610, 2018, p. 1-11.
Diamond, "High-Throughput Discovery and Optmization of Hafnium Heteroaryl-amido Catalysts for the Isospeciic Polymerization of Propylene" 2011, vol. 1, No. 8, p. 887-900.
Fontaine, "Hafnium Amidoquinoline Complexes: Highly Active Olefin Polymerization Catalysts with Ultrahigh Molecular Weight Capacity" 2012, vol. 31, No. 17, p. 6244-6251.
Kuhlman, "Tuning Block Compositions of Polyethylene Multi-Black Copolymers by Catalyst Selection" 2010, vol. 43, p. 7903-7904.
Uozumi, "Isospecific Propylene Polymerization using the Catalyst System in the Presence of Cyclohexene" 2001, vol. 202, No. 17, p. 3279-3283.
PCT/US2021/034139, Search Report and Written Opinion with a mailing date of Sep. 21, 2021.
PCT/US2021/034139, International Preliminary Report on Patentability with a mailing date of Nov. 17, 2022.

* cited by examiner

ATTENUATED POST-METALLOCENE CATALYSTS

Olefin polymerization catalysts, methods, and polyolefins made thereby.

INTRODUCTION

Publications and patents in the field include EP 0 188 914 A2; EP 0 748 823 A1; EP 1 778 738 A1; EP 2 121 776 A1; EP 2 609 123 A1; U.S. Pat. Nos. 5,624,878; 5,965,677; 6,083,339 B2; U.S. Pat. No. 6,967,184 B2; U.S. Pat. No. 7,705,157 B2; U.S. Pat. No. 8,455,601 B2; U.S. Pat. No. 8,609,794 B2; U.S. Pat. No. 8,835,577 B2; U.S. Pat. No. 9,000,108 B2; U.S. Pat. No. 9,029,487 B2; U.S. Pat. No. 9,234,060 B2; U.S. Pat. No. 9,718,900 B2; US 2009/0306323 A1; US 2017/0081444 A1; US 2017/0101494 A1; US 2017/0137550 A1; US 2018/0002464 A1; US 2018/0282452 A1; US 2018/0298128 A1; WO 2006/066126 A2; WO 2009/064404 A2; WO 2009/064452 A2; WO 2009/064482 A1; WO 2011/087520 A1; WO 2012/027448; WO 2013/070601 A2; WO 2014/105411 A1; WO 2016/172097 A1; WO 2017/058858; WO 2017/058981 A1; WO 2018/022975 A1; WO 2020/055893 A1; and WO 2018/183026 A1.

Among others, U.S. Pat. No. 8,609,794 B2; U.S. Pat. No. 9,000,108 B2; U.S. Pat. No. 9,029,487 B2; US 2017/0081444 A1; US 2017/0101494 A1; US 2017/0137550 A1; US 2018/0002464 A1; US 2018/0282452 A1; WO 2017/058858; and WO 2018/022975 A1 are assigned to Dow Global Technologies LLC, a subsidiary of The Dow Chemical Company, and describe biphenylphenoxy-type (BPP-type) precatalysts and catalysts, their syntheses, and their use in olefin polymerization reactions.

U.S. Pat. No. 6,967,184 B2 is issued to Timothy T. Wenzel ("Wenzel") and U.S. Pat. No. 9,718,900 B2 is issued to Garth R. Giesbrecht ("Giesbrecht"), both assigned to Univation Technologies, LLC, a wholly-owned subsidiary of The Dow Chemical Company, Midland, Michigan, USA. Wenzel and Giesbrecht describe HN5-type precatalysts and catalysts, their syntheses, and their use in gas-phase olefin polymerization reactions.

U.S. Pat. No. 6,803,339 B2 is issued to Richard A. Hall, et al. ("Hall") and is listed as being assigned to BP Corporation North America Inc. Hall notes a problem that metallocene catalysts have when fed in an olefin monomer stream into a polymerization reactor. "Metallocene catalysts are difficult to employ directly in conventional polymerization processes, and particularly in gas phase processes where the catalyst system will be dispersed in a hydrocarbon or in monomer and metered into the reactor through feed lines. Supported metallocene catalysts are optimally active when preactivated, i.e. combined with the cocatalyst component prior to being introduced into the reactor. Dispersing such catalysts in the olefin monomer stream for direct feed to the reactor system results in polymer formation and causes severe plugging of the feedlines. Moreover, polymerization proceeds before the catalyst system is dispersed fully and uniformly through the polymer bed in the reactor, resulting in highly active hot spots that promote the formation of lumps and plating out. The reactor rapidly becomes fouled, reducing catalyst yields and requiring frequent shutdowns to clean the reactor." (Column 2, lines 50 to 65; emphasis added.)

Hall elaborates on solutions that others tried before. "Temporarily reducing the activity of metallocene catalysts has been described in the art. For example, adding a dialkyborane or dialkylaluminum to the reactor during a polymerization to temporarily retard the activity of metallocene catalysts has been disclosed as a method for process control. However, catalyst activity is only partially retarded by such treatment. Catalysts directly treated with a dialkyborane or dialkylaluminum retain sufficient activity to initiate polymerization when dispersed in the monomer feed stream. Moreover, the recovery period is very brief, too brief to allow the catalyst system to be adequately dispersed in a stirred reactor gas phase reactor bed before the catalyst recovers and polymerization proceeds." (Column 3, lines 14 to 26; emphasis added.)

Hall sought a method for temporarily and reversibly passivating metallocene catalysts whereby catalyst activity becomes reduced to a level that will allow feeding the catalyst to the reactor in contact with olefin monomer and adequately dispersing the catalyst in the reactor polymer bed prior to reactivating (column 3, lines 49 to 55). That is, Hall sought a method that would allow feeding a temporarily substantially inactivated metallocene catalyst in an olefin monomer stream into a polymerization reactor.

Hall's solution relates to a metallocene catalyst that may be temporarily and reversibly passivated by contact with an effective amount of an unsaturated hydrocarbon passivating compound (Abstract). Hall's solution also relates to a method of temporarily and reversibly passivating metallocene catalysts wherein fully active metallocene catalysts may be temporarily and reversibly passivated by contacting with an effective amount of a passivating compound (column 3, lines 58 to 62). The temporarily and reversibly passivated metallocene catalysts are further characterized as latent olefin polymerization catalysts and will have substantially reduced activity for polymerization of olefins (column 3, lines 63 to 66).

Thus, Hall sought to temporarily substantially inactivate (poison) the metallocene catalyst so that the resulting temporarily substantially inactivated metallocene catalyst could be fed in an olefin monomer stream into the reactor, and yet the temporarily substantially inactivated metallocene catalyst would not polymerize the olefin monomer in the feed stream or plug the feed line. This would give Hall time to disperse the temporarily substantially inactivated metallocene catalyst in a polymer bed in the reactor, and therein the temporarily substantially inactivated metallocene catalyst would be reversibly reactivated. Thus, Hall's metallocene catalyst is either fully active or substantially inactivated and the substantially inactivated metallocene catalyst is fed into a reactor in the presence of olefin monomer in an olefin monomer feed stream.

SUMMARY

We discovered a problem with separately feeding (i.e., away from monomer and polyolefin polymer particles) post-metallocene catalysts (i.e., catalysts that do not have a cyclopentadienyl-containing ligand) into gas-phase olefin polymerization reactors. Olefin polymerizations are exothermic reactions that may be carried out in solution phase, slurry phase, or gas phase. The nature of a gas-phase polymerization reaction is such that it has least mass for absorbing heat of reaction exotherms. We discovered that even when an active post-metallocene catalyst is fed separately from olefin monomer feed(s) (and, for that matter, separately from active polyolefin polymer particles) into a gas-phase polymerization reactor containing an olefin monomer and a moving bed of polyolefin polymer, such as when the active post-metallocene catalyst is fed as a solution or slurry in an inert hydrocarbon solvent (e.g., alkanes or xylenes) into the reactor, once it is inside the reactor and experiencing the polymerization conditions (e.g., high temperature and pressure) the active post-metallocene catalyst may light-off too fast in the gas-phase polymerization reactor. That is, upon feeding (e.g., injection) of the post-metallocene catalyst, and before the "faster-light-off" catalyst can be fully dispersed into the moving resin bed, the catalyst starts making polymer particles in the reactor near the catalyst injection site. This locally generates heat faster than it can be absorbed, causing the polymer particles to fuse together, forming agglomerates. These agglomerates foul reactor components and/or spoil the properties of the polyolefin product.

Also, the faster-light-off post-metallocene catalyst, when paired with metallocene catalyst, which is slower to light-off, may create a reactivity-mismatched multimodal (e.g., bimodal or trimodal) catalyst system in the reactor. This makes polyolefin polymer particles that undesirably vary in flow index and/or density according to particle size.

These problems did not surface with metallocene catalysts, which are catalysts that contain two cyclopentadienyl groups (independently unsubstituted or substituted). Metallocene catalysts are relatively slow to light-off in the above situations.

Our technical solution to the problems arising from the "faster-light-off" post-metallocene catalyst employs an effective amount of a kinetics modifier compound to alter the molecular structure of the post-metallocene catalyst in such a way that the resulting structurally-modified post-metallocene catalyst has a new molecular structure and remains active, but exhibits a characteristic attenuated light-off kinetics profile ("attenuated-light-off post-metallocene catalyst", or more simply "attenuated post-metallocene catalyst") when fed separately from olefin monomer feed(s) into a gas-phase polymerization reactor. For example, the attenuated kinetics profile may comprise the length of time to peak reaction temperature ($Temp_{peak}$) for the attenuated post-metallocene catalyst is longer and/or the value of $Temp_{peak}$ is lower relative to that of the faster-light-off catalyst from which it was made. The length of the delay is long enough to decrease or prevent agglomerates formation, which in turn delays or prevents fouling of reactor components and/or minimizes spoiling of the properties of the polyolefin product being made thereby. Despite delaying on-set, all other things being equal, many embodiments of the attenuated post-metallocene catalyst exhibit a catalytic activity/polymerization productivity, expressed as number of grams dried polyolefin product made per gram of catalyst added to reactor-hour (gPE/gcat-hr), that is not significantly less than, and in some embodiments may be more than, that of the faster-light-off non-metallocene catalyst. This result is unpredictable from the art.

A method of making an attenuated-light-off post-metallocene catalyst ("attenuated post-metallocene catalyst" or "attenuated P-M catalyst"), the method comprising combining a faster-light-off catalyst with an effective amount of a kinetics modifier compound of formula ($A^1$), ($B^1$), or ($C^1$): $R^5$—C≡C—$R^6$ ($A^1$), $(R^5)_2$C=C=C$(R^6)_2$($B^1$), or $(R^5)(R^7)$C=C$(R^6)(R^7)$ ($C^1$) as defined herein under effective reaction conditions to give an attenuated post-metallocene catalyst that exhibits an attenuated light-off kinetics profile (relative to that of the faster-light-off catalyst); wherein the faster-light-off catalyst has been made by activating a post-metallocene precatalyst (i.e., an unactivated "coordination entity" or "ligand-metal complex") of structural formula (I): $(D)_dM(T)_t(Q)_q(X)_x$ (I) as defined herein.

An attenuated post-metallocene catalyst made by the method of making.

A method of feeding a post-metallocene catalyst to a gas-phase polymerization reactor containing an olefin monomer and a moving bed of polyolefin polymer, the method comprising making the attenuated post-metallocene catalyst according to the above method, and feeding the attenuated post-metallocene catalyst in neat form (e.g., dry powder) or as a solution or slurry thereof in an inert hydrocarbon liquid through a feed line free of olefin monomer into the gas-phase polymerization reactor.

A multimodal (e.g., bimodal or trimodal) catalyst system comprising the attenuated post-metallocene catalyst and one or more different olefin polymerization catalyst(s).

A method of feeding a multimodal (e.g., bimodal or trimodal) catalyst system to a gas-phase polymerization reactor containing an olefin monomer and a moving bed of polyolefin polymer, the method comprising making the attenuated post-metallocene catalyst according to the above method, contacting a solution of the attenuated post-metallocene catalyst and an activated metallocene catalyst in an inert hydrocarbon solvent with a support material (e.g., fumed silica) so as to make a slurry of a multimodal (e.g., bimodal or trimodal) catalyst system consisting essentially of the attenuated post-metallocene catalyst and the activated metallocene catalyst co-supported on the same support material and suspended in the inert hydrocarbon solvent; optionally removing the inert hydrocarbon solvent from the slurry to make the multimodal catalyst system in neat (dry powder) form; and feeding the slurry of the multimodal catalyst system or the neat form of the multimodal catalyst system through a feed line free of olefin monomer into the gas-phase polymerization reactor.

A method of making a polyolefin polymer, the method comprising contacting at least one 1-alkene monomer with the attenuated post-metallocene catalyst or the multimodal (e.g., bimodal or trimodal) catalyst system under gas-phase polymerization conditions in a gas-phase polymerization reactor containing a moving bed of polyolefin resin, thereby making the polyolefin polymer.

A polyolefin polymer made by the method of making same.

A manufactured article made from the polyolefin polymer.

DETAILED DESCRIPTION

The entire contents of the SUMMARY section are incorporated here by reference. Additional embodiments follow; some are numbered for easy reference.

Aspect 1. A method of making an attenuated post-metallocene catalyst ("attenuated-light-off post-metallocene catalyst"), the method comprising combining a faster-light-off catalyst with an effective amount of a kinetics modifier compound ("KMC") of formula ($A^1$), ($B^1$), or ($C^1$): $R^5$—C≡C—$R^6$ ($A^1$), $(R^5)_2$C=C=C$(R^6)_2$($B^1$), or $(R^5)(R^7)$C=C$(R^6)(R^7)$ ($C^1$) under effective reaction conditions to give an attenuated-light-off post-metallocene catalyst that exhibits an attenuated light-off kinetics profile (relative to that of the faster-light-off catalyst); wherein the faster-light-off catalyst has been made by activating a post-metallocene precatalyst of structural formula (I): $(D)_dM(T)_t(Q)_q(X)_x$ (I); wherein in formula ($A^1$), ($B^1$), or ($C^1$) each of $R^5$ and $R^6$ independently is H or $R^7$; and each $R^7$ independently is a ($C_1$-$C_{20}$)hydrocarbyl, —C(=O)—O-(unsubstituted $C_1$-$C_{20}$) hydrocarbyl), a ($C_1$-$C_{19}$)heterohydrocarbyl, or a tri(($C_1$-$C_{20}$) hydrocarbyl)silyl, or two $R^7$ are taken together to form a ($C_3$-$C_6$)alkylene; with the proviso that each $R^7$ lacks a carbon-carbon double bond; wherein each $(C_1-C_{20})$hydrocarbyl independently is unsubstituted or substituted with from 1 to 4 substituent groups $R^S$; wherein each substituent group $R^S$ is independently selected from halogen (e.g., F), unsubstituted $(C_1-C_5)$alkyl (e.g., $CH_3$), —C≡CH, —OH, $(C_1-C_5)$alkoxy, —C(=O)-(unsubstituted $(C^1-C_5)$alkyl), —NH$_2$, —N(H)(unsubstituted $(C^1-C_5)$alkyl), —N(unsubstituted $(C_1-C_5)$alkyl)$_2$, —COOH, —C(=O)—NH$_2$, —C(=O)—N(H)(unsubstituted $(C_1-C_5)$alkyl), —C(=O)—N(unsubstituted $(C_1-C_5)$alkyl)$_2$, —S-(unsubstituted $(C_1-C_5$ alkyl), —S(=O)$_2$-(unsubstituted $(C_1-C_5)$alkyl), —S(=O)$_2$—NH$_2$, —S(=O)$_2$—N(H)(unsubstituted $(C_1-C_5)$alkyl), —S(=O)$_2$—N(unsubstituted $(C_1-C_5)$alkyl)$_2$, —C(=)S-(unsubstituted $(C_1-C_5)$alkyl) and —COO(unsubstituted $(C_1-C_5)$alkyl); and wherein in formula (I): metal M is Ti, Hf, or Zr; subscript d is 0, 1, or 2; subscript t is 0 or 1; subscript q is 0 or 1; subscript x is 1, 2, or 3; each ligand D independently is the didentate organoheteryl or the didentate organoheterylene; ligand T is the tridentate organoheterylene; and ligand Q is the tetradentate organoheterylene; each X is a monodentate group independently selected from a halogen atom, $((C^1-C^{20})$alkyl$)_{3-g}$-(phenyl)$_g$Si— wherein subscript g is 0, 1, 2, or 3; $CH_3$, a $(C_2-C_{20})$alkyl-$CH_2$, a $(C_6-C_{12})$aryl-$((C_0-C_{10})$alkylene$)$-$CH_2$ (e.g., benzyl when $(C_6-C_{12})$aryl is phenyl and $(C_0-C_{10})$alkylene is $(C_0)$alkylene), a $(C_1-C_6)$alkyl-substituted $(C_6-C_{12})$aryl, a $(C_1-C_6)$alkoxy-substituted $(C_6-C_{12})$aryl, a $(C_1-C_6)$alkoxy-substituted benzyl, and a $(C_1-C_6)$alkyl-substituted benzyl; or one X is a 4-$(C_1-C_{20})$alkyl-substituted 1,3-butadiene molecule and each of the remaining X, if any, independently is the monodentate group X. Each monodentate group X may provide to M a denticity, K, of 1 and wherein at least one group X functions as a leaving group during the activating step and, optionally, at least one group X functions as a leaving group during the combining step. In some embodiments at least one X does not leave but remains coordinated to M). The X is a 4-$(C_1-C_{20})$alkyl-substituted 1,3-butadiene molecule may provide to M a hapticity, η, of 2 or 4 (eta$^2$ ("η$^2$") or eta$^4$ ("η$^4$")) and each of the remaining X, if any, independently is the monodentate group X. Subscripts d, t, q, and x are chosen in such a way that ligands D, T, Q, and monodentate group X provide to M a total denticity, $K_{tot}$, of 5 or 6 ("$K_{tot}^5$" or "$K_{tot}^6$") such that M has a total coordination number, $n_{tot}$, of 5 or 6. In some aspects each $R^7$ independently is a $(C_1-C_{20})$hydrocarbyl, which independently may be unsubstituted or substituted with from 1 to 3 substituent groups selected from halogen (e.g., F) and alkyl (e.g., $CH_3$) with the proviso that each $R^7$ lacks a carbon-carbon double bond. To remove all doubt, monodentate group X does not contain a carbon-carbon double bond or a carbon-carbon triple bond, i.e., monodentate group X is not an alkenyl or alkynyl group.

Aspect 2. The method of aspect 1 wherein the faster-light-off catalyst is of formula (II): $(D)_d[M^+](T)_t(Q)_q(X)_{x-1}$ A$^-$ (II), wherein subscripts d, t, q, and x; metal M; and ligands D, T, Q, and X are as defined for formula (I); and wherein the attenuated post-metallocene catalyst is of formula (III): $(D)_d[M^+](T)_t(Q)_q(X)_{x-2}(R)$ A$^-$ (III); wherein subscripts d, t, q, and x; metal M; and ligands D, T, and Q are as defined for formula (I); each X is the monodentate group as defined for formula (I); wherein A$^-$ is an anion (used to formally balance the positive charge of metal M); and wherein R is a ligand of formula (A), (B), or (C): —C($R^5$)=C(X)$R^6$ (A), —C($R^5$)$_2$—C(X)=C($R^6$)$_2$(B), or —C($R^5$)($R^7$)—C(X)($R^6$)($R^7$) (C), respectively; and wherein $R^5$ to $R^7$ are as defined previously for formula (A$^1$), (B$^1$), or (C$^1$) respectively. To remove all doubt, ligand R of formula (A), (B), or (C) is obtained or derived from the kinetics modifier compound of formula (A$^1$), (B$^1$), or (C$^1$), respectively. To remove all doubt, each ligand R of formulas (A) and (B) contains a carbon-carbon double bond (i.e., an alkenyl group). To remove all doubt, the ligand R is not the same structure as that leaving group X, i.e., the definition of ligand R does not overlap the definition of leaving group X.

Aspect 3. The method of aspect 1 or 2 wherein the post-metallocene precatalyst is of formula (Ia): $(D)_dM(X)_x$ (Ia), wherein metal M is Ti, Hf, or Zr; subscript d is 1 or 2; subscript x is 2 or 3; each ligand D independently is the didentate organoheteryl or the didentate organoheterylene; each X is as defined for formula (I). Subscripts d and x are chosen in such a way that ligand D and monodentate group X provide to M a total denticity, $K_{tot}$, of 5 or 6 ("$K_{tot}^5$" or "$K_{tot}^6$") such that M has a total coordination number, $n_{tot}$, of 5 or 6. Without being bound by theory it is believed that the structure of the faster-light-off catalyst made from the post-metallocene precatalyst of formula (Ia) is of formula (IIa): $(D)_d[M^+](X)_{x-1}$ A$^-$ (IIa), and wherein the attenuated post-metallocene catalyst is of formula (IIIa): $(D)_d[M^+](X)_{x-2}(R)$ (IIIa); wherein subscripts d and x; metal M; and ligand D is as defined for formula (Ia) and X is as defined for formula (I); wherein A$^-$ is as defined for formula (II); and wherein R is as defined for formula (III).

Aspect 4. The method of aspect 3 wherein the post-metallocene precatalyst of formula (I) is of formula (Ia)-1

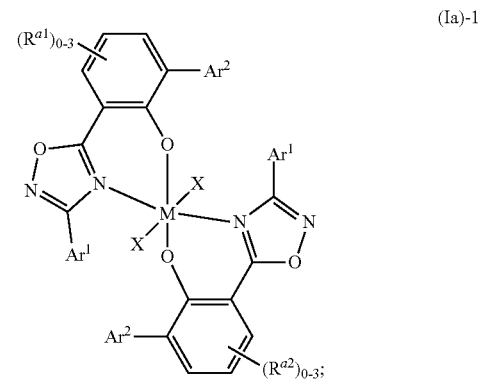

(Ia)-1 wherein each Ar$^1$ and Ar$^2$ independently is an unsubstituted or substituted aromatic group selected from phenyl, substituted phenyl, biphenyl, substituted biphenyl, anthracene, substituted anthracene, carbazolyl, and substituted carbazolyl, wherein each substituent of the substituted aromatic group independently is alkyl; each group $R^{a1}$ and $R^{a2}$ independently is H or a $(C_1-C_{20})$alkyl (e.g., a $(C_1-C_4)$alkyl, e.g., each is 1,1-dimethylethyl); each subscript 0-3 independently is 0, 1, 2, or 3; M and X are as defined for formula (I). In some embodiments the post-metallocene precatalyst is of formula (Ia)-1a:

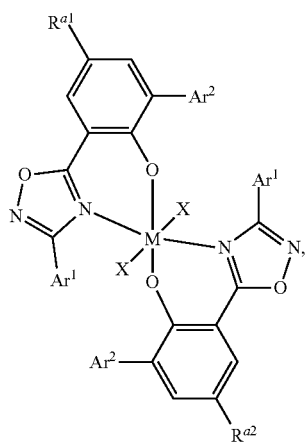

(Ia)-1a wherein each group $R^{a1}$ and $R^{a2}$ independently is a $(C_1$-$C_{20})$ alkyl, and M, X, $Ar^1$ and $Ar^2$ are as defined above. In some embodiments M is Zr or Hf. Without being bound by theory it is believed that the structure of the faster-light-off catalyst made from the post-metallocene precatalyst of formula (Ia)-1 is of formula (IIa)-1:

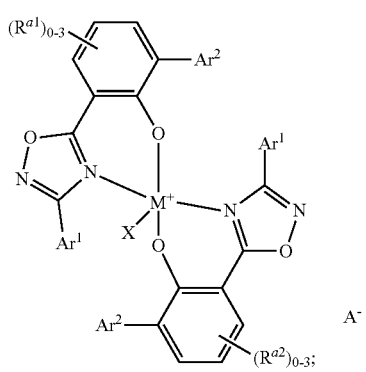

(IIa-)1 and the attenuated post-metallocene catalyst is of formula (IIa)-1:

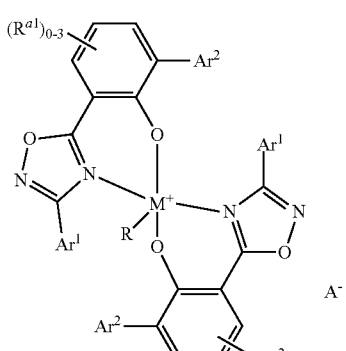

(IIIa)-1 wherein metal M; and each subscript 0-3 and groups $R^{a1}$ to $R^{b2}$, $Ar^1$, and $Ar^2$ are as defined for formula (Ia)-1 or (Ia)-1a; X is as defined for formula (I); wherein $A^-$ is as defined for formula (II); and wherein R is as defined for formula (III). The post-metallocene precatalyst of formula (Ia)-1 may be any one thereof described in U.S. Pat. No. 7,705,157 B2.

Aspect 5. The method of aspect 4 wherein in the post-metallocene precatalyst of formula (Ia)-1 each of groups $R^{a1}$ and $R^{a2}$ are 1,1-dimethylethyl; each $Ar^2$ is 4-fluorophenyl; M is Zr; each X is benzyl; and the post-metallocene precatalyst of formula (Ia)-1 is precatalyst (1)

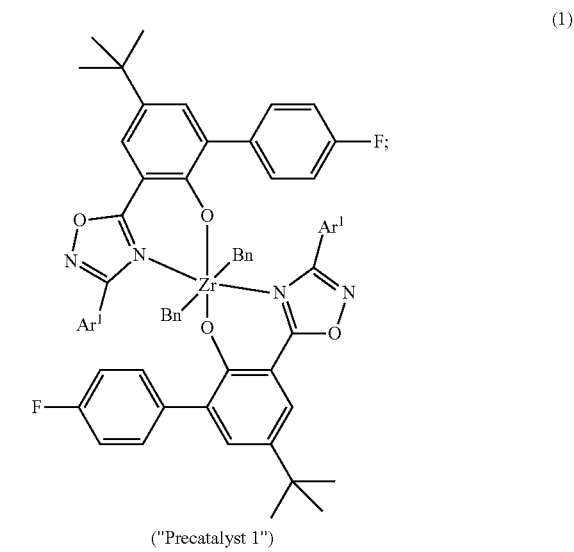

(1)

("Precatalyst 1")

wherein each $Ar^1$ is 2,6-dichlorobenzyl. Synthesize precatalyst (1) according to the general procedure of U.S. Pat. No. 7,705,157 B2 (WO 2006/066126 A2). Another inventive embodiment is the precatalyst (1) per se.

Aspect 6. The method of aspect 3 wherein the post-metallocene precatalyst of formula (I) is of formula (Ia)-2:

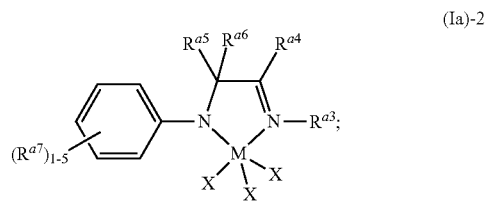

(Ia)-2 wherein M and X are as defined for formula (I); each subscript 1-5 independently is 1, 2, 3, 4, or 5; and each of $R^{a3}$ and $R^{a7}$ independently is a $(C_1$-$C_{20})$alkyl (e.g., a$(C_1$-$C_8)$alkyl) or $(C_6$-$C_{12})$aryl and each of $R^{a4}$ to $R^{a6}$ independently is $(C_1$-$C_{20})$alkyl or $R^{a4}$ to $R^{a6}$ are taken together to form a trivalent group of formula =C(H)—CH$_2$CH$_2$CH$_2$—. In some embodiments the post-metallocene precatalyst formula (I) is of formula (Ia)-2a:

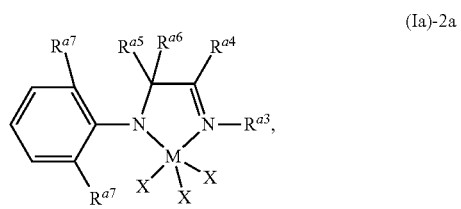

(Ia)-2a wherein M, X, and $R^{a3}$ to $R^{a7}$ are as defined above. Without being bound by theory it is believed that the structure of the faster-light-off catalyst made from the post-metallocene precatalyst of formula (Ia)-2 is of formula (IIa)-2:

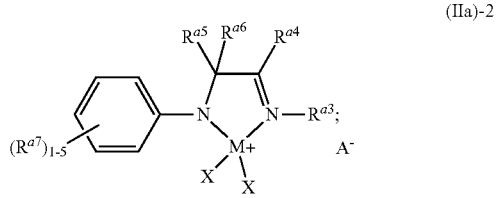

(IIa)-2 and the attenuated post-metallocene catalyst is of formula (IIIa)-2:

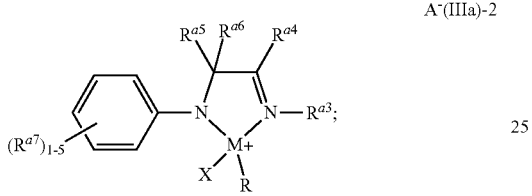

(IIIa)-2 wherein each subscript 1-5 and groups $R^{a3}$ to $R^{b7}$ are as defined for formula (Ia)-2 or (Ia)-2a and M and X are as defined for formula (I); wherein $A^-$ is as defined for formula (II); and wherein R is as defined for formula (III).

Aspect 7. The method of aspect 6 wherein in the post-metallocene precatalyst of formula (Ia)-2, M is Hf, each X is methyl; and the post-metallocene precatalyst of formula (Ia)-2 is precatalyst (2) or (3):

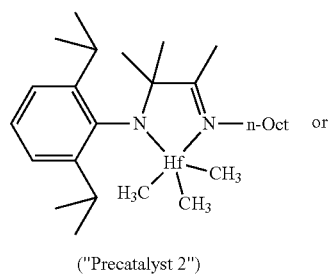

("Precatalyst 2")

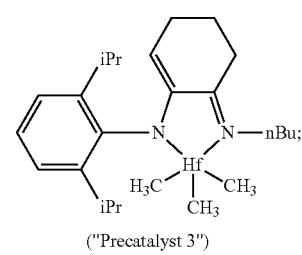

("Precatalyst 3")

wherein n-Oct is normal-octyl, iPr is isopropyl (1-methylethyl), and nBu is normal-butyl. Synthesize precatalyst (2) according to the procedure of Kuhlman, et al., Macromolecules 2010, vol. 43, page 7903. Synthesize precatalyst (3) according to the general procedure of Kuhlman, et al., Macromolecules 2010, vol. 43, page 7903 and Inventive Example A described later. Another inventive embodiment is the precatalyst (3) per se.

Aspect 8. The method of aspect 1 or 2 wherein the post-metallocene precatalyst of formula (I) is of formula (Ib): $MT(X)_2$ (Ib), wherein metal M is Ti, Hf, or Zr; ligand T is the tridentate organoheterylene; each X is as defined for formula (I). Ligand T and monodentate group X may provide to M a total denticity, $K_{tot}$, of 5 ("$K_{tot}^5$") such that M has a total coordination number, $n_{tot}$, of 5.

Aspect 9. The method of aspect 8 wherein the post-metallocene precatalyst of formula (I) is of formula (Ib)-1

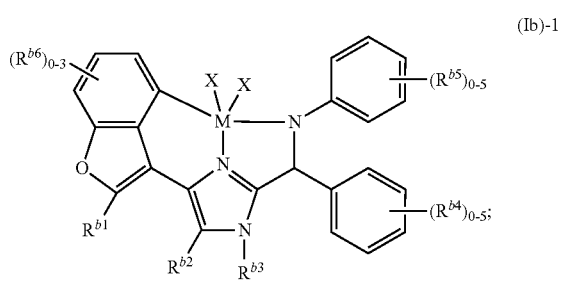

(Ib)-1 wherein M is Hf or Zr; each subscript 0-3 independently is 0, 1, 2, or 3; each of groups $R^{b1}$ to $R^{b6}$ independently is H or a $(C_1-C_0)$alkyl (e.g., a $(C_1-C_4)$alkyl); and X is as defined for formula (I). In some embodiments the post-metallocene precatalyst is of formula (Ib)-1a:

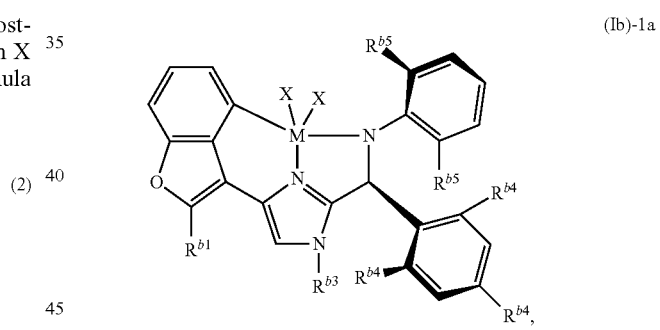

(Ib)-1a wherein each or $R^{b1}$ and $R^{b3}$ to $R^{b5}$ independently is a $(C_1-C_{20})$alkyl and M and X are as defined above. Without being bound by theory it is believed that the structure of the faster-light-off catalyst made from the post-metallocene precatalyst of formula (Ib)-1 is of formula (IIb)-1:

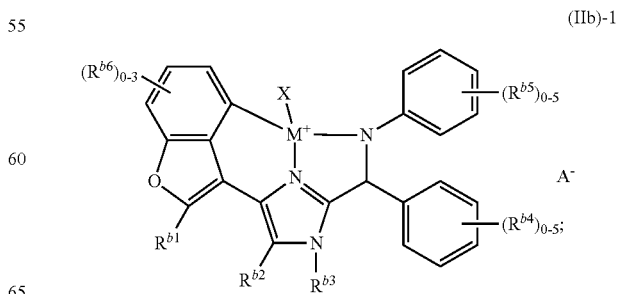

(IIb)-1 and the attenuated post-metallocene catalyst is of formula (IIIb)-1:

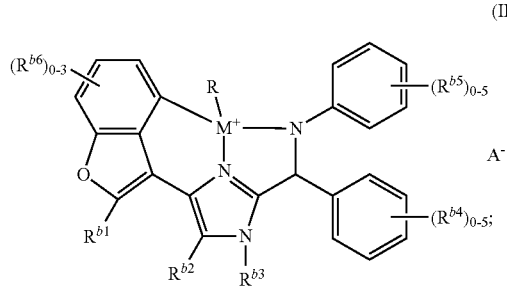

(IIIb)-1 wherein each subscript 0-3 and groups $R^{b1}$ to $R^{b7}$ are as defined for formula (Ib)-1 and M and X are as defined for formula (I); wherein $A^-$ is as defined for formula (II); and wherein R is as defined for formula (III).

Aspect 10. The method of aspect 9 wherein in the post-metallocene precatalyst of formula (Ib)-1 $R^{b1}$ is ethyl; $R^{b}2$, $R^{b}3$, $R^{b}4$, and $R^{b5}$ are methyl; $R^{b6}$ and $R^{b7}$ are 1-methylethyl (i.e., isopropyl); M is Hf; and each X is methyl such that the post-metallocene precatalyst of formula (Ib)-1 is a precatalyst (4):

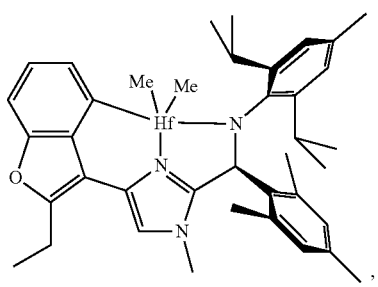

(4)

("Precatalyst 4")

wherein Me is methyl. Synthesize precatalyst (4) according to the procedure of Inventive Example B described later. Another inventive embodiment is the precatalyst (4) per se.

Aspect 11. The method of aspect 8 wherein the post-metallocene precatalyst of formula (I) is of formula (Ib)-2:

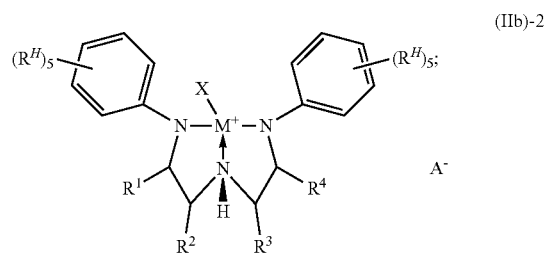

(Ib)-2 wherein M is Zr or Hf; each of $R^1$ to $R^4$ independently is H or $CH_3$; each $R^H$ independently is a $(C_1-C_{20})$alkyl (e.g., a $(C_1-C_4)$alkyl, e.g., $CH_3$); and X is as defined for formula (I) with the proviso that at least one X is a $(C_7-C_{20})$aralkyl (e.g., benzyl). In some aspects M is Zr, alternatively M is Hf. Without being bound by theory it is believed that the structure of the faster-light-off catalyst made from the post-metallocene precatalyst of formula (Ib)-2 is of formula (IIb)-2:

(IIb)-2 and the attenuated post-metallocene catalyst is of formula (IIIb)-2:

(IIIb)-2 wherein metal M; and groups $R^1$ to $R^4$, and X are as defined for formula (Ib)-2; wherein $A^-$ is as defined for formula (II); and wherein R is as defined for formula (III). The post-metallocene precatalyst of formula (Ib)-2 may be any one thereof described in U.S. Pat. No. 6,967,184 B2.

Aspect 12. The method of aspect 11 wherein in the post-metallocene precatalyst of formula (Ib)-2, each of $R^1$ to $R^4$ is H and each X is benzyl and the post-metallocene precatalyst of formula (Ib)-2 is precatalyst (5):

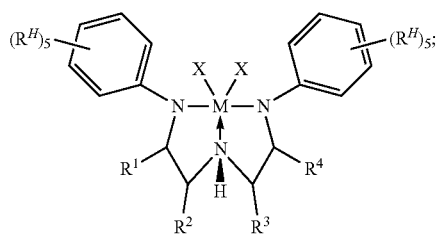

(5)

("Precatalyst 5")

wherein M is Hf or Zr. Synthesize precatalyst (5) by replicating Procedure 2 of U.S. Pat. No. 6,967,184 B2, column 33, line 53, to column 34, line 9.

Aspect 13. The method of aspect 1 or 2 wherein the post-metallocene precatalyst of formula (I) is of formula (Ic): $MQ(X)_2$ (Ic), wherein metal M is Ti, Hf, or Zr; ligand Q is the tetradentate organoheterylene; each X is as defined for formula (I). Ligand Q and monodentate group X may provide to M a total denticity, $K_{tot}$, of 6 ("$K_{tot}^6$") such that M has a total coordination number, $n_{tot}$, of 6.

Aspect 14. The method of aspect 13 wherein the post-metallocene precatalyst of formula (Ic) is of formula (Ic)-1

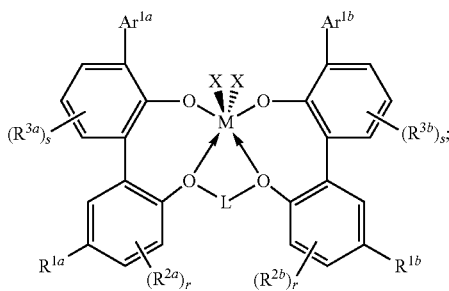

wherein L is a CH$_2$CH$_2$, CH$_2$CH$_2$CH$_2$, CH$_2$CH$_2$CH$_2$CH$_2$, CH$_2$C(R$^L$)$_2$CH$_2$, CH$_2$CH(R$^L$)CH(R$^L$)CH$_2$, CH$_2$Ge(R$^L$)$_2$CH$_2$, or CH$_2$Si(R$^L$)$_2$CH$_2$, wherein each R$^L$ independently is an unsubstituted (C$_1$-C$_{20}$)alkyl; M is Zr or Hf; each of R$^{1a}$ and R$^{1b}$ independently is F, (C$_1$-C$_{20}$)alkyl, or Si(CH$_3$)$_2$(CH$_2$)$_q$CH$_3$, wherein subscript q is an integer from 0 to 20; each subscript r independently is an integer from 0 to 3; each of R$^{2a}$ and R$^{2b}$ independently is H, F, Cl, or CH$_3$; each subscript s independently is an integer from 0 to 3; each of R$^{3a}$ and R$^{3b}$ independently is an unsubstituted (C$_1$-C$_{20}$)alkyl or (C$_1$-C$_{20}$)alkoxy; each Ar$^{1a}$ and Ar$^{1b}$ independently is an unsubstituted or substituted aromatic group selected from phenyl, substituted phenyl, biphenyl, substituted biphenyl, anthracene, substituted anthracene, carbazolyl, and substituted carbazolyl, wherein each substituent of the substituted aromatic group independently is alkyl; and each X independently is as defined for formula (I). In some aspects at least one X is a (C$_6$-C$_{12}$)aryl-((C$_0$-C$_{10}$)alkylene)-CH$_2$ (e.g., benzyl). In some aspects each X is independently a (C$_6$-C$_{12}$)aryl-((C$_0$-C$_{10}$)alkylene)-CH$_2$, alternatively one X is a (C$_6$-C$_{12}$)aryl-((C$_0$-C$_{10}$)alkylene)-CH$_2$ (e.g., benzyl) and the other X is F, Cl, or methyl; alternatively each X is benzyl. Without being bound by theory it is believed that the structure of the faster-light-off catalyst made from the post-metallocene precatalyst of formula (Ic)-1 is of formula (IIc)-1:

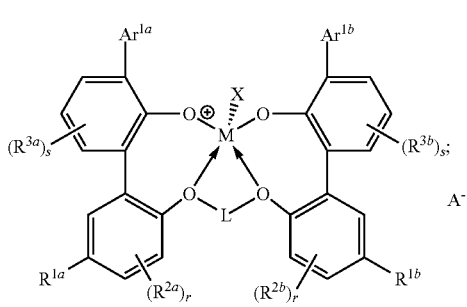

and the attenuated post-metallocene catalyst is of formula (IIIc)-1:

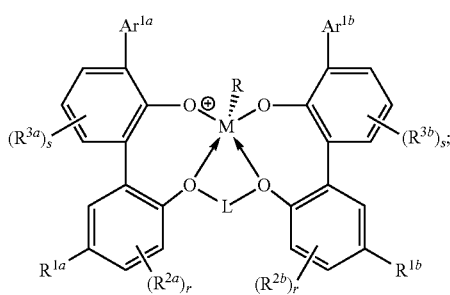

wherein L, subscripts r and s; and groups R$^{1a}$ to R$^{3b}$ are as defined for formula (Ic)-1 and metal M and group X are as defined for formula (I); wherein A$^-$ is as defined for formula (II); and wherein R is as defined for formula (III). The post-metallocene precatalyst of formula (Ic)-1 may be any one thereof described in WO 2012/027448 A1; WO 2014/105411 A1; WO 2017/058981 A1; WO 2018/022975 A1; or WO 2018/183026 A1.

Aspect 15. The method of aspect 14 wherein the post-metallocene precatalyst of formula (Ic)-1 is a post-metallocene precatalyst of formula (Ic)-1a:

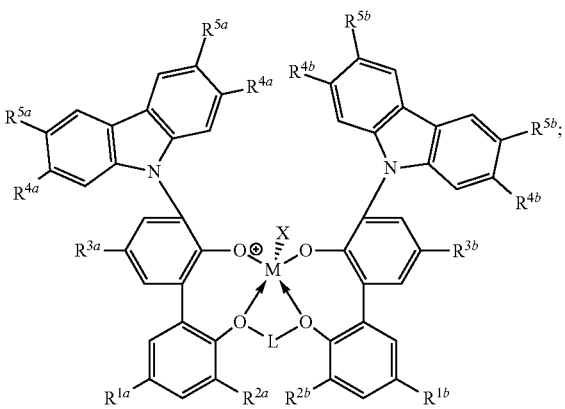

wherein L is a CH$_2$CH$_2$, CH$_2$CH$_2$CH$_2$, CH$_2$CH$_2$CH$_2$CH$_2$, CH$_2$C(R$^L$)$_2$CH$_2$, CH$_2$CH(R$^L$)CH(R$^L$)CH$_2$, or CH$_2$Si(R$^L$)$_2$CH$_2$, wherein each R$^L$ independently is an unsubstituted (C$_1$-C$_{20}$)alkyl; M is Zr or Hf; each of R$^{1a}$ and Rib independently is F, (C$_1$-C$_{20}$)alkyl, or Si(CH$_3$)$_2$(CH$_2$)$_q$CH$_3$, wherein subscript q is an integer from 0 to 9; each of R$^{2a}$ and R$^{2b}$ independently is H or CH$_3$; each of R$^{3a}$ and R$^{3b}$ independently is an unsubstituted 1,1-dimethyl-(C$_2$ to C$_8$)alkyl; each of R$^{4a}$, R$^4$b, R$^{5a}$, R$^5$b independently is H or an unsubstituted 1,1-dimethyl-(C$_2$ to C$_4$)alkyl; and each X independently is as defined for formula (I).

Aspect 16. The method of aspect 15 wherein the post-metallocene precatalyst of (Ic)-1a is any one of post-metallocene precatalysts (6) to (10):

(6)

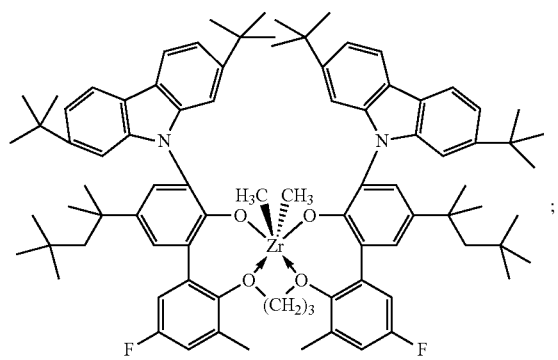

("Precatalyst 6")

(7)

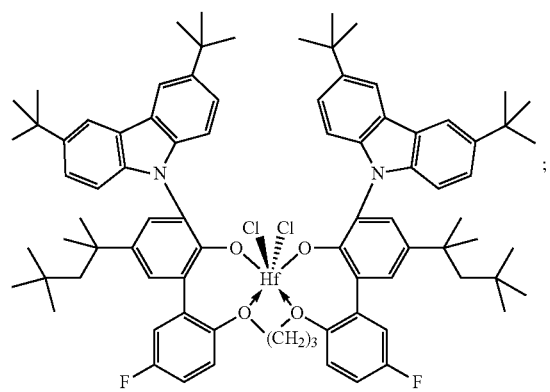

("Precatalyst 7")

(8)

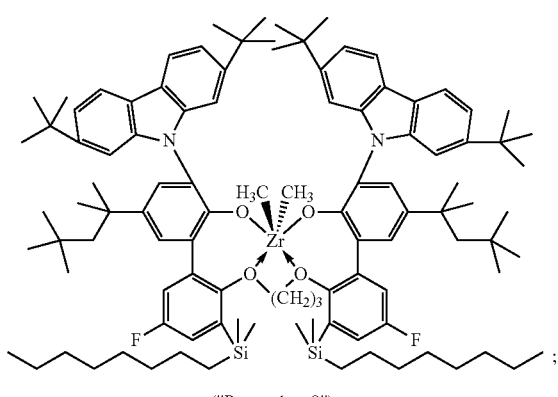

("Precatalyst 8")

(9)

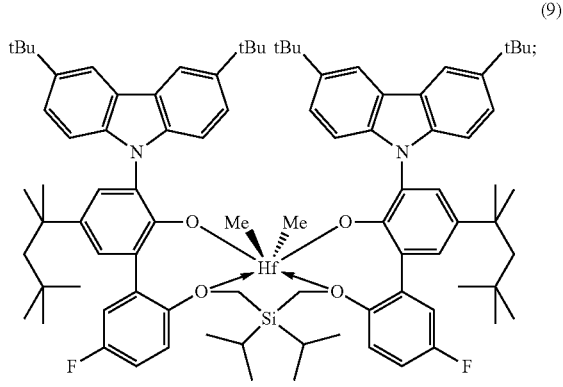

("Precatalyst 9")

and (10)

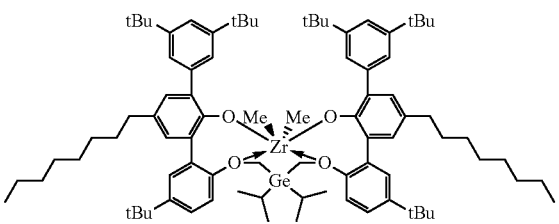

("Precatalyst 10")

Synthesize precatalyst (6) according to the procedure of WO2014105411 A1. Synthesize precatalyst (7) according to the procedure of WO2017058981 A1. Synthesize precatalyst (8) according to the procedure of WO2012027448 A1. Synthesize precatalyst (9) according to the procedure of WO 2018/022975 A1 (e.g., Example E-19). Synthesize precatalyst (10) according to the procedure of WO 2018/183026 A1 (e.g., Example 26).

Aspect 17. The method of any one of aspects 1 to 16 wherein the kinetics modifier compound is described by any one of limitations (i) to (vi): (i) of formula ($A^1$) or ($B^1$), (ii) of formula ($A^1$) or ($C^1$), (iii) of formula ($B^1$) or ($C^1$), (iv) of formula ($A^1$), (v) of formula ($B^1$), or (vi) of formula ($C^1$). Without being bound by theory it is believed and has been the result that the kinetics modifier compounds of formulas ($A^1$) and ($B^1$) yield the R ligands (A) and (B), respectively, each of which (A) and (B) have a carbon-carbon double bond as a structural feature in common therebetween. In some aspects the kinetics modifier compound consists of carbon and hydrogen atoms. In other aspects the kinetics modifier compound consists of carbon atoms, hydrogen atoms, and a least one atom selected from a halogen atom, O, N, and Si; alternatively the kinetics modifier compound consists of carbon atoms, hydrogen atoms, and a least one halogen atom; alternatively the kinetics modifier compound consists of carbon atoms, hydrogen atoms, and a least one atom selected from O, N, and Si; alternatively O and N; alternatively O and Si; alternatively N and Si; alternatively O, alternatively N; alternatively Si.

Aspect 18. The method of any one of aspects 1 to 17 wherein the kinetics modifier compound is of formula ($A^1$): $R^5—C \equiv C—R^6$ ($A^1$) that is selected from phenylacetylene; a (substituted-phenyl)acetylene; diphenylacetylene; a substituted diphenylacetylene; a cycloalkylacetylene; an acetylene of formula $HC \equiv CSi(phenyl)_h((C_1-C_{20})alkyl)_{3-h}$, wherein subscript h is an integer from 0 to 3; and an acetylene of formula HC≡C—(CH₂)ₘCH₃, wherein subscript m is an integer from 1 to 15, alternatively from 1 to 10, alternatively from 2 to 15. In formula (III) of aspect 2, the respective ligand R may be selected from —C(H)═C(X)-phenyl; —C(H)═C(X)-(substituted-phenyl); —CH₂—C(X)═C(H)-cycloalkyl; —CH₂—C(X)═C(H)—Si(phenyl)ₙ((C₁-C₂₀)alkyl)₃₋ₕ, wherein subscript h is as defined above; —C(H)═C(X)—(CH₂)ₘCH₃, wherein subscript m is as defined above or —CH₂—C(X)═C(alkyl)₂. The subscript m may be an integer from 8 to 15, alternatively from 1 to 7, alternatively from 2 to 6, alternatively from 2 to 4, alternatively from 1 to 3.

Aspect 19. The method of any one of aspects 1 to 17 wherein the kinetics modifier compound is of the formula (A¹): R⁵—C≡C—R⁶ (A¹). The (substituted-phenyl)acetylene may be a (fluoro-substituted-phenyl)acetylene or a (methyl-substituted-phenyl)acetylene; alternatively 3,4-difluorophenylacetylene, 3,5-difluorophenylacetylene, 3-fluorophenylacetylene, 4-fluorophenylacetylene, or 2,4,5-trimethylphenylacetylene.

Aspect 20. The method of any one of aspects 1 to 19 wherein the kinetics modifier compound is of formula (A¹): R⁵—C≡C—R⁶ (A¹) and the kinetics modifier compound of formula (A¹) is selected from the group consisting of any one of KMC1 to KMC14: Kinetics Modifier Compound (1) ("KMC1"): phenylacetylene (i.e., (C₆H₅)C≡CH); Kinetics Modifier Compound (2) ("KMC2"): 4-methylphenyl-acetylene (i.e., (4-CH₃—C₆H₄)C≡CH); Kinetics Modifier Compound (3) ("KMC3"): 2,4,5-trimethylphenyl-acetylene (i.e., (2,4,5-(CH₃)₃—C₆H₂)C≡CH); Kinetics Modifier Compound (4) ("KMC4"): 1,3,5-triethynylbenzene (i.e., 1,3,5-tri(HC≡C)₃(C₆H₃); Kinetics Modifier Compound (5) ("KMC5"): diphenylacetylene (i.e., (C₆H₅)CEC(C₆H₅)); Kinetics Modifier Compound (6) ("KMC6"): 3-fluorophenyl-acetylene (i.e., (3-F—C₆H₄)C≡CH); Kinetics Modifier Compound (7) ("KMC7"): 4-fluorophenyl-acetylene (i.e., (4-F—C₆H₄)C≡CH); Kinetics Modifier Compound (8) ("KMC8"): 3,4-difluorophenyl-acetylene (i.e., (3,4-F₂—C₆H₃)C≡CH); Kinetics Modifier Compound (9) ("KMC9"): 3,5-difluorophenyl-acetylene (i.e., (3,5-F₂—C₆H₃)C≡CH); Kinetics Modifier Compound (10) ("KMC10"): cyclohexylacetylene (i.e., C₆H₁₁C≡CH); Kinetics Modifier Compound (11) ("KMC11"): phenyldimethylsilylacetylene (i.e., (C₆H₅)(CH₃)₂SiC≡CH); Kinetics Modifier Compound (12) ("KMC12"): 1-pentyne (i.e., CH₃(CH₂)₂C≡CH); Kinetics Modifier Compound (13) (:"KMC13"): 1-octyne (i.e., CH₃(CH₂)₅C≡CH); and Kinetics Modifier Compound (14) ("KMC14"): 1,7-octadiyne (i.e., HC≡C(CH₂)₄C≡CH).

Aspect 21. The method of any one of aspect 1 to 17 wherein the kinetics modifier compound is of formula (B¹): (R⁵)₂C═C═C(R⁶)₂ (B¹) and is selected from a cycloalkylallene; an alkylallene; a dialkylallene; a trialkylallene; a trialkylsilylallene; a vinylidenecycloalkane; and an alkyl ester of an allenecarboxylic acid. The cycloalkylallene may be a ((C₃-C₈)cycloalkyl)allene, alternatively a cyclohexylallene. The alkylallene may be methylallene, ethylallene, propylallene, or (1,1-dimethylethyl)allene. The dialkylallene may be a 1,1-dialkylallene or a 1,3-dialkylallene; alternatively 1,1-dimethylallene. The trialkylallene may be 1,1,3-trimethylallene. The trialkylsilylallene may be trimethylsilylallene, triethylsilylallene, or dimethyl,(1,1-dimethylethyl)silylallene (i.e., tert-butyl-dimethyl-silylallene). The vinylidenecycloalkane may be vinylidinecyclohexane, of formula

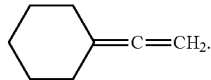

Aspect 22. The method of any one of aspects 1 to 17 wherein the kinetics modifier compound is of formula (B¹): (R⁵)₂C═C═C(R⁶)₂ (B¹) and the kinetics modifier compound of formula (B¹) is selected from the group consisting of any one of KMC15 to KMC17: Kinetics Modifier Compound (15) ("KMC15"): cyclohexylallene (i.e., (C₆H₁₁)C(H)═C═CH₂); Kinetics Modifier Compound (16) ("KMC16"): Ethyl 2,3-butadienoate (i.e., H₂C═C═CH—C(═O)—O—CH₂CH₃); and Kinetics Modifier Compound (17) ("KMC17"): 1,1-dimethylallene (i.e., (CH₃)₂C═C═CH₂).

Aspect 23. The method of any one of aspects 1 to 17 wherein the kinetics modifier compound is of formula (C¹): (R⁵)(R⁷)C═C(R⁶)(R⁷) (C¹) and the kinetics modifier compound of formula (C¹) is an internal alkene. As such, the internal alkene does not have a terminal carbon-carbon double bond or a terminal carbon-carbon triple bond. The internal alkene may be selected from KMC18 to KMC20: Kinetics Modifier Compound (18) ("KMC18"): 2-butene, Kinetics Modifier Compound (19) ("KMC19"): 2-pentene, and Kinetics Modifier Compound (20) ("KMC20"): 1,2-diphenylethene. In formula (III) of aspect 2, the respective ligand R may be derived therefrom may be of formula —C(H)(CH₃)—C(X)CH₃, —C(H)(CH₃)—C(X)CH₂CH₃, or —C(H)(phenyl)-C(X)phenyl, respectively.

Aspect 24. The method of any one of aspects 1 to 23 further comprising, before the combining step, a step of making the faster-light-off catalyst by activating the precatalyst of formula (I) with the activator under effective activating conditions, thereby making the faster-light-off catalyst. In some embodiments the activator is an alkylaluminoxane, an organoborane compound, or an organoborate salt.

Aspect 25. The method of any one of aspects 1 to 24 wherein the method further comprises making a mixture of the attenuated post-metallocene catalyst, a support material, and an inert hydrocarbon solvent and removing the inert hydrocarbon solvent from the mixture so as to give the attenuated post-metallocene catalyst disposed on the support material. The mixture may further comprise excess activator because the activator is typically used in excess to activate the post-metallocene precatalyst. The removing step may be achieved via conventional evaporating of the inert hydrocarbon solvent from the mixture (i.e., conventional concentrating method), which yields an evaporated/supported, attenuated post-metallocene catalyst. Alternatively the removing step may be achieved by spray-drying the mixture. The spray-drying embodiment gives a spray-dried/supported, attenuated post-metallocene catalyst, which may have improved performance relative to the evaporated/supported, attenuated post-metallocene catalyst. Examples of the support material are alumina and hydrophobized fumed silica; alternatively the hydrophobized fumed silica. The hydrophobized fumed silica may be made by surface-treating an untreated, anhydrous fumed silica with an effective amount of a hydrophobing agent. The hydrophobing agent may be dimethyldichlorosilane, a polydimethylsiloxane fluid, or hexamethyldisilazane; alternatively dimethyldichlorosilane. The hydrophobized fumed silica made by surface-treating an untreated, anhydrous fumed silica with dimethyldichlorosilane may be CABOSIL TS-610.

Aspect 26. An attenuated post-metallocene catalyst made by the method of any one of aspects 1 to 25. The attenuated post-metallocene catalyst may be of or based on the formula (III) described earlier. In some embodiments the attenuated post-metallocene catalyst is made from the post-metallocene precatalyst of formula (Ia)-1, (Ia)-2, (Ib)-1, (Ib)-2, or (Ic)-1; alternatively the attenuated post-metallocene catalyst is made from a post-metallocene precatalyst selected from the group consisting of any four of the post-metallocene precatalysts of formulas (Ia)-1, (Ia)-2, (Ib)-1, (Ib)-2, and (Ic)-1 (i.e., a group wherein any one of formulas (Ia)-1, (Ia)-2, (Ib)-1, (Ib)-2, and (Ic)-1 is omitted); alternatively the attenuated post-metallocene catalyst is made from the post-metallocene precatalyst of formula (Ia)-1 or (Ia)-2; alternatively the attenuated post-metallocene catalyst is made from the post-metallocene precatalyst of formula (Ib)-1 or (Ib)-2; alternatively the attenuated post-metallocene catalyst is made from the post-metallocene precatalyst of formula (Ia)-1; alternatively the attenuated post-metallocene catalyst is made from the post-metallocene precatalyst of formula (Ia)-2; alternatively the attenuated post-metallocene catalyst is made from the post-metallocene precatalyst of formula (Ib)-1; alternatively the attenuated post-metallocene catalyst is made from the post-metallocene precatalyst of formula (Ib)-2; alternatively the attenuated post-metallocene catalyst is made from the post-metallocene precatalyst of formula (Ic)-1.

Aspect 27. A method of feeding a post-metallocene catalyst to a slurry-phase or gas-phase polymerization reactor containing an olefin monomer and a moving bed of polyolefin polymer, the method comprising making the attenuated post-metallocene catalyst outside of the reactor and according to the method of any one of aspects 1 to 25, and feeding the attenuated post-metallocene catalyst in neat form (e.g., dry powder) or as a solution or slurry thereof in an inert hydrocarbon liquid through a feed line free of olefin monomer into the slurry-phase or gas-phase polymerization reactor. In embodiments the method further comprises transferring the attenuated post-metallocene catalyst, or a fully-active post-metallocene catalyst made in situ therefrom in the reactor, to a (second) gas-phase polymerization reactor, wherein it catalyzes a second olefin polymerization reaction.

Aspect 28. A multimodal (e.g., bimodal or trimodal) catalyst system comprising the attenuated post-metallocene catalyst of aspect 26 and at least one second catalyst selected from the group consisting of an unattenuated a post-metallocene catalyst described herein, a different attenuated post-metallocene catalyst, and a metallocene catalyst. In some embodiments the multimodal catalyst system comprises the attenuated post-metallocene catalyst of aspect 26 and only one second catalyst, alternatively only two different second catalysts. The multimodal catalyst system may further comprise a support material and the attenuated post-metallocene catalyst and metallocene catalyst may be disposed (e.g., spray-dried) on the support material. The attenuated post-metallocene catalyst and the metallocene catalyst of the multimodal catalyst system may have light-off profiles as measured by the Light-Off Vial Test Method (described later) wherein the times of their respective peak polymerization temperatures $Temp_{peak}$ are within 60 minutes, alternatively within 45 minutes, alternatively within 30 minutes of each other. When the second catalyst is the metallocene catalyst, the light-off performance of the catalysts of the multimodal catalyst system may be beneficially compatible such that a polymerization with the multimodal catalyst system making a multimodal (e.g., bimodal or trimodal) polyolefin polymer comprising a higher molecular weight (HMW) component made from the attenuated post-metallocene catalyst and a lower molecular weight (LMW) component does not overproduce the HMW component relative to the LMW component and thus makes less or no off-specification multimodal polyolefin polymer.

Aspect 29. A method of feeding a multimodal (e.g., bimodal or trimodal) catalyst system to a slurry-phase or gas-phase polymerization reactor containing an olefin monomer and a moving bed of polyolefin polymer, the method comprising making the attenuated post-metallocene catalyst outside of the reactor and according to the method of any one of aspects 1 to 25, contacting a solution of the attenuated post-metallocene catalyst and an activated metallocene catalyst in an inert hydrocarbon solvent with a support material (e.g., fumed silica) outside of the reactor and so as to make a slurry of a multimodal (e.g., bimodal or trimodal) catalyst system consisting essentially of the attenuated post-metallocene catalyst and the activated metallocene catalyst co-supported on the same support material and suspended in the inert hydrocarbon solvent; optionally removing the inert hydrocarbon solvent from the slurry to make the multimodal catalyst system in neat (dry powder) form; and feeding the slurry of the multimodal catalyst system or the neat form of the multimodal catalyst system through a feed line free of olefin monomer into the slurry-phase or gas-phase polymerization reactor.

Aspect 30. A method of making a polyolefin polymer, the method comprising contacting at least one 1-alkene monomer with the attenuated post-metallocene catalyst made by the method of any one of aspects 1 to 25, or the multimodal catalyst system of aspect 29, under slurry-phase or gas-phase polymerization conditions in a slurry-phase or gas-phase polymerization reactor, respectively, containing a moving bed of polyolefin resin, thereby making the polyolefin polymer. The method may comprise before the contacting step a step comprising feeding the attenuated post-metallocene catalyst made by the method of any one of aspects 1 to 25, or feeding the multimodal catalyst system of aspect 29, into the slurry-phase or gas-phase polymerization reactor containing the moving bed of polyolefin resin and at least one 1-alkene monomer under slurry-phase or gas-phase polymerization conditions, respectively, so as to allow attenuated light-off of the attenuated post-metallocene catalyst and subsequent polymerization of the at least one 1-alkene monomer, thereby making the polyolefin polymer. The moving bed may be a stirred bed or a fluidized bed. The at least one 1-alkene monomer may be ethylene or a combination of ethylene and a comonomer selected from propylene, 1-butene, 1-hexene, and 1-octene. In embodiments the reactor is a first gas-phase polymerization reactor and is under first gas-phase polymerization conditions. Alternatively, the reactor may be a slurry-phase polymerization reactor and the polymerization conditions may be slurry-phase polymerization conditions. In some such embodiments, the method may further comprise transferring active polymer granules, made in the first gas-phase polymerization reactor under the first gas-phase polymerization conditions or made in the slurry-phase polymerization reactor under slurry-phase polymerization conditions and in either case containing (in the granules) active post-metallocene catalyst, into a (second) gas-phase polymerization reactor under (second) gas-phase polymerization conditions, which are different than the first gas-phase polymerization conditions used in the first gas-phase polymerization reactor or the slurry-phase polymerization conditions used in the slurry-phase polymerization reactor, as the case may be, thereby making a multimodal (e.g., bimodal or trimodal) polyolefin polymer (i.e., a polyolefin polymer having a multimodal (e.g., bimodal or trimodal) molecular weight distribution $M_w/M_n$ in the (second) gas-phase polymerization reactor.

Aspect 31. A polyolefin polymer made by the method of making of aspect 30. The polyolefin polymer, as obtained in virgin form from the slurry-phase or gas-phase polymerization reactor, may be in the form of granules having a lower amount of aggregates (fused granules) than a comparative polyolefin polymer obtained in virgin form from a slurry-phase or gas-phase polymerization reactor, respectively, run under identical polymerization conditions except wherein the attenuated post-metallocene catalyst is replaced with the faster-light-off catalyst.

Aspect 32. A manufactured article (e.g., a blown or cast film) made from the polyolefin polymer of aspect 31. The manufactured article may have a lower gel count than a comparative manufactured article made from the comparative polyolefin polymer.

Aspect 33. An inventive embodiment of any one of aspects 1 to 24 wherein the attenuated post-metallocene catalyst is free of a support material. For example, free of a fumed silica or an alumina.

Aspect 34. A post-metallocene precatalyst selected from the group consisting of the aforementioned post-metallocene precatalysts of formula (1) to (10). In some embodiments the post-metallocene precatalyst is selected from the group consisting of the post-metallocene precatalysts of formulas (1), (3), and (4). In some embodiments the post-metallocene precatalyst is the post-metallocene precatalyst of formula (10).

Aspect 35. A post-metallocene catalyst made by contacting the post-metallocene precatalyst of aspect 34 with an activator.

Aspect 36. A method of making a post-metallocene precatalyst, the method comprising contacting, in an aprotic solvent under effective reaction conditions, the post-metallocene precatalyst of formula (I) $(D)_d M(T)_t(Q)_q(X)_x$ (I) with x mole equivalents of an organometallic compound of formula $X^1$ MgR or $M^1 R_n$ or, for example, $LiCuR_2$; thereby making a post-metallocene precatalyst of formula (IV): $(D)_d M(T)_t(Q)_q(R)_x$ (IV); wherein $X^1$ is Cl, Br, or I; $M^1$ is selected from Li, Na, K, Zn, Sn, Tl, Hg, and Cu; subscript n is an integer from 1 to 4 and is equal to the formal oxidation state of $M^1$; R is a ligand of formula (A), (B), or (C): —C($R^5$)=C(X)$R^6$ (A), —C($R^5$)$_2$—C(X)=C($R^6$)$_2$ (B), or —C($R^5$)($R^7$)—C(X)($R^6$)($R^7$) (C); each of $R^5$ and $R^6$ independently is H or $R^7$; and each $R^7$ independently is a $(C_1-C_{20})$hydrocarbyl, —C(=O)—O-(unsubstituted $C_1-C_{20}$) hydrocarbyl), a $(C_1-C_{17})$heterohydrocarbyl, or a tri(($C_1-C_{20}$) hydrocarbyl)silyl, or two $R^7$ are taken together to form a $(C_3-C_6)$alkylene; wherein each $(C_1-C_{20})$hydrocarbyl independently is unsubstituted or substituted with from 1 to 4 substituent groups $R^S$; with the proviso that each $R^7$ lacks a carbon-carbon double bond; wherein each substituent group $R^S$ is independently selected from halogen, unsubstituted $(C_1-C_5)$alkyl, —C≡CH, —OH, —NH$_2$, —N(H)(unsubstituted $(C_1-C_5)$alkyl), —N(unsubstituted $(C_1-C_5)$alkyl)$_2$, —COOH, and —COO(unsubstituted $(C_1-C_5)$alkyl); metal M is Ti, Hf, or Zr; subscript d is 0, 1, or 2; subscript t is 0 or 1; subscript q is 0 or 1; subscript x is 1, 2, or 3; each ligand D independently is the didentate organoheteryl or the didentate organoheterylene; ligand T is the tridentate organoheterylene; and ligand Q is the tetradentate organoheterylene; X is the monodentate group X as defined in formula (I). Subscripts d, t, q, and x are chosen in such a way that ligands D, T, Q, and R provide to M a total denticity, $K_{tot}$, of 5 or 6 ("$K_{tot}^5$" or "$K_{tot}^6$") such that M has a total coordination number, $n_{tot}$, of 5 or 6. In some aspects each $R^7$ independently is a $(C_1-C_{20})$hydrocarbyl, which independently may be unsubstituted or substituted with from 1 to 3 substituent groups selected from halogen (e.g., F) and alkyl (e.g., $CH_3$). In some embodiments subscript x is 1 or 2; alternatively 1 or 3; alternatively 2 or 3; alternatively 1; alternatively 2; alternatively 3. In some embodiments the post-metallocene precatalyst of formula (I) used in the method is any one of formulas (Ia)-1, (Ia)-2, (Ib)-1, (Ib)-2, and (Ic)-1; alternatively any one of formulas (Ia)-1, (Ia)-2, (Ib)-1, and (Ic)-1; alternatively any one of Precatalyst 1 to Precatalyst 4 and Precatalyst 6 to Precatalyst 10.

Aspect 37. A method of making an attenuated post-metallocene catalyst, the method comprising contacting the post-metallocene precatalyst of formula (IV) of aspect 36 with an activator under effective activating conditions, thereby making an attenuated post-metallocene catalyst of formula (V) $(D)_d[M^+](T)_t(Q)_q(R)_{x-1}$ A$^-$ (V); wherein subscripts d, t, q, and x; metal M; and ligands D, T, Q, and R are as defined for formula (IV); wherein A$^-$ is an anion (used to formally balance the positive charge of metal M). In some embodiments subscript x is 1 or 2; alternatively 1 or 3; alternatively 2 or 3; alternatively 1; alternatively 2; alternatively 3. The attenuated post-metallocene catalyst of formula (V) may differ from the attenuated post-metallocene catalyst of formula (III) in at least one property. For example, the time or temperature used to make the attenuated post-metallocene catalyst of formula (III) from the faster-light-off post-metallocene catalyst of formula (II) may be shorter or lower, respectively, than the time or temperature used to make the attenuated post-metallocene catalyst of formula (V) from the post-metallocene precatalyst of formula (IV). Other differences between the attenuated post-metallocene catalysts of formulas (III) and (V) may comprise different kinetics profiles (e.g., length of time from Time zero (Time$_0$) to peak temperature (Temp$_{peak}$) and/or the peak temperature reached, both as measured by the Light-Off Vial Test Method described later; different catalytic activities; different polymer productivities; different responses to changes in bed temperature, ethylene partial pressure, molecular hydrogen-to-ethylene ($H_2/C_2$) molar ratio, and/or comonomer-to-ethylene ($C_x/C_2$) molar ratio in gas phase polymerizations; and/or different properties of polyolefin polymer products under same gas-phase polymerization conditions. Other differences between the attenuated post-metallocene catalysts of formulas (III) and (V) may include a greater solubility of the attenuated post-metallocene catalyst of formula (V) in the inert hydrocarbon compound (e.g., n-hexane) than the solubility of the attenuated post-metallocene catalyst of formula (III) therein, especially when at least one X is present and is a halide in formula (III). Thus, the attenuated post-metallocene catalyst of formula (V) may be better suited than formula (III) is for feeding as a solution thereof in inert hydrocarbon solvent into a polymerization reactor.

The method of making the attenuated post-metallocene catalyst. The method comprises combining the faster-light-off catalyst with the effective amount of the kinetics modifier compound of formula ($A^1$), ($B^1$), or ($C^1$) under the effective reaction conditions so as to make the attenuated post-metallocene catalyst. The faster light-off catalyst may be of formula (II) and the attenuated post-metallocene catalyst may be of formula (III). The combining step may be performed in the absence of the precatalyst of formula (I). The combining step may be performed in the presence of unreacted activator if the activator is used in excess in an activating step. The faster-light-off catalyst contains the leaving group X bonded to metal atom M. In the combining step, the kinetics modifier compound reacts with the faster-light-off catalyst in such a way so as to displace the leaving group X from the faster-light-off catalyst and replace it with the ligand R derived from the kinetics modifier compound. The ligand is bonded to the metal atom M in the resulting attenuated post-metallocene catalyst. In some aspects the attenuated post-metallocene catalyst is of formula (III) and the faster-light-off catalyst is of formula (II) and the precatalyst is of formula (I), all wherein M is Zr and each X is benzyl.

In some embodiments metal M is Zr or Hf; alternatively M is Zr or Ti; alternatively M is Ti or Hf; alternatively M is Zr; alternatively M is Hf; alternatively M is Ti.

Embodiments of the method of making may comprise any one of synthetic schemes 1 to 11.

Synthesis Scheme 1: Step (a) post-metallocene precatalyst+ excess activator→intermediate mixture of activated post-metallocene catalyst+leftover activator. Step (b) intermediate mixture+effective amount of kinetics modifier compound→attenuated post-metallocene catalyst.

Synthesis Scheme 2: Step (a) post-metallocene precatalyst+effective amount of kinetics modifier compound→intermediate post-metallocene precatalyst (unreacted mixture or reaction product of post-metallocene precatalyst+kinetics modifier compound). Step (b) intermediate post-metallocene precatalyst+activator (e.g., an alkylaluminoxane such as methylaluminoxane ("MAO"))→attenuated post-metallocene catalyst.

Synthesis Scheme 3: Step (a) post-metallocene precatalyst+activator (e.g., an alkylaluminoxane such as methylaluminoxane ("MAO"))→activated post-metallocene catalyst (faster-light-off catalyst). Step (b) activated post-metallocene catalyst+effective amount of kinetics modifier compound→attenuated post-metallocene catalyst.

Synthesis Scheme 4: Step (a) activator (e.g., an alkylaluminoxane such as methylaluminoxane ("MAO"))+effective amount of kinetics modifier compound→intermediate solution. Step (b) Intermediate solution+post-metallocene precatalyst→attenuated light-off post-metallocene catalyst.

Synthesis Scheme 5: Step (a) activator→post-metallocene precatalyst F effective amount of kinetics modifier compound (simultaneous but separate additions of activator and kinetics modifier to post-metallocene precatalyst)→attenuated post-metallocene catalyst. Step (b): none.

Synthesis Scheme 6: Step (a) post-metallocene precatalyst+support material 4 supported post-metallocene precatalyst. (b) supported post-metallocene precatalyst+an amount of activator→intermediate mixture of activated post-metallocene catalyst+leftover activator disposed on (or in equilibrium with) the support material. Step (c) intermediate mixture+effective amount of kinetics modifier compound-→attenuated post-metallocene catalyst disposed on (or in equilibrium with) support material. In some aspects step (a) further includes an inert hydrocarbon solvent and deposition on the support material is performed by evaporating the solvent, alternatively by spray-drying. The amount of activator may be a stoichiometric amount relative to the metal M of the post-metallocene catalyst (e.g., a molar ratio of 1.0 to 1.0); alternatively a less than stoichiometric amount relative thereto (e.g., a molar ratio of from 0.1 to 0.94); alternatively an excess amount (e.g., a molar ratio from 1.1 to 10,000) relative thereto.

Synthesis Scheme 7: Step (a) post-metallocene precatalyst+effective amount of kinetics modifier compound+support material→intermediate mixture of post-metallocene precatalyst and kinetics modifier compound disposed on (or in equilibrium with) support material. Step (b) intermediate mixture+activator (e.g., an alkylaluminoxane such as methylaluminoxane ("MAO"))→attenuated post-metallocene catalyst disposed on (or in equilibrium with) support material. In some aspects step (a) further includes an inert hydrocarbon solvent and deposition on the support material is performed by evaporating the solvent, alternatively by spray-drying.

Synthesis Scheme 8: Step (a) post-metallocene precatalyst+support material+activator (e.g., an alkylaluminoxane such as methylaluminoxane ("MAO"))→activated post-metallocene catalyst (faster-light-off catalyst) disposed on (or in equilibrium with) support material. Step (b) supported activated post-metallocene catalyst+effective amount of kinetics modifier compound→attenuated post-metallocene catalyst disposed on (or in equilibrium with) support material. In some aspects step (a) further includes an inert hydrocarbon solvent and deposition on the support material is performed by evaporating the solvent, alternatively by spray-drying.

Synthesis Scheme 9: Step (a) activator (e.g., an alkylaluminoxane such as methylaluminoxane ("MAO"))+effective amount of kinetics modifier compound 4 intermediate solution. Step (b) Intermediate solution+post-metallocene precatalyst+support material→attenuated light-off post-metallocene catalyst disposed on (or in equilibrium with) support material. In some aspects step (b) further includes an inert hydrocarbon solvent and deposition on the support material is performed by evaporating the solvent, alternatively by spray-drying.

Synthesis Scheme 10: Step (a) activator→post-metallocene precatalyst+support material F effective amount of kinetics modifier compound (simultaneous but separate additions of activator and kinetics modifier compound to mixture of post-metallocene precatalyst+support material) →attenuated post-metallocene catalyst disposed on (or in equilibrium with) support material. Step (b): none. In some aspects step (a) further includes an inert hydrocarbon solvent and deposition on the support material is performed by evaporating the solvent, alternatively by spray-drying.

Scheme 11: Step (a): activator (e.g., an alkylaluminoxane such as methylaluminoxane ("MAO"))+support material (e.g., hydrophobic fumed silica)+inert hydrocarbon solvent-→slurry of supported activator disposed on (or in equilibrium with) support material. Step (b): spray-dry slurry of step (a)→spray-dried supported activator disposed on support material in form of a dry powder (e.g., spray-dried MAO on hydrophobic fumed silica as dry powder ("SD-MAO" or "sdMAO"). Step (c): mix post-metallocene precatalyst+spray-dried supported activator of step (b)+inert hydrocarbon solvent→suspension of supported faster-light-off post-metallocene catalyst disposed on (or in equilibrium with) the support material. Step (d): mix suspension from step (c) with effective amount of a kinetics modifier compound→suspension of a supported attenuated post-metallocene catalyst disposed on (or in equilibrium with) the support material in inert hydrocarbon solvent. Optional step (e): remove inert hydrocarbon solvent from the suspension of supported attenuated post-metallocene catalyst→supported attenuated post-metallocene catalyst disposed on support material in the form of a dry powder. Step (e) may be performed by conventional evaporating of the inert hydrocarbon solvent from the suspension from step (d) or by spray-drying the suspension from step (d).

The multimodal catalyst system may be made fed into the gas-phase polymerization reactor. If desired an additional quantity of the attenuated post-metallocene catalyst or an additional quantity of the second catalyst (e.g., a metallocene catalyst) may be separately fed into the reactor as a solution thereof in an inert hydrocarbon solvent, wherein it contacts the multimodal catalyst system. Such a separate catalyst solution is sometimes called a trim catalyst. Alternatively, the multimodal catalyst system may be contacted with a feed of the trim catalyst in a feed line heading into the reactor. In other embodiments the multimodal catalyst system may be made in situ in a gas-phase polymerization reactor by adding the attenuated post-metallocene catalyst and at least one second catalyst separately into the reactor, wherein the contact each other, thereby making the multimodal catalyst system in situ in the reactor.

The method of any one of the above aspects may further comprise a step of transferring polymer granules, made in the gas-phase or slurry-phase polymerization reactor and containing in the granules fully-active post-metallocene catalyst, into a (second) gas-phase polymerization reactor.

Kinetics-modifier compound ("KMC"). The kinetics modifier compound of formula ($A^1$) is $R^5$—C≡C—$R^6$ ($A^1$). The kinetics modifier compound of formula ($B^1$) is $(R^5)_2$C=C=C$(R^6)_2$ ($B^1$). The kinetics modifier compound of formula ($C^1$) is $(R^5)(R^7)$C=C$(R^6)(R^7)$ ($C^1$). The kinetics-modifier compound of formula ($A^1$), ($B^1$), or ($C^1$) beneficially does not function as a poison to the post-metallocene catalyst or may at most function mildly as such. The compound of formula ($A^1$) is an alkyne, that of formula ($B^1$) is an allene, and that of formula ($C^1$) is an internal alkene. The kinetics modifier compound is free of a vinyl functional group (i.e., lacks a group of formula —C(H)=$CH_2$).

In some embodiments the kinetics modifier compound is as defined in any one of the above-described numbered aspects.

In some embodiments of the kinetics modifier compound of formula ($A^1$), ($B^1$), or ($C^1$), the ($C_1$-$C_{20}$)hydrocarbyl is ($C_2$-$C_6$)alkyl, ($C_3$-$C_8$)cycloalkyl, or phenyl. In some embodiments the —C(=O)—O-(unsubstituted $C_1$-$C_{20}$)hydrocarbyl) is —C(=O)—O-(unsubstituted $C_1$-$C_5$)alkyl), alternatively —C(=O)—O-ethyl.

In some embodiments at least one X is (($C_1$-$C_{20}$)alkyl)$_{3-g}$-(phenyl)$_g$Si— wherein subscript g is 0, 1, 2, or 3; alternatively wherein subscript g is 0 or 1; alternatively 0; alternatively 1. In some aspects at least one X is a ($C_6$-$C_{12}$)aryl-(($C_0$-$C_{10}$)alkylene)-$CH_2$ (e.g., benzyl). In some aspects each X is independently a ($C_6$-$C_{12}$)aryl-(($C_0$-$C_{10}$)alkylene)-$CH_2$, alternatively one X is a ($C_6$-$C_{12}$)aryl-(($C_0$-$C_{10}$)alkylene)-$CH_2$ (e.g., benzyl) and the other X is F, Cl, or methyl; alternatively each X is benzyl. In some aspects each X is benzyl, alternatively one X is a benzyl and the other X is F, Cl, or methyl. In some embodiments at least one X, alternatively each X is a ($C_1$-$C_6$)alkoxy-substituted ($C_6$-$C_{12}$)aryl or a ($C_1$-$C_6$)alkoxy-substituted benzyl. Without being bound by theory it is believed that the structure of the attenuated post-metallocene catalyst is similar to the structure of the faster-light-off catalyst except wherein one of the leaving groups X of the faster-light-off catalyst has been replaced by a attenuated-leaving group R in the attenuated post-metallocene catalyst wherein R is defined later and is derived from the kinetics modifier compound. Attenuated-leaving group R of the attenuated post-metallocene catalyst is structurally different than, and slower to leave than, the leaving group X of the faster-light-off catalyst.

Ligand R derived from the kinetics modifier compound. The ligand in the attenuated post-metallocene catalyst that is derived from the kinetics modifier compound may be the group R ("ligand R"). Without being bound by theory, the ligand R is believed to be primarily responsible for the improved kinetics profile of the attenuated post-metallocene catalyst (e.g., of formula (III)) relative to that of the faster-light-off catalyst (e.g., of formula (II)) from which it was made. The ligand R may be of formula (A), (B), or (C): —C($R^5$)=C(X)$R^6$ (A), —C($R^5$)$_2$—C(X)=C($R^6$)$_2$ (B), or —C($R^5$)($R^7$)—C(X)($R^6$)($R^7$) (C); wherein each of X and $R^5$ to $R^7$ is as described earlier. In some embodiments R is the ligand of formula (A) or (B), alternatively R is the ligand of formula (A) or (C), alternatively R is the ligand of formula (B) or (C), alternatively R is the ligand of formula (A), alternatively R is the ligand of formula (B), alternatively R is the ligand of formula (C). The ligands of formulas (A) and (B) both contain a carbon-carbon double bond, which is believed to be extremely slow to polymerize under the gas-phase polymerization conditions.

Not wishing to be bound by theory, reaction of an alkene monomer (e.g., ethylene, propylene, 1-butene, 1-hexene, 1-octene, etc.) with the attenuated-light off catalyst is believed to be by insertion of the alkene monomer into the bond between the M metal center and the attenuated-leaving group R. This insertion may be much slower than the corresponding insertion reaction of an alkene monomer into the bond between the M metal center and the leaving group X of the faster-light-off catalyst. The inventive slower reaction may delay the onset of polymerization. After the first one (or few) alkene monomer insertion reactions, the attenuated-leaving group R is no longer bonded to the metal center, so that all subsequent insertions occur at a similar rate to that of the faster light-off catalyst. Because only the first one (or few) of the thousands or millions of insertion reactions that a catalyst performs are slowed, the overall catalyst productivity may not be significantly reduced. In fact, the attenuated-light off catalyst may have increased productivity because its exotherm is decreased relative to the exotherm of the faster-light-off catalyst. This is because an exothermic reaction that increases the temperature experienced by a catalyst may lead to faster deactivation of the catalyst, which deactivation can decrease productivity for some catalysts, such as some post-metallocene catalysts.

In the ligand R of formula (A), (B), or (C), each of $R^5$ and $R^6$ independently is H or $R^7$, and wherein each $R^7$ independently is a ($C_1$-$C_{20}$)hydrocarbyl or a ($C_1$-$C_{17}$)heterohydrocarbyl with the proviso that each $R^7$ lacks a carbon-carbon double bond. The ($C_1$-$C_{20}$)hydrocarbyl may be unsubstituted and consist of carbon atoms and hydrogen atoms or the ($C_1$-$C_{20}$)hydrocarbyl may be substituted and consist of carbon, hydrogen, and one or more halogen atoms. Each halogen atom is independently selected from F, Cl, Br, and I; alternatively from F, Cl, and Br; alternatively from F and Cl; alternatively from F; alternatively from Cl. The unsubstituted ($C_1$-$C_{20}$)hydrocarbyl may be an unsubstituted ($C_1$-$C_{20}$)alkyl, an unsubstituted ($C_3$-$C_{20}$)cycloalkyl, an unsubstituted ($C_6$-$C_{12}$)aryl, an unsubstituted (($C_1$-$C_4$)alkyl)$_{1-3}$-phenyl, or an unsubstituted ($C_6$-$C_{12}$)aryl-($C_1$-$C_6$)alkyl. The substituted ($C_1$-$C_{20}$)hydrocarbyl may be a monofluoro or difluoro derivative of the aforementioned unsubstituted ($C_1$-$C_{20}$)hydrocarbyl, such as 2-(3,4-difluorophenyl)-ethen-1-yl (of formula (A)).

Each ($C_1$-$C_1$ g)heterohydrocarbyl, of embodiments of $R^5$ to $R^7$ containing same, may be unsubstituted and consist of carbon atoms, hydrogen atoms, and at least one heteroatom selected from N and O or the ($C_1$-$C_{17}$)heterohydrocarbyl may be substituted and consist of carbon atoms, hydrogen atoms, at least one heteroatom selected from N and O, and one or more halogen atoms. The unsubstituted ($C_1$-$C_{17}$)heterohydrocarbyl may be ($C_1$-$C_{19}$)heteroalkyl, ($C_3$-$C_{19}$)heterocycloalkyl, ($C_6$-$C_{12}$)heteroaryl, (($C_1$-$C_4$)alkoxy)$_{1-3}$-phenyl, or ($C_6$-$C_{12}$)heteroaryl-($C_1$-$C_6$)alkyl. The substituted ($C_1$-$C_{17}$)heterohydrocarbyl may be a monofluoro or difluoro derivative of the aforementioned unsubstituted ($C_1$-$C_{17}$) heterohydrocarbyl, such as 2-(3,4-dimethoxyphenyl)-ethen-1-yl (of formula (A)).

The structure of ligand R is different than that of ligand X and, for that matter, that of anion $A^-$.

The attenuated post-metallocene catalyst. The attenuated post-metallocene catalyst (e.g., of formula (III)) is made from the faster-light-off catalyst (e.g., of formula (II)) according to the method. The attenuated post-metallocene catalyst is a post-metallocene catalyst that contains bonded to its metal atom M (e.g., Ti, Zr, or Hf) a ligand (e.g., R) derived from the kinetics modifier compound. The attenuated post-metallocene catalyst is a new post-metallocene catalyst. In some embodiments the attenuated post-metallocene catalyst is the attenuated post-metallocene catalyst of formula (III).

It is believed that all other things being equal the attenuated post-metallocene catalyst (e.g., of formula (III)) may work without significantly decreasing the overall catalytic activity relative to that of the faster-light-off catalyst (e.g., of formula (II)) from which it was made. That is, despite delaying on-set, the catalyst's activity/polymerization productivity, expressed as number of grams dried polyolefin product made per gram of catalyst added to reactor-hour (gPE/gcat-hr), may not be significantly less than, and in some embodiments may be more than, that of the faster-light-off post-metallocene catalyst. For example, the attenuated post-metallocene catalyst may have greater than 200%, alternatively from 70.0% to 180.0%, alternatively from 70.0% to 150.0%, alternatively from 70.0% to 120%, alternatively from 80.0% to 120%, alternatively from 90.0% to 120%, alternatively from 100.0% to 120%, alternatively from 110% to 120%, alternatively from 70.0% to 110%, alternatively from 80.0% to 110%, alternatively from 90.0% to 110%, alternatively from 100.0% to 110%, alternatively from 70.0% to ≤ 100%, alternatively from 80.0% to ≤ 100%, alternatively from 90.0% to ≤100%, of the productivity of the faster light-off catalyst from which it is made.

It is believed that the attenuated post-metallocene catalyst of formula (III) may inhibit catalyst light-off and beneficially improve gas-phase reactor operability by decreasing rate of fouling and increasing time between reactor shutdowns relative to the faster-light-off catalyst (e.g., of formula (II)) from which it was made.

It is believed that attenuated post-metallocene catalyst (e.g., of formula (III)) may present an improved polymerization kinetics profile than that of the faster-light-off catalyst of formula (II) from which it was made. This improved polymerization kinetics profile would beneficially increase compatibility of the attenuated post-metallocene catalyst (e.g., of formula (III)) with slower-light-off olefin polymerization catalysts, such as some metallocene catalysts, and improve performance of the resulting light-off-compatible multimodal (e.g., bimodal or trimodal) catalyst system, relative to that of the faster-light-off catalyst (e.g., of formula (II)) from which it was made.

Additionally, it is believed that the attenuated post-metallocene catalyst (e.g., of formula (III)) may be stored and transported at ambient temperature, instead of at cold storage and cold transportation desired for the faster-light-off catalyst (e.g., of formula (II)) from which it was made, until the former can be used in a chemical process. It is believed that the attenuated post-metallocene catalyst (e.g., of formula (III)) may achieve any one or a combination of any two or more such benefits.

In some embodiments the attenuated post-metallocene catalyst (e.g., of formula (III)), and the method of polymerizing an olefin monomer, are free of excess amount of kinetics-modifier compound (KMC) of formula ($A^1$), ($B^1$), or ($C^1$). In other embodiments the attenuated post-metallocene catalyst and method have an excess amount of the kinetics modifier compound. Such embodiments of the attenuated post-metallocene catalyst (e.g., of formula (III)) may be made by combining the faster-light-off catalyst (e.g., of formula (II)) with a molar ratio of moles of the kinetics modifier compound to moles of metal M of formula (II) of from greater than 0 to 1.0, alternatively from 1.1 to 50, alternatively from 0.5 to 40, alternatively from 0.5 to 30, alternatively from 0.5 to 20, alternatively from 0.5 to 10, alternatively from 0.5 to 2, alternatively from 0.8 to 1.2, alternatively from 0.9 to 1.1 (e.g., 1.0). In such embodiments the kinetics-modifier compound of formula ($A^1$), ($B^1$), or ($C^1$) is used at a stoichiometric amount (molar ratio 1.0) or less than a stoichiometric amount (molar ratio from >0 to 0.99). When the kinetics-modifier compound is used at a less than stoichiometric amount, the resulting attenuated post-metallocene catalyst (e.g., of formula (III)) has partially attenuated light-off activity relative to that of the faster-light-off catalyst (e.g., of formula (II)) from which it was made. The partially attenuated light-off activity may be helpful when the faster-light-off catalyst (e.g., of formula (III)) is only mildly overactive. Generally, the higher the molar ratio of moles of the kinetics modifier compound to moles of metal M (e.g., of formula (II)), the greater the attenuation of the overactivity of the faster-light-off catalyst (e.g., of formula (II)).

In some embodiments the attenuated post-metallocene catalyst (e.g., of formula (III)), and the method of polymerizing an olefin monomer, contain an excess amount of kinetics-modifier compound (KMC) of formula ($A^1$), ($B^1$), or ($C^1$). Such embodiments of the attenuated post-metallocene catalyst (e.g., of formula (III)) may be made by combining the faster-light-off catalyst (e.g., of formula (II)) with a molar ratio of moles of the kinetics modifier compound to moles of metal M of formula (II) of greater than 1.0, e.g., KMC/M molar ratio from 1.1 to 50, alternatively from 1.1 to 40, alternatively from 1.1 to 30, alternatively from 1.1 to 20, alternatively from 1.1 to 10; alternatively from 2 to 20; alternatively greater than 20. Remarkably in some embodiments, even when the kinetics-modifier compound is used in an excess amount within the foregoing ranges (KMC/M molar ratio up to about 50), the catalytic activity of the attenuated post-metallocene catalyst (e.g., of formula (III)) and/or productivity of the gas-phase polymerization reaction using same may not be significantly decreased, and may be increased, relative to those of faster-light-off catalyst (e.g., of formula (II)) from which it was made. In other embodiments when the kinetics-modifier compound is used in an excess amount, the catalytic activity of the attenuated post-metallocene catalyst (e.g., of formula (III)) and/or productivity of the gas-phase polymerization reaction using same may be significantly decreased relative to those of faster-light-off catalyst (e.g., of formula (II)) from which it was made. Although the reason for the decrease is not understood, it might be possible that excess kinetics-modifier compound may compete with alkene monomer for displacing the attenuated-leaving group R of formula (III) in equilibrium fashion. Using an excess amount of the kinetics-modifier compound may be helpful when the exact molar amount of metal M of the faster-light-off catalyst (e.g., of formula (II)) is not precisely known or may vary from lot to lot thereof.

Attenuated-light-off kinetics profile. The attenuated post-metallocene catalyst (e.g., of formula (III)) exhibits an attenuated light-off kinetics profile. For example, the attenuated kinetics profile may comprise the length of time to peak reaction temperature $Temp_{peak}$ for the attenuated post-metallocene catalyst is longer and/or the value of $T_{max}$ is lower relative to that of the faster-light-off catalyst from which it was made. A longer time of at least 0.65 minute from an injection of catalyst (Time zero ($Time_0$)) into a reactor containing olefin monomer but no catalyst to time at which peak polymerization reaction temperature is reached ($Temp_{peak}$). The greater the value of $Temp_{peak}$, the greater the delay in catalyst light-off.

For comparing light-off times of different catalysts, use the same olefin monomer (e.g., 1-octene) and the same reactor. For rapid catalyst screening, use a 40-mL glass vial as the reactor and the Light-Off Vial Test Method described later as the test method.

Effective amount of the kinetics modifier compound (KMC). A quantity of kinetics modifier compound (KMC) sufficient to attenuate light-off of catalyst. The effective amount of KMC may be expressed in absolute terms compared to the amount of (pre)catalyst metal M or in relative terms compared to the attenuated light-off performance or as a combination thereof.

In absolute terms in some embodiments the effective amount of the kinetics modifier compound may be expressed as a molar ratio of moles of kinetics modifier compound to moles of metal M ("$KMC_{mol}/M_{mol}$"), wherein M is the M of the post-metallocene precatalyst of structural formula (I), e.g., M is a Group 4 metal. In some embodiments the effective amount of the KMC is expressed as a $KMC_{mol}/M_{mol}$ of ≥0.50/1.0, alternatively ≥0.9/1.0; alternatively ≥1.0/1.0; alternatively ≥1.5/1.0; alternatively ≥1.9/1.0; alternatively ≥3/1.0; alternatively ≥5/1.0; alternatively ≥6/1.0; alternatively ≥9/1.0; alternatively ≥10.0/1.0, alternatively ≤10.0/1.0, alternatively ≤20.0/1.0, alternatively ≤30.0/1.0, alternatively ≤40.0/1.0, alternatively ≤50.0/1.0. Said another way, the immediately foregoing embodiments may be described by expressing the effective amount of the KMC as an inverse molar ratio of moles of metal M to moles of kinetics modifier compound ("$M_{mol}/KMC_{mol}$") as follows: ≤1.0/0.5; alternatively ≤1.0/0.9; alternatively ≤1.0/1.0; alternatively ≤1.0/1.5; alternatively ≤1.0/1.9; alternatively ≤1.0/3.0; alternatively ≤1.0/5.0; alternatively ≤1.0/6.0; alternatively ≤1.0/9.0; alternatively ≤1.0/10.0, alternatively ≤1.0/20.0, alternatively ≤1.0/30.0, alternatively ≤1.0/40.0, alternatively ≤1.0/50.0, respectively. Generally it is believed that $KMC_{mol}/M_{mol}$ higher than about 50/1.0 may undesirably prevent light-off or functioning of a post-metallocene catalyst containing same. For practical reasons, however (e.g., cost of KMC and/or post-polymerization processing operations/costs (e.g., stripping of excess KMC from a polyolefin resin)), in some embodiments the $KMC_{mol}/M_{mol}$ is limited to at most 40/1; alternatively at most 30/1; alternatively at most 20/1; alternatively at most 10.0; alternatively at most 6.0; alternatively at most 5.0.

In relative terms of attenuated light-off performance, the effective amount of the kinetics modifier compound (KMC) may be expressed by a result measured by the Light-off Vial Test Method described later. For example, as separately measured by the Light-off Vial Test Method described later, with the attenuated post-metallocene catalyst and the faster-light-off post-metallocene catalyst from which it was made with the kinetics modifier compound; the effective amount of the kinetics modifier compound (KMC) may have any one of features (i) to (xii) is observed after catalyst injection: (i) a time delay in start of exotherm, i.e., reaction temperature rise (i.e., a greater length of time in minute(s) from addition time zero (Time0) to start of temperature exotherm time ($Time_{exo}$)); (ii) a slower maximum rate of increase in degrees Celsius per minute (° C./min.) in reaction temperature (e.g., a lower maximum slope in a plot of reaction temperature on y-axis versus time post injection of catalyst on the x-axis); (iii) a lower peak reaction temperature reached ($Temp_{peak}$) in ° C.; (iv) a longer time of at least 0.65 minute from addition time at $Time_0$ to Time Peak Temperature ($Time_{peak\ T}$); (v) both (i) and (ii) but not (iii) or (iv); (vi) both (i) and (iii) but not (ii) or (iv); (vii) both (ii) and (iii) but not (i) or (iv); (viii) both (i) and (iv) but not (ii) and (iii); (ix) both (ii) and (iv) but not (i) or (iii); (x) both (iii) and (iv) but not (i) or (ii); (xi) any three of (i) to (iv); and (xii) each of (i) to (iv). In some embodiments the attenuated-light-off and the effective amount of the KMC is characterized by at least feature (iv), alternatively by feature (iv) only. In some embodiments the longer time of feature (iv) is a time of at least 0.65 minute (39 seconds or longer) from addition time at $Time_0$ to Time Peak Temperature ($Time_{peakT}$) of at least 0.65 minute; alternatively at least 1.0 minute; alternatively at least 1.5 minutes; alternatively from 1.5 minute to 55 minutes; alternatively from 1.6 to 100 minutes; alternatively from 1.6 to 55 minutes; alternatively from 1.6 to 10.0 minutes; alternatively from 10.1 to 20.0 minutes; alternatively from 20.1 to 30.0 minutes; alternatively from 30.1 to 40.0 minutes; alternatively from 40.1 to 50.0 minutes; alternatively from 50.1 to 55 minutes alternatively from 2.0 to 29 minutes; alternatively from 30.1 to 50.4 minutes; all measured according to the Light-off Vial Test Method described later. In some embodiments the attenuated-light-off and the effective amount of the KMC is characterized by feature (viii). In some embodiments the attenuated-light-off is characterized by feature (ix). In some embodiments the attenuated-light-off and the effective amount of the KMC is characterized by feature (x). In some embodiments the attenuated-light-off is characterized by feature (xi).

The delay in time for reaching $Temp_{max}$ by the attenuated post-metallocene catalyst relative to the time for reaching $Temp_{max}$ by the faster-light-off catalyst may be from 0.70 minute to 500 minutes (e.g., an example is 293 minutes), alternatively from 0.70 minute to 120 minutes, alternatively from 1.0 to 120 minutes, alternatively from 5 to 90 minutes, alternatively from 10 to 70 minutes.

In some embodiments the kinetics profile of the attenuated post-metallocene catalyst may be characterized as a decrease in peak temperature ($Temp_{peak}$) (° C.) relative to the $Temp_{max}$ of the faster-light-off catalyst from which it was made when run under the same polymerization conditions according to the Light-Off Batch Reactor Test Method described later. In the Light-Off Batch Reactor Test Method the $Temp_{max}$ of the attenuated post-metallocene catalyst may be from 1° to 16° C., alternatively from 2° to 15° C., alternatively 3° to 14° C. lower than the $T_{max}$ of the faster-light-off catalyst from which it was made. In some embodiments the faster-light-off post-metallocene catalyst is that made from any one of the post-metallocene precatalysts (1) to (10) described earlier.

In some embodiments the kinetics profile of the attenuated post-metallocene catalyst may be characterized as an absolute weight/weight ratio of ethylene (02) uptake after 1 hour (h) to 02 uptake after 0.1 hour ($C_2(1\ h)/C_2(0.1\ h)$). In some embodiments the attenuated post-metallocene catalyst may have a $C_2(1\ h)/C_2(0.1\ h)$ ratio from 2.1 to 11, alternatively from 2.2 to 10.4, alternatively from 2.4 to 10.0, alternatively from 3 to 9.9. In some embodiments the faster-light-off post-metallocene catalyst is that made from any one of the post-metallocene precatalysts (1) to (10) described earlier.

In some embodiments the kinetics profile of the attenuated post-metallocene catalyst may be characterized as a relative $C_2(1\ h)/C_2(0.1\ h)$ ratio of $C_2(1\ h)/C_2(0.1\ h)$ ratio of the attenuated post-metallocene catalyst to the $C_2(1\ h)/C_2(0.1\ h)$ ratio of the faster-light-off catalyst from which it was made when run under the same polymerization conditions according to the Light-Off Batch Reactor Test Method described later. The relative $C_2(1\ h)/C_2(0.1\ h)$ ratio may be from 1.05 to 6, alternatively from 1.1 to 6, alternatively from 1.2 to 5.4, alternatively from 1.5 to 5.0.

An alternative or additional way of expressing the effective amount of the kinetics modifier compound (KMC) in relative terms of attenuated light-off performance, as measured by the Light-off Vial Test Method described later, may be a sufficient quantity of KMC such that the attenuated post-metallocene catalyst and the faster-light-off catalyst from which it is made may have light-off profiles as measured by the Light-Off Vial Test Method (described later) wherein the times of their respective peak polymerization temperatures $Temp_{peak}$ are at least 0.7 minute, alternatively greater than 1.0 minute, alternatively greater than 5 minutes, alternatively greater than 10.0 minutes, alternatively greater than 20.0 minutes, alternatively greater than 30.0 minutes, alternatively greater than 40.0 minutes, alternatively greater than 50.0 minutes of each other. The attenuated post-metallocene catalyst and the faster-light-off catalyst from which it is made may have light-off profiles as measured by the Light-Off Vial Test Method (described later) wherein the times of their respective peak polymerization temperatures $Temp_{peak}$ are within 60 minutes, alternatively within 45 minutes, alternatively within 30 minutes of each other. The effect of the kinetics modifier compound on delaying the time of peak polymerization temperature $Temp_{peak}$ for the attenuated post-metallocene catalyst relative to the time $Temp_{peak}$ of the of the faster-light-off post-metallocene catalyst from which it is made may differ depending upon (a) the attenuated post-metallocene catalyst's structural class (e.g., formula (Ia), (Ib), (Ic)) or structural subclass (e.g., formula (Ia) 1 versus (Ia)-2; or formula (Ib)-1 versus (Ib)-2; or formula (Ic)-1) and/or (b) the structural class (e.g., acetylenes, allenes, or internal alkenes) or structural subclass (e.g., arylacetylenes versus alkylacetylenes; or monoacetylenes versus diacetylenes or triacetylenes; or acyclic allenes versus cycloalkylallenes versus vinylidene allenes; or aryltype internal alkenes versus alkyl-type internal alkenes) of the kinetics modifier compound. In some aspects any one of the endpoints for a range of the time difference between the $Temp_{peak}$ of the attenuated post-metallocene catalyst and the $Temp_{peak}$ of the faster-light-off post-metallocene catalyst from which it is made may be based on the data given later in the Examples.

In some embodiments the kinetics profile of the attenuated post-metallocene catalyst may be characterized as a combination of any two, alternatively all but any one, alternatively each of the foregoing embodiments.

Comparative or non-inventive examples either do not contain any kinetics modifier compound or contain less than the effective amount of the kinetics modifier compound.

Catalyst activity. Catalyst activity of the attenuated post-metallocene catalyst (e.g., of formula (III)) is determined to be substantially the same as catalyst activity of the faster-light-off catalyst if the peak polymerization reaction temperature is reached ($Temp_{peak}$) in degrees Celsius (° C.) for the attenuated post-metallocene catalyst is within ±5° C., alternatively ±4° C., alternatively ±3° C., alternatively ±2° C., alternatively ±1° C. of the $T_p$ of the faster-light-off catalyst, as measured by the Light-Off Vial Test Method. Or catalyst activity is determined to be the catalyst's activity/polymerization productivity, expressed as number of grams dried polyolefin product made per gram of catalyst added to reactor-hour (gPE/gcat-hr), and all other things being equal may not be significantly less than, and in some embodiments may be more than, that of the faster-light-off post-metallocene catalyst.

The faster-light-off catalyst. Embodiments of the faster-light-off catalyst (e.g., of formula (II)) may be in need of attenuation of light-off kinetics for slurry-phase and/or gas-phase polymerization of 1-alkene monomer) for the reasons described above. The same or other embodiments of the faster-light-off catalyst (e.g., of formula (II)) may be in need of the ligand R for different reasons such as for altering solubility of the catalyst in alkane(s) solvent or for NMR studies of post-metallocene catalyst structures and improving catalyst structure design.

Anion $A^-$. The faster-light-off post-metallocene catalyst (e.g., of formula (II)) and the attenuated post-metallocene catalyst (e.g., of formula (III)) may each contain an anion $A^-$ derived from the activator used to make the faster-light-off post-metallocene catalyst from the post-metallocene precatalyst of formula (I) or derived from the leaving group X. The activator functions to activate the post-metallocene precatalyst of formula (I) by abstracting therefrom a leaving group X to give the faster-light-off post-metallocene catalyst (e.g., of formula (II)) and the anion $A^-$. The resulting activated post-metallocene catalyst, i.e., the faster-light-off post-metallocene catalyst of formula (II), is conventionally drawn showing the metal atom M with a positive charge. This positive charge indicates a catalytic site to which an olefin monomer may bond during a polymerization reaction. The anion $A^-$ formally balances the positive charge such that the faster-light-off post-metallocene catalyst (e.g., of formula (II)) and the attenuated post-metallocene catalyst (e.g., of formula (III)) made therefrom are overall neutral.

The nature of anion $A^-$ in the faster-light-off post-metallocene catalyst (e.g., of formula (II)) and the attenuated post-metallocene catalyst (e.g., of formula (III)) is not believed to be important. As mentioned, it may be an anionic derivative of X (i.e., $X^-$) or an anion derivative of the activator. When the activator is an alkylaluminoxane and anion $A^-$ is the anion derivative thereof, the anion $A^-$ may be an alkylaluminoxane anion; alternatively, when the activator is an organoborane compound and anion $A^-$ is the anion derivative thereof, the anion $A^-$ may be an organoborane anion; alternatively when the activator is an organoborate compound and anion $A^-$ is the anion derivative thereof, the anion $A^-$ an organoborate anion. The anion $A^-$ is formed during the activating step of aspect 1. It is believed that the anion $A^-$ in the faster-light-off post-metallocene catalyst (e.g., of formula (II)) is carried through the combining step such that the anion $A^-$ in attenuated post-metallocene catalyst (e.g., of formula (III)) may be the same as the anion $A^-$ in faster-light-off catalyst. Nevertheless, the anion $A^-$ in the attenuated post-metallocene catalyst (e.g., of formula (III)) may be the same as or different than the anion $A^-$ in the faster-light-off post-metallocene catalyst (e.g., of formula (II)). For example, the anion $A^-$ in the faster-light-off post-metallocene catalyst (e.g., of formula (II)) may be an anionic derivative of the activator, and the anion $A^-$ in the attenuated post-metallocene catalyst (e.g., of formula (III)) may be $X^-$.

Catalyst structures. Without being bound by theory it is believed that the molecular structure of the faster-light-off post-metallocene catalyst of formula (II) and the molecular structure of the attenuated post-metallocene catalyst of formula (III) may be determined by conventional analytical methods such as nuclear magnetic resonance (NMR) spectroscopy or gas chromatography/mass spectrometry (GC/MS). The structure of the ligand R in formula (III) may be determined by quenching an NMR sample of the attenuated post-metallocene catalyst of formula (III) with a protic solvent such as isopropanol, $CH_3OH$ or $H_2O$, a partially deuterated protic solvent such as isopropyl-OD, $CH_3OD$ or HDO, or a perdeuterated protic solvent, such as perdeuterated isopropanol $(CD_3)_2C(D)OD)$ perdeuterated methanol $(CD_3OD)$ or $D_2O$, to give a by-product of formula H—R or D-R, and analyzing the structure of the by-product by NMR such as proton NMR ($^1$H-NMR) or gas chromatography/mass spectrometry (GC/MS).

Activating step. In some embodiments the method of making the attenuated post-metallocene catalyst (e.g., of formula (III)) further comprises the activating step as a preliminary step, which may be completed before start of the combining step. The activating step comprises contacting the precatalyst of formula (I) with the activator under the effective activating conditions that make the faster-light-off post-metallocene catalyst. The activating step may be performed in the absence of the kinetics modifier compound.

Activator. The activator for activating the post-metallocene precatalyst of formula (I) may be an alkylaluminoxane, an organoborane compound, an organoborate compound, or a trialkylaluminum compound. The activator may also be a combination of any two or more thereof. For example the activator may comprise an alkylaluminoxane and an organoborate compound such as a methylaluminoxane and an organoborate having CAS name Amines, bis(hydrogenated tallow alkyl)methyl, tetrakis(pentafluorophenyl)borate (Amines, bis(hydrogenated tallow alkyl)methyl, tetrakis (pentafluorophenyl)borate(1−)). The activator for activating a cyclopentadienyl-containing ligand-metal (Ti, Zr, or Hf) complex to give the metallocene catalyst may be the trialkylaluminum compound.

Alkylaluminoxane: also referred to as alkylalumoxane. A product of a partial hydrolysis of a trialkylaluminum compound. Embodiments may be a $(C_1-C_{10})$alkylaluminoxane, alternatively a $(C_1-C_6)$alkylaluminoxane, alternatively a $(C_1-C_4)$alkylaluminoxane, alternatively a $(C_1-C_3)$alkylaluminoxane, alternatively a $(C_1-C_2)$alkylaluminoxane, alternatively a methylaluminoxane (MAO), alternatively a modified-methylaluminoxane (MMAO). In some aspects the alkylaluminoxane is a MAO. In some embodiments the alkylaluminoxane is supported on untreated silica, such as fumed silica. The alkylaluminoxane may be obtained from a commercial supplier or prepared by any suitable method. Suitable methods for preparing alkylaluminoxanes are well-known. Examples of such preparation methods are described in U.S. Pat. Nos. 4,665,208; 4,952,540; 5,091,352; 5,206, 199; 5,204,419; 4,874,734; 4,924,018; 4,908,463; 4,968, 827; 5,308,815; 5,329,032; 5,248,801; 5,235,081; 5,157, 137; 5,103,031; 5,391,793; 5,391,529; and 5,693,838; and in European publications EP-A-0 561 476; EP-B1-0 279 586; and EP-A-0 594-218; and in PCT publication WO 94/10180.

The maximum amount of alkylalumoxane may be selected to be a 5,000-fold molar excess over the precatalyst based on the molar ratio of moles of Al metal atoms in the aluminoxane to moles of metal atoms M (e.g., Ti, Zr, or Hf) in the precatalyst. The minimum amount of activator-to-precatalyst may be a 1:1 molar ratio (Al/M). The maximum may be a molar ratio of Al/M of 150, alternatively 124.

The organoborane compound. A tri(fluoro-functional organo)borane compound ((fluoro-organo)$_3$B) such as tris (pentafluorophenyl)borane $((C_6F_5)_3B)$, tris[3,5-bis(trifluoromethyl)phenyl]borane $((3,5-(CF_3)_2—C_6H_3)_3B)$, or a mixture of any two or more thereof.

The organoborate compound. A tetra(fluoro-functional organo)borate compound((fluoro-organo)$_4$B) such as N,N-dimethylanilinium tetrakis(pentafluorophenyl)borate, triphenylcarbenium tetrakis(pentafluorophenyl)borate, N,N-dimethylanilinium tetrakis[3,5-bis(trifluoromethyl)phenyl] borate, or triphenylcarbenium tetrakis[3,5-bis (trifluoromethyl)phenyl]borate, or a mixture of any two or more thereof. The organoborate compound may be a methyldi(($C_{14}$-$C_{18}$)alkyl)ammonium salt of tetrakis(pentafluorophenyl)borate, which may be obtained from Boulder Scientific or prepared by reaction of a long chain trialkylamine (Armeen™ M2HT, available from Akzo-Nobel, Inc.) with HCl and Li[B($C_6F_5$)$_4$]. Such a preparation is disclosed in U.S. Pat. No. 5,919,983, Ex. 2. The organoborate compound may be used herein without (further) purification. Also, Amines, bis(hydrogenated tallow alkyl)methyl, tetrakis (pentafluorophenyl)borate.

Trialkylaluminum compounds may be utilized as activators for precatalyst (metallocene precatalyst) or as scavengers to remove residual water from polymerization reactor prior to start-up thereof. Examples of suitable alkylaluminum compounds are trimethylaluminum, triethylaluminum, triisobutylaluminum, tri-n-hexylaluminum, and tri-n-octylaluminum.

The activator, also known as a cocatalyst, may affect the molecular weight, degree of branching, comonomer content, or other properties of the polyolefin polymer. The activator may enable coordination polymerization or cationic polymerization.

Without being bound by theory it is believed that the choice of activator used to activate the faster-light-off post-metallocene catalyst does not influence the structure of the attenuated post-metallocene catalyst made from the faster-light-off post-metallocene catalyst. That is, considering just the cation portion of formula (III) (i.e., ignoring the anion A$^-$), the structures of attenuated post-metallocene catalysts made using different activators are expected to be identical. The structures of unsupported attenuated post-metallocene catalysts may be easier to determine by NMR than those of supported attenuated post-metallocene catalysts due to the heterogeneous nature of the latter (typical support materials do not dissolve in NMR solvents).

In some embodiments the choice of A$^-$ may have additional effects on the kinetics profile of the attenuated post-metallocene catalyst. Any such effects of A$^-$, however, will not completely eliminate the beneficial effect(s) of the kinetics modifier compound on the kinetics profile of the attenuated post-metallocene catalyst.

Effective conditions. The reactions described herein (e.g., the combining step, the activating step, the polymerization) independently are conducted under circumstances that allow the reaction to proceed. Examples of effective conditions are reaction temperature, type of atmosphere (e.g., inert atmosphere), purity of reactants, stoichiometry of reactants, agitation/mixing of reactants, and reaction time period. Conditions effective for activating and polymerizing steps may be those described in the art and well-known to the ordinary skilled person. For example, activating effective conditions may comprise techniques for manipulating catalysts such as in-line mixers, catalyst preparation reactors, and polymerization reactors. The activation temperature may be from 20° to 800° C., alternatively from 300° to 650° C. The activation time may be from 10 seconds to 2 hours. Examples of gas-phase polymerizing conditions are described later herein. Effective conditions for the combining step used to make the attenuated post-metallocene catalyst may comprise a reaction temperature from −50° to 30° C., an inert atmosphere (e.g., nitrogen, helium, or argon gas free of water and 02), reactants that are free of water and 02 and having a purity from 90% to 100%, amounts of reactants for minimizing waste/maximizing product yield, stirring or mixing reactants, and a reaction time period from 1 minute to 24 hours.

Effective reaction conditions for making the post-metallocene precatalyst of formula (IV). Such conditions may comprise techniques for manipulating air-sensitive and/or moisture-sensitive reagents and reactants such as Schlenk-line techniques and an inert gas atmosphere (e.g., nitrogen, helium, or argon). Effective reaction conditions may also comprise a sufficient reaction time, a sufficient reaction temperature, and a sufficient reaction pressure. Each reaction temperature independently may be from −78° to 120° C., alternatively from −30° to 30° C. Each reaction pressure independently may be from 95 to 105 kPa, alternatively from 99 to 103 kPa. Progress of any particular reaction step may be monitored by analytical methods such as nuclear magnetic resonance (NMR) spectroscopy, mass spectrometry to determine a reaction time that is effective for maximizing yield of intended product. Alternatively, each reaction time independently may be from 30 minutes to 48 hours.

The post-metallocene precatalyst of formula (I). The precatalyst of formula (I) may be synthesized according to methods known in the art, including those methods referenced above. Alternatively, the post-metallocene precatalyst may be obtained from a precatalyst supplier such as Boulder Scientific.

Polyolefin polymer made by the method of polymerizing. When the 1-alkene monomer is the combination of ethylene and propylene, the polyolefin polymer made therefrom is an ethylene/propylene copolymer. When the 1-alkene monomer is ethylene alone, the polyolefin polymer made therefrom is a polyethylene homopolymer. When the 1-alkene monomer is the combination of ethylene and 1-butene, 1-hexene, or 1-octene, the polyolefin polymer made therefrom is a poly (ethylene-co-1-butene) copolymer, a poly(ethylene-co-1-hexene) copolymer, or a poly(ethylene-co-1-octene) copolymer. In some embodiments the polyolefin polymer made from the 1-alkene monomer is an ethylene-based polymer having from 50 to 100 weight percent (wt %) repeat units derived from ethylene and from 50 to 0 wt % repeat units derived from a 1-alkene monomer selected from propylene, 1-butene, 1-hexene, 1-octene, and the combination of any two or more thereof.

In some embodiments the polymerization method uses the 1-alkene monomer and a comonomer that is a diene monomer (e.g., 1,3-butadiene). When the 1-alkene monomer is a combination of ethylene and propylene and the polymerization also uses a diene monomer, the polyolefin polymer is an ethylene/propylene/diene monomer (EPDM) copolymer. The EPDM copolymer may be an ethylene/propylene/1,3-butadiene copolymer.

The multimodal (e.g., bimodal or trimodal) catalyst system. The bimodal catalyst system comprises the attenuated post-metallocene catalyst and at least one other olefin polymerization catalyst selected from a different attenuated post-metallocene catalyst, a post-metallocene catalyst, and a metallocene catalyst. The multimodal catalyst system makes in a single reactor a multimodal polyethylene composition comprising an HMW polyethylene component and a LMW polyethylene component. Some of the problems relate to unwanted gels in a post-reactor melt-blended multimodal (e.g., bimodal or trimodal) polyethylene composition. Other problems relate to transition complexity and stability of the multimodal (e.g., bimodal or trimodal) catalyst system. Even in the absence of gels, there may be problems due to variability in settling of different size catalyst particles. In some aspects variability in melt index (12) may be measured as a function of particle size instead of using gel measurements.

The method of making the attenuated post-metallocene catalyst may be performed in the presence of the metallocene catalyst or a metallocene precatalyst. When performed in the presence of the metallocene precatalyst, the method of activating the precatalyst of formula (I) with an activator further comprises activating the metallocene precatalyst with a same or different activator. Typically, the method of making the attenuated post-metallocene catalyst is performed in the absence of a metallocene (pre)catalyst.

The metallocene catalyst. The metallocene catalyst may be made from any one of the metallocene precatalyst components described in U.S. Pat. No. 7,873,112B2, column 11, line 17, to column 22, line 21. In some aspects the metallocene catalyst is made from a metallocene precatalyst species named in U.S. Pat. No. 7,873,112B2, column 18, line 51, to column 22, line 5. In some aspects the metallocene precatalyst is selected from bis($\eta^5$-tetramethylcyclopentadienyl)zirconium dichloride; bis($\eta^5$-tetramethylcyclopentadienyl)zirconium dimethyl; bis($\eta^5$-pentamethylcyclopentadienyl)zirconium dichloride; bis($\eta^5$-pentamethylcyclopentadienyl)zirconium dimethyl; (1,3-dimethyl-4,5,6,7-tetrahydroindenyl)(1-methylcyclopentadienyl)zirconium dimethyl; bis(1-methyl-3-n-butylcyclopentadienyl)zirconium dichloride; bis(1-methyl-3-n-butylcyclopentadienyl)zirconium dimethyl; bis (n-propylcyclopentadienyl)hafnium dichloride; bis(n-propylcyclopentadienyl)hafnium dimethyl; bis(n-butylcyclopentadienyl)zirconium dichloride; (cyclopentadienyl)(1,5-dimethylindenyl)zirconium dimethyl; (methylcyclopentadienyl)(1,5-dimethylindenyl)zirconium dimethyl; (cyclopentadienyl)(1,4-dimethylindenyl)zirconium dimethyl; (methylcyclopentadienyl)(1,4-dimethylindenyl)zirconium dimethyl; and bis(n-butylcyclopentadienyl)zirconium dimethyl. In some aspects the metallocene catalyst is a product of an activation reaction of an activator and any one of the aforementioned metallocene precatalysts.

Unsupported or supported catalyst. The post-metallocene precatalyst of formula (I), the faster-light-off post-metallocene catalysts such as the faster-light-off catalyst of formula (II), the attenuated post-metallocene catalyst such as the attenuated post-metallocene catalyst of formula (III), and the multimodal catalyst system independently may be unsupported or disposed on a solid particulate support material. When the support material is absent, the post-metallocene precatalyst of formula (I), the faster-light-off post-metallocene catalysts such as the faster-light-off catalyst of formula (II), the attenuated post-metallocene catalyst such as the attenuated post-metallocene catalyst of formula (III), and/or the multimodal catalyst system may be injected into a slurry-phase or gas-phase polymerization reactor as a solution in a hydrocarbon solvent. When the post-metallocene precatalyst of formula (I), the faster-light-off post-metallocene catalysts such as the faster-light-off catalyst of formula (II), the attenuated post-metallocene catalyst such as the attenuated post-metallocene catalyst of formula (III), and/or the multimodal catalyst system is/are disposed on the support material, they may be injected into the slurry-phase or gas-phase polymerization reactor as a slurry suspended in the hydrocarbon solvent or as a dry, powder (i.e., dry particulate solid).

The faster-light-off post-metallocene catalyst (e.g., of formula (II)) and/or the attenuated post-metallocene catalyst (e.g., formula (III)) may be premade in the absence of the support material and later disposed onto the support material. Alternatively, the post-metallocene precatalyst of formula (I) or the faster-light-off post-metallocene catalyst (e.g., of formula (II)) may be disposed onto the support material, and then the faster-light-off post-metallocene catalyst (e.g., of formula (II)) and/or the attenuated post-metallocene catalyst (e.g., of formula (III)) may be made in situ on the support material.

The supported post-metallocene precatalyst of formula (I), the supported faster-light-off post-metallocene catalyst (e.g., supported catalyst of formula (II)) and/or the supported attenuated post-metallocene catalyst (e.g., supported catalyst of formula (III)) may be made by a concentrating method by evaporating a hydrocarbon solvent from a suspension or solution of the support material in a solution of the precatalyst of formula (I), the faster-light-off catalyst (e.g., of formula (II)) and/or the attenuated post-metallocene catalyst (e.g., of formula (III)) in the hydrocarbon solvent. Alternatively, the supported precatalyst of formula (I), the supported faster-light-off catalyst (e.g., supported catalyst of formula (II)) and/or the supported attenuated post-metallocene catalyst (e.g., supported catalyst of formula (III)) may be made by a spray-drying method by spray-drying the suspension or solution. In some embodiments, the spray-drying method is used.

The support material. The support material is a particulate solid that may be nonporous, semi-porous, or porous. A carrier material is a porous support material. Examples of support materials are talc, inorganic oxides, inorganic chloride, zeolites, clays, resins, and mixtures of any two or more thereof. Examples of suitable resins are polystyrene, functionalized or crosslinked organic supports, such as polystyrene divinyl benzene polyolefins. The support material independently may be an untreated silica, alternatively a calcined untreated silica, alternatively a hydrophobing agent-treated silica, alternatively a calcined and hydrophobing agent-treated silica. The hydrophobing agent may be dichlorodimethylsilane.

Inorganic oxide support materials include Group 2, 3, 4, 5, 13 or 14 metal oxides. The preferred supports include silica, which may or may not be dehydrated, fumed silica, alumina (see, for example, PCT Publication WO 99/60033), silica-alumina and mixtures thereof. Other useful supports include magnesia, titania, zirconia, magnesium chloride (U.S. Pat. No. 5,965,477), montmorillonite (EP 0 511 665), phyllosilicate, zeolites, talc, clays (U.S. Pat. No. 6,034,187), and the like. Also, combinations of these support materials may be used, for example, silica-chromium, silica-alumina, silica-titania and the like. Additional support materials may include those porous acrylic polymers described in EP 0 767 184, which is incorporated herein by reference. Other support materials include nanocomposites as disclosed in PCT Publication WO 99/47598; aerogels as disclosed in PCT Publication WO 99/48605; spherulites as disclosed in U.S. Pat. No. 5,972,510; and polymeric beads as disclosed in PCT Publication WO 99/50311.

The support material may have a surface area in the range of from about 10 $m^2/g$ to about 700 $m^2/g$, a pore volume in the range of from about 0.1 $cm^3/g$ to about 4.0 $cm^3/g$, and average particle size in the range of from about 5 microns to about 500 microns. The support material may be a silica (e.g., fumed silica), alumina, a clay, or talc. The fumed silica may be hydrophilic (untreated), alternatively hydrophobic (treated). In some aspects the support is a hydrophobic fumed silica, which may be prepared by treating an untreated fumed silica with a hydrophobing agent such as dimethyldichlorosilane, a polydimethylsiloxane fluid, or hexamethyldisilazane. In some aspects the treating agent is dimethyldichlorosilane. In one embodiment, the support is Cabosil™ TS-610.

One or more precatalysts and/or one or more activators may be deposited on, contacted with, vaporized with, bonded to, or incorporated within, adsorbed or absorbed in, or on, one or more support or carrier materials.

The metallocene precatalyst may be spray dried according to the general methods described in U.S. Pat. No. 5,648,310. The support used with the post-metallocene precatalyst may be functionalized, as generally described in EP 0 802 203, or at least one substituent or leaving group is selected as described in U.S. Pat. No. 5,688,880.

Solution phase polymerization and/or slurry phase polymerization of olefin monomer(s) are well-known. See for example U.S. Pat. No. 8,291,115B2.

Inert hydrocarbon solvent. An alkane, an arene, or an alkylarene (i.e., arylalkane). Examples of inert hydrocarbon solvents are alkanes such as mineral oil, pentanes, hexanes, heptanes, octanes, nonanes, decanes, undecanes, dodecanes, etc., and toluene, and xylenes. In one embodiment, the inert hydrocarbon solvent is an alkane, or a mixture of alkanes, wherein each alkane independently has from 5 to 20 carbon atoms, alternatively from 5 to 12 carbon atoms, alternatively from 5 to 10 carbon atoms. Each alkane independently may be acyclic or cyclic. Each acyclic alkane independently may be straight chain or branched chain. The acyclic alkane may be pentane, 1-methylbutane (isopentane), hexane, 1-methylpentane (isohexane), heptane, 1-methylhexane (isoheptane), octane, nonane, decane, or a mixture of any two or more thereof. The cyclic alkane may be cyclopentane, cyclohexane, cycloheptane, cyclooctane, cyclononane, cyclodecane, methycyclopentane, methylcyclohexane, dimethylcyclopentane, or a mixture of any two or more thereof. Additional examples of suitable alkanes include Isopar-C, Isopar-E, and mineral oil such as white mineral oil. In some aspects the inert hydrocarbon solvent is free of mineral oil. The inert hydrocarbon solvent may consist of one or more ($C_5$-$C_{12}$)alkanes.

Gas-phase polymerization (GPP). The polymerization uses a GPP reactor, such as a stirred-bed gas phase polymerization reactor (SB-GPP reactor) or a fluidized-bed gas-phase polymerization reactor (FB-GPP reactor). Such reactors and methods are generally well-known. For example, the FB-GPP reactor/method may be as described in any one of U.S. Pat. Nos. 3,709,853; 4,003,712; 4,011,382; 4,302,566; 4,543,399; 4,882,400; 5,352,749; 5,541,270; US 2018/0079836 A1; EP-A-0 802 202; and Belgian Patent No. 839,380. These SB-GPP and FB-GPP polymerization reactors and processes either mechanically agitate or fluidize by continuous flow of gaseous monomer and diluent the polymerization medium inside the reactor, respectively. Other useful reactors/processes contemplated include series or multistage polymerization processes such as described in U.S. Pat. Nos. 5,627,242; 5,665,818; 5,677,375; EP-A-0 794 200; EP-B1-0 649 992; EP-A-0 802 202; and EP-B-634421

Gas phase polymerization operating conditions are any variable or combination of variables that may affect a polymerization reaction in the GPP reactor or a composition or property of a polyolefin polymer composition product made thereby. The variables may include reactor design and size; precatalyst composition and amount; reactant composition and amount; molar ratio of two different reactants; presence or absence of feed gases such as $H_2$, molar ratio of feed gases versus reactants, absence or concentration of interfering materials (e.g., $H_2O$ and/or $O_2$), absence or presence of an induced condensing agent (ICA), average polymer residence time in the reactor, partial pressures of constituents, feed rates of monomers, reactor bed temperature (e.g., fluidized bed temperature), nature or sequence of process steps, time periods for transitioning between steps. Variables other than that/those being described or changed by the method or use may be kept constant.

In a GPP method, control individual flow rates of ethylene ("$C_2$"), hydrogen ("$H_2$") and 1-hexene ("$C_6$" or "$C_x$" wherein x is 6) to maintain a fixed comonomer to ethylene monomer gas molar ratio or feed mass ratio ($C_x/C_2$, e.g., $C_6/C_2$) equal to a described value (e.g., 0.00560 or 0.00703), a constant hydrogen to ethylene gas molar ratio or feed mass ratio ("$H_2/C_2$") equal to a described value (e.g., 0.00229 or 0.00280), and a constant ethylene ("$C_2$") partial pressure equal to a described value (e.g., 1,000 kPa). Measure concentrations of gases by an in-line gas chromatograph to understand and maintain composition in the recycle gas stream. Maintain a reacting bed of growing polymer particles in a fluidized state by continuously flowing a make-up feed and recycle gas through the reaction zone. Use a superficial gas velocity of 0.49 to 0.79 meter per second (m/sec) (1.6 to 2.6 feet per second (ft/sec)). Operate the FB-GPP reactor at a total pressure of about 2068 to about 2758 kilopascals (kPa) (about 300 to about 400 pounds per square inch-gauge (psig)) and at a described first reactor bed temperature RBT. Maintain the fluidized bed at a constant height by withdrawing a portion of the bed at a rate equal to the rate of production of particulate form of the polyolefin polymer composition, which production rate may be from 5,000 to 150,000 kilograms per hour (kg/hour). Remove the product polyolefin polymer composition semi-continuously via a series of valves into a fixed volume chamber, wherein this removed multimodal (e.g., bimodal or trimodal) ethylene-co-1-hexene copolymer composition is purged to remove entrained hydrocarbons and treated with a stream of humidified nitrogen ($N_2$) gas to deactivate any trace quantities of residual catalyst.

The catalyst system may be fed into the polymerization reactor(s) in "dry mode" or "wet mode", alternatively dry mode, alternatively wet mode. The dry mode is a dry powder or granules. The wet mode is a suspension in an inert liquid such as mineral oil.

Induced condensing agent (ICA). An inert liquid useful for cooling materials in GPP reactor(s). Its use is optional. The ICA may be a ($C_3$-$C_{20}$)alkane, alternatively a ($C_5$-$C_{20}$) alkane, e.g., 2-methylbutane (i.e., isopentane). See U.S. Pat. Nos. 4,453,399; 4,588,790; 4,994,534; 5,352,749; 5,462,999; and 6,489,408. ICA concentration in reactor may be from 0.1 to 25 mol %, alternatively from 1 to 16 mol %, alternatively from 1 to 10 mol %.

The GPP conditions may further include one or more additives such as a chain transfer agent or a promoter. The chain transfer agents are well known and may be alkyl metal such as diethyl zinc. Promoters are known such as in U.S. Pat. No. 4,988,783 and may include chloroform, $CFCl_3$, trichloroethane, and difluorotetrachloroethane. Prior to reactor start up, a scavenging agent may be used to react with moisture and during reactor transitions a scavenging agent may be used to react with excess activator. Scavenging agents may be a trialkylaluminum. GPP may be operated free of (not deliberately added) scavenging agents. The GPP reactor/method may further include an amount (e.g., 0.5 to 200 ppm based on all feeds into reactor) of one or more static control agents and/or one or more continuity additives such as aluminum stearate or polyethyleneimine. The static control agent(s) may be added to the FB-GPP reactor to inhibit formation or buildup of static charge therein.

The GPP reactor may be a commercial scale FB-GPP reactor such as a UNIPOL™ reactor or UNIPOL™ II reactor, which are available from Univation Technologies, LLC, a subsidiary of The Dow Chemical Company, Midland, Michigan, USA.

1-Alkene monomer. The 1-alkene monomer is a compound of formula $H_2C=C(H)(CH_2)_nR^8$, wherein subscript n is an integer from 0 to 19 and group $R^8$ is H or $CH_3$. Examples are ethylene (subscript n is 0 and $R^8$ is H), propylene (subscript n is 0 and $R^8$ is $CH_3$), and a ($C_4$-$C_{20}$) alpha-olefin (subscript n is an integer from 1 to 19 and $R^8$ is H or $CH_3$. In some embodiments the 1-alkene monomer is ethylene, propylene, 1-butene, 1-hexene, 1-octene, or a combination of any two or more thereof. In some embodiments the 1-alkene monomer is a combination of ethylene and propylene. In other embodiments the 1-alkene monomer is ethylene alone or a combination of ethylene and 1-butene, 1-hexene, or 1-octene.

Polyolefin polymer. A product of polymerizing at least one 1-alkene monomer with the attenuated post-metallocene catalyst or the multimodal catalyst system. A macromolecule, or collection of macromolecules, having constitutional units derived from the at least one 1-alkene monomer. For example, when the at least one 1-alkene monomer consists of ethylene, the polyolefin polymer consists of a polyethylene homopolymer. When the at least one 1-alkene monomer consists of ethylene and propylene, the polyolefin polymer consists of an ethylene/propylene copolymer. When the at least one 1-alkene monomer consists of ethylene and a comonomer selected from 1-butene, 1-hexene, and 1-octene, the polyolefin polymer is selected from a poly (ethylene-co-1-butene) copolymer, a poly(ethylene-co-1-hexene) copolymer, and a poly(ethylene-co-1-octene) copolymer, respectively.

The polyolefin polymer may be a homopolymer or a copolymer. The polyolefin polymer may have a monomodal molecular weight distribution or a multimodal molecular weight distribution. The polyolefin polymer made from the multimodal catalyst system has a multimodal (e.g., bimodal or trimodal) molecular weight distribution and comprises a higher molecular weight (HMW) polyolefin polymer component and a lower molecular weight (LMW) polyolefin polymer component. The HMW polyolefin polymer component may be made by the attenuated post-metallocene catalyst (e.g., of formula (III) thereof and the LMW polyolefin polymer component may be made by the metallocene catalyst thereof.

Any compound, composition, formulation, material, mixture, or reaction product herein may be free of any one of the chemical elements selected from the group consisting of: H, Li, Be, B, C, N, O, F, Na, Mg, Al, Si, P, S, Cl, K, Ca, Sc, Ti, V, Cr, Mn, Fe, Co, Ni, Cu, Zn, Ga, Ge, As, Se, Br, Rb, Sr, Y, Zr, Nb, Mo, Tc, Ru, Rh, Pd, Ag, Cd, In, Sn, Sb, Te, I, Cs, Ba, Hf, Ta, W, Re, Os, Ir, Pt, Au, Hg, Tl, Pb, Bi, lanthanoids, and actinoids; with the proviso that chemical elements required by the compound, composition, formulation, material, mixture, or reaction product (e.g., Zr required by a zirconium compound, or C and H required by a polyethylene, or C, H, and O required by an alcohol) are not counted.

Alternatively precedes a distinct embodiment. ASTM is the standards organization, ASTM International, West Conshohocken, Pennsylvania, USA. Any comparative example is used for illustration purposes only and shall not be prior art. Free of or lacks means a complete absence of; alternatively not detectable. IUPAC is International Union of Pure and Applied Chemistry (IUPAC Secretariat, Research Triangle Park, North Carolina, USA). Periodic Table of the Elements is the IUPAC version of May 1, 2018. May confers a permitted choice, not an imperative. Operative means functionally capable or effective. Optional(ly) means is absent (or excluded), alternatively is present (or included). Properties may be measured using standard test methods and conditions. Ranges include endpoints, subranges, and whole and/or fractional values subsumed therein, except a range of integers does not include fractional values. Room temperature: 23°±1° C.

Unless stated otherwise, definitions of terms used herein are taken from the IUPAC Compendium of Chemical Technology ("Gold Book") version 2.3.3 dated Feb. 24, 2014. Some definitions are given below for convenience.

Alkane(s) (solvent). One or more acyclic, straight chain or branched chain compounds of formula $C_nH_{2n+2}$ and/or one or more cyclic compounds of formula $C_mH_{2m}$, wherein subscripts n and m independently are an integer from 5 to 50 (e.g., 6). Free of a carbon-carbon double bond (C=C) and a terminal carbon-carbon triple bond (C≡C).

Alkyl (unsubstituted). A monovalent group consisting of hydrogen atoms and at least one carbon atom and formally made by removing a hydrogen atom from an alkane. Free of a carbon-carbon double bond (C=C) and a terminal carbon-carbon triple bond (C≡C).

Alkyl (substituted). A monovalent group formally made by replacing at least one hydrogen atom of an unsubstituted alkyl with a substituent group (e.g., $R^S$).

Alkaryl (unsubstituted) or alkyl-substituted aryl. A monovalent group consisting of hydrogen atoms and at least seven carbon atoms and formally made by removing a hydrogen atom from the arenyl portion of an alkyl-arene. E.g., 4-methylphenyl.

Alkaryl (substituted) or alkyl-substituted aryl. A monovalent group formally made by replacing at least one hydrogen atom of an unsubstituted alkaryl with a substituent group (e.g., $R^S$).

Aralkyl (unsubstituted). A monovalent group consisting of hydrogen atoms and at least seven carbon atoms and formally made by removing a hydrogen atom from the alkane portion of an arenyl-alkane. E.g., benzyl. Free of a carbon-carbon double bond (C=C) and a terminal carbon-carbon triple bond (C≡C).

Aralkyl (substituted). A monovalent group formally made by replacing at least one hydrogen atom of an unsubstituted aralkyl with a substituent group (e.g., $R^S$).

Aryl (unsubstituted). A monovalent group consisting of hydrogen atoms and at least six carbon atoms and formally made by removing a hydrogen atom from an arene. E.g., phenyl, naphthyl. Free of a carbon-carbon double bond (C=C) and a terminal carbon-carbon triple bond (C≡C).

Aryl (substituted). A monovalent group formally made by replacing at least one hydrogen atom of an unsubstituted aryl with a substituent group (e.g., $R^S$).

4-$(C_1-C_{20})$alkyl-substituted 1,3-butadiene molecule. A compound of formula $H_2C=C(H)—C(H)=C(H)—(C_1-C_{20})$alkyl.

$(C_\#-C_\#)$ (as modifying a functional group). The # or number sign indicates a range of carbon atoms in an unsubstituted version of the functional group. For example, $(C_1-C_6)$ has from 1 to 6 carbon atoms, $(C_7-C_{20})$ has from 7 to 20 carbon atoms, $(C_6-C_{12})$ has from 6 to 12 carbon atoms, and $(C_1-C_{20})$ has from 1 to 20 carbon atoms.

—C(=O)—O-(unsubstituted $C_1-C_{20}$)hydrocarbyl). A monovalent group consisting of hydrogen atoms, two oxygen atoms, and from 2 to 21 carbon atoms and formally made by removing a hydrogen atom from the carbonyl carbon atom of a formic acid ester. E.g., —C(=O)—O-phenyl or —C(=O)—O-ethyl. Free of a carbon-carbon double bond (C=C) and a terminal carbon-carbon triple bond (C≡C).

Coordination entity. An assembly consisting of a central atom (metal atom) to which is attached (bonded) to a surrounding array of other groups of atoms (ligand(s)).

Coordination number. For a specified atom (e.g., M) in a chemical species, the quantity of other atoms directly linked or bonded to the specified atom in the chemical species. For example, in $TiCl_4$, the coordination number of the titanium atom is 4.

Denticity. In a coordination entity the number kappa ($\kappa$) of donor groups from the same ligand attached to the same central atom (e.g., attached to M).

Didentate organoheteryl. A monovalent group that functions as a ligand to metal M and that consists of carbon atoms, hydrogen atoms and at least one heteroatom selected from N, O, S, and P and may be chosen such that the monovalent group is doubly coordinated to metal M via a carbon atom and one such heteroatom or via two such heteroatoms. The monovalent ligand may provide to M a denticity, $\kappa$, of 2. The didentate organoheteryl may be free of a terminal carbon-carbon double bond (>C=CH$_2$) and a terminal carbon-carbon triple bond (—C≡CH); alternatively free of any carbon-carbon double bond (C=C) and any terminal carbon-carbon triple bond (C≡C).

Didentate organoheterylene. A divalent group that functions as a ligand to metal atom M and that consists of carbon atoms, hydrogen atoms and at least one heteroatom selected from N, O, S, and P and may be chosen such that the divalent group is doubly coordinated to metal M via a carbon atom and one such heteroatom or via two such heteroatoms. The divalent group may provide to M a denticity, $\kappa$, of 2. The didentate organoheterylene may be free of a terminal carbon-carbon double bond (>C=CH$_2$) and a terminal carbon-carbon triple bond (—C≡CH); alternatively free of any carbon-carbon double bond (C=C) and any terminal carbon-carbon triple bond (C≡C).

Dry. Generally, a moisture content from 0 to less than 5 parts per million based on total parts by weight. Materials fed to the reactor(s) during a polymerization reaction are dry.

Effective amount. A quantity sufficient to achieve a result.

Halogen atom. An atom selected from F, Cl, Br, and I; alternatively from F, Cl, and Br; alternatively from F and Cl; alternatively from F and Br; alternatively from Cl and Br; alternatively from F; alternatively from Cl.

Hapticity. In a coordination entity, the number, eta ($\eta$), of atoms in a continuous or uninterrupted series of two or more atoms from a same ligand attached to a central atom (e.g., M). For example, a cyclopentadienyl group has five continuous or uninterrupted carbon atoms coordinated to M and thus has a hapticity, $\eta$, of 5 (eta$^5$ ("$\eta^5$")). The 4-$(C_1-C_{20})$ alkyl-substituted 1,3-butadiene molecule is capable of coordinating to M via one of its two carbon-carbon double bonds (providing to M a hapticity, η, of 2 (eta² ("η²")) or via both of its carbon-carbon double bonds (providing to M a hapticity, η, of 4 (eta⁴ ("η⁴")).

Heterohydrocarbyl. A monovalent group consisting of carbon atoms, hydrogen atoms and at least one heteroatom selected from N, O, S, Si, and P and is thus organic, but having its free valence a carbon atom. The heterohydrocarbyl may be free of a terminal carbon-carbon double bond (>C=CH$_2$) and a terminal carbon-carbon triple bond (—C≡CH); alternatively free of any carbon-carbon double bond (C=C) and any terminal carbon-carbon triple bond (C≡C). In some embodiments the at least one heteroatom is selected from the group consisting of: N, O, and Si; alternatively N and O; alternatively N and Si; alternatively O and Si; alternatively N; alternatively O; alternatively Si; alternatively S; alternatively P. In some embodiments R-type groups are not a heterohydrocarbyl group.

Higher molecular weight (HMW) component. A subgroup of macromolecules having a peak in the GPC plot of dW/dLog(MW) on the y-axis versus Log(MW) on the x-axis that is at a higher molecular weight.

HN5. The term "HN5" does not mean pentazole, i.e., does not mean a heterocycle of formula HN$_5$. Herein HN5 generally refers to the ligand-metal complex of formula (Ib)-1.

Hydrocarbyl. A monovalent group formally derived by removing an H atom from a carbon atom of a hydrocarbon compound consisting of C and H atoms. In some embodiments each hydrocarbyl independently is alkyl, alkaryl, aryl, or aralkyl.

Hydrocarbylene. A divalent group formally derived by removing two H atoms from different carbon atoms of a hydrocarbon compound consisting of C and H atoms.

Inert. Generally, not (appreciably) reactive or not (appreciably) interfering therewith in the inventive polymerization reaction. The term "inert" as applied to the purge gas or ethylene feed means a molecular oxygen (O$_2$) content from 0 to less than 5 parts per million based on total parts by weight of the purge gas or ethylene feed.

Inert Hydrocarbon solvent. A liquid material at 25° C. that consists of carbon and hydrogen atoms, and optionally one or more halogen atoms, and is free of carbon-carbon double bonds and carbon-carbon triple bonds.

Leaving group. A group X that is coordinated to metal M in a precatalyst (M-X) and upon contact of the precatalyst with an activator one such group is removed from the precatalyst to convert the precatalyst to an active catalyst (M⁺) and a by-product anion X⁻. In some aspects the aforementioned A⁻ in the faster light-off catalyst and the attenuated-light-off catalyst may be X⁻. Each monodentate X is a leaving group that may provide to M a denticity, κ, of 1.

Ligand. A molecule or radical derived therefrom by removal of a hydrogen atom that is capable of coordinating to a transition metal atom M such as a Group 4 metal atom Ti, Hf, or Zr.

Ligands D, T, and Q are distinct from leaving groups X in that ligands D, ligand T, or ligand Q, as the case may be, remain(s) coordinated to metal atom M in the precatalyst, in the faster-light-off catalyst made from the precatalyst, and in the attenuated post-metallocene catalyst made from the faster-light-off catalyst, whereas at least one leaving group X that is present in the precatalyst is absent in the faster-light-off catalyst, and at least one leaving group X that is present in the faster-light-off catalyst is replaced by attenuated-leaving group R in the attenuated post-metallocene catalyst.

Lower molecular weight (LMW) component. A subgroup of macromolecules having a peak in the GPC plot of dW/dLog(MW) on the y-axis versus Log(MW) on the x-axis that is at a lower molecular weight.

Metallocene catalyst. Homogeneous or heterogeneous material that enhances olefin polymerization reaction rates and contains a ligand-metal complex having two (substituted or unsubstituted)-cyclopentadienyl groups (unbridged or bridged). Substantially single site or dual site. Each metal is a transition metal Ti, Zr, or Hf.

Minute (one). Unit of time equal to 60.0 seconds. 0.1 minute equals 6.0 seconds.

Organoheteryl. A monovalent group consisting of carbon atoms, hydrogen atoms and at least one heteroatom selected from N, O, S, and P and is thus organic, but having its free valence on one of the heteroatom(s). The organoheteryl may be free of a terminal carbon-carbon double bond (>C=CH$_2$) and a terminal carbon-carbon triple bond (—C≡CH); alternatively free of any carbon-carbon double bond (C=C) and any terminal carbon-carbon triple bond (C≡C).

Organoheterylene. A divalent group consisting of carbon atoms, hydrogen atoms and at least one heteroatom selected from N, O, S, and P and is thus organic, but having one its two free valences on one of the heteroatom(s) and having the other free valence on a carbon atom or a different heteroatom. The organoheterylene may be free of a terminal carbon-carbon double bond (>C=CH$_2$) and a terminal carbon-carbon triple bond (—C≡CH); alternatively free of any carbon-carbon double bond (C=C) and any terminal carbon-carbon triple bond (C≡C).

Post-metallocene catalyst. Homogeneous or heterogeneous ligand-metal complex that is not a metallocene catalyst. A non-metallocene molecular catalyst. The post-metallocene catalyst lacks a (substituted or unsubstituted)-cyclopentadienyl group-containing ligand and enhances olefin polymerization reaction rates. Substantially single site or dual site catalyst. Made by activating a post-metallocene precatalyst, which also lacks a (substituted or unsubstituted)-cyclopentadienyl ligand. Each metal is a transition metal Ti, Zr, or Hf.

Precatalyst (in reference to post-metallocene precatalyst). An unactivated coordination entity or ligand-metal complex that lacks a (substituted or unsubstituted)-cyclopentadienyl group-containing ligand.

R-type group. A group in a structural formula written as "R" or "R$^{superscript}$", wherein the "superscript" is a number, letter, or both. Examples of "R$^{superscript}$" groups are $R^1$, $R^{a1}$, $R^{b1}$, $R^{1a}$, $R^2$, $R^H$, and the like, respectively.

Tetradentate organoheterylene. An organoheterylene as described above that is directly bonded to metal M via four heteroatoms or via three heteroatoms and one carbon atom. The tetradentate organoheterylene may provide to M a denticity, κ, of 4. In some embodiments the organoheterylene is directly bonded to M via four heteroatoms; alternatively via three heteroatoms and one carbon atom. In some embodiments each heteroatom directly bonded to M independently is N or O; alternatively N; alternatively O. In some embodiments the organoheterylene is directly bonded to M via four O atoms.

Tridentate organoheterylene. An organoheterylene as described above that is directly bonded to metal M via three heteroatoms or via two heteroatoms and one carbon atom. The tridentate organoheterylene may provide to M a denticity, κ, of 3. In some embodiments the organoheterylene is directly bonded to M via three heteroatoms; alternatively via two heteroatoms and one carbon atom. In some embodiments each heteroatom directly bonded to M independently is N or O; alternatively N; alternatively O. In some embodiments the organoheterylene is directly bonded to M via three N atoms.

Tri(($C_1$-$C_{20}$)hydrocarbyl)silyl. A monovalent group consisting of a silicon atom bonded to three independently selected ($C_1$-$C_{20}$)hydrocarbyl groups and having its free valency on the silicon atom.

Unsubstituted ($C_1$-$C_5$)alkyl. An alkyl group selected from the group consisting of methyl, ethyl, a propyl, a butyl, and a pentyl. The propyl may be n-propyl or 1-methylethyl. The butyl may be n-butyl; 1-methylpropyl; 2-methylpropyl; or 1,1-dimethylethyl. The pentyl may be n-pentyl; 1,-methylbutyl; 2-methylbutyl; 3-methylbutyl; 1,1-dimethylpropyl; 2,2-dimethylpropyl; or 2,3-dimethylpropyl.

Ziegler-Natta catalyst. Heterogeneous material that enhances olefin polymerization reaction rates and is prepared by contacting an inorganic titanium compound, such as a titanium halide, which is supported on a magnesium halide support (e.g., a magnesium chloride support), with an activator.

EXAMPLES

Activator 1 (also called Cocatalyst 1): Amines, bis(hydrogenated tallow alkyl)methyl, tetrakis(pentafluorophenyl) borate(1−).

Mineral oil: HYDROBRITE 380 PO White mineral oil from Sonneborn.

Preparation 1A: preparation of an activator formulation comprising spray-dried methylaluminoxane/treated fumed silica (SDMAO) in hexanes/mineral oil. Slurry 1.6 kg of treated fumed silica (CABOSIL TS-610) in 16.8 kg of toluene, then add a 10 wt % solution (11.6 kg) MAO in toluene to give a mixture. Using a spray dryer set at 160° C. and with an outlet temperature at 70° to 80° C., introduce the mixture into an atomizing device of the spray dryer to produce droplets of the mixture, which are then contacted with a hot nitrogen gas stream to evaporate the liquid from the mixture to give a powder. Separate the powder from the gas mixture in a cyclone separator, and discharge the separated powder into a container to give the SDMAO as a fine powder.

Preparation 1B: preparation of a slurry of the activator formulation of Preparation 1A. Slurry the SDMAO powder of Preparation 1A in a mixture of 10 wt % n-hexane and 78 wt % mineral oil to give the activator formulation having 12 wt % SDMAO/treated fumed silica solids in the hexane/mineral oil.

Preparation 2: preparation of a spray-dried metallocene with activator formulation. Replicate Preparations 1 A and 1B except prepare an activator formulation by slurrying 1.5 kg of treated fumed silica (CABOSIL TS-610) in 16.8 kg of toluene, followed by adding a 10 wt % solution (11.1 kg) of MAO in toluene and (MeCp)(1,3-dimethyl-4,5,6,7-tetrahydroindenyl)ZrMe$_2$, wherein Me is methyl, Cp is cyclopentadienyl, and MeCp is methylcyclopentadienyl, in an amount sufficient to provide a loading of 40 micromoles Zr per gram of solid. Slurry the resultant powder to give an activator formulation of 22 wt % solids in 10 wt % isoparaffin fluid and 68 wt % mineral oil.

Preparation 2A: making supported catalysts for use in the Light-Off Batch Reactor Test Method described later. In a nitrogen-purged glove box, in an oven-dried glass bottle, slurry 2.65 g of Cabosil TS-610 fumed silica in 62.5 g of toluene until well dispersed. Then add 22 grams (g) of a 10 weight percent (wt %) solution of methylaluminoxane (MAO) in toluene. Stir the mixture for 15 minutes, then add the post-metallocene precatalyst (e.g., any one of Precatalyst 1 to Precatalyst 10 described earlier) and any one of Kinetics Modifier Compounds KMC1 to KMC20 described earlier. Stir the resulting mixture for 30 to 60 minutes. Spray-dry the stirred mixture using a Büchi Mini Spray Dryer B-290 with the following parameters to yield the dried sample: Set Temperature is 185° C., Outlet Temperature is 100° C., Aspirator is 95%, and Pump Speed is 150 rotations per minute (rpm).

Inventive Example A: synthesis of Precatalyst 3 of formula (3):

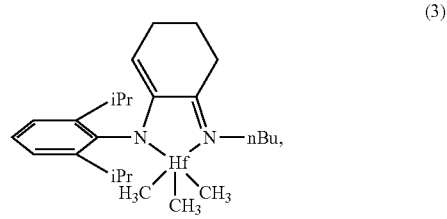

(3)

iPr is isopropyl (1-methylethyl) and nBu is normal-butyl. Synthesize precatalyst (3) according to the general procedure of Kuhlman, et al., Macromolecules 2010, vol. 43, page 7903.

Inventive Example B: synthesis of Precatalyst 4 of formula (4):

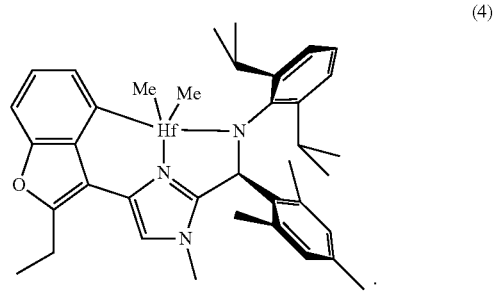

(4)

Inside a nitrogen-filled glovebox a 40 mL vial was charged with N-[[4-(2-ethylbenzofuran-3-yl)-1-methylimidazol-2-yl]-(2,4,6-trimethylphenyl)methyl]-2,6-diisopropyl-aniline (0.4 g, 0.75 millimoles (mmol)) then dissolved in toluene 5 mL. 2.4 molar (M) butyllithium in hexanes (0.33 mL) was added to this solution, and the mixture was stirred magnetically for 1 hour. Solid tetrachlorohafnium (0.24 g, 0.75 mmol) was added, the vial was fitted with a small condenser, and the solution was warmed to 100° C. The solution was maintained at this temperature with stirring for 4 hours, then the heat was turned off, and the solution was stirred at room temperature overnight. The mixture was cooled to −30° C. then 3M bromo(methyl)magnesium (0.8 mL) was added dropwise. After fitting with a small condenser, the solution was warmed to 100° C., and held at this temperature while stirring for 7 hours. The toluene was removed under reduced pressure to provide a dark solid, which was slurried in toluene (15 mL), and stirred at room temperature for 30 minutes. The solution was filtered through a fritted funnel packed with CELITE. The filter cake was extracted with additional toluene (10 mL). The toluene was removed under reduced pressure, then 2×5 mL portions of hexanes were added and removed under reduced pressure to remove residual toluene. The solid was taken up in toluene (4 mL), then pentane was added (1 mL) and the mixture was placed in a −35° C. freezer. The resulting solid was collected by filtration and dried under reduced pressure. $^1$H NMR (400 MHz, Chloroform-d) δ 8.23 (t, J=3.9 Hz, 1H), 7.40 (dd, J=3.9, 0.5 Hz, 2H), 7.14 (s, 1H), 7.13 (t, J=0.7 Hz, 2H), 6.99 (dd, J=5.5, 4.0 Hz, 1H), 6.70 (br s, 1H), 6.64 (br s, 1H), 6.03 (s, 1H), 3.54 (p, J=6.8 Hz, 1H), 3.14 (s, 4H), 3.01 (q, J=7.6 Hz, 2H), 2.17 (s, 3H), 1.86 (s, 3H), 1.59 (s, 3H), 1.43 (t, J=7.6 Hz, 3H), 1.36 (d, J=6.7 Hz, 3H), 1.16 (d, J=6.8 Hz, 3H), 1.12 (d, J=6.7 Hz, 3H), 0.51 (s, 3H), 0.26 (s, 3H), 0.14 (d, J=6.8 Hz, 3H).

Preparation 3: synthesis of Faster-Light-Off Post-Metallocene Catalysts: made under an inert $N_2$ atmosphere in a glovebox by charging a 40 milliliters (mL) glass vial containing a poly(tetrafluoroethylene) (PTFE)-coated magnetic stir bar and capped with a rubber septum with 200 milligrams (mg) of spray-dried methylaluminoxane (SDMAO, prepared according to Preparation 1A). Then add a slurry of 10 micromoles (μmol) of the post-metallocene precatalyst (e.g., any one of Precatalyst 1 to Precatalyst 10) in 0.2 mL of mineral oil. Stir the resulting mixture for 5 minutes to give a mineral oil slurry of the respective faster-light-off post-metallocene catalyst supported on treated fumed silica. Replicate this procedure to make multiple lots of the mineral oil slurry of faster-light-off post-metallocene catalysts, each supported on separate treated fumed silica. The faster light-off post-metallocene catalyst may be made to have a molar ratio of aluminum to metal atoms (Al/M) of 120. The foregoing procedure is generally used to make catalysts for use in the Light-off Vial Test Method described later.

Preparation 4: synthesis of Attenuated post-metallocene catalyst: to an amount of the slurry to contain 10 μmol of a Faster-Light-Off Catalyst of Preparation 3 supported on treated fumed silica, add a solution of 10 μmol of a Kinetics Modifier Compound in 0.20 mL of toluene. Stir the resulting mixture for 5 minutes to give a mineral oil/toluene slurry of the attenuated post-metallocene catalyst supported on treated fumed silica.

Inventive Examples (A1) to (A20) (IE(A1) to IE(A20)): separately prepare twenty attenuated post-metallocene catalysts according to Preparation 2A or Preparations 3 and 4 using Precatalyst 1 and different ones of the Kinetics Modifier Compounds (1) to (20), respectively.

Inventive Examples (B1) to (B20) (IE(B1) to IE(B20)): separately prepare twenty attenuated post-metallocene catalysts according to Preparation 2A or Preparations 3 and 4 using Precatalyst 2 and different ones of the Kinetics Modifier Compounds (1) to (20), respectively.

Inventive Examples (C1) to (C20) (IE(C1) to IE(C20)): separately prepare twenty attenuated post-metallocene catalysts according to Preparation 2A or Preparations 3 and 4 using Precatalyst 3 and different ones of the Kinetics Modifier Compounds (1) to (20), respectively.

Inventive Examples (D1) to (D20) (IE(D1) to IE(D20)): separately prepare twenty attenuated post-metallocene catalysts according to Preparation 2A or Preparations 3 and 4 using Precatalyst 4 and different ones of the Kinetics Modifier Compounds (1) to (20), respectively.

Inventive Examples (E1) to (E20) (IE(E1) to IE(E20)): separately prepare twenty attenuated post-metallocene catalysts according to Preparation 2A or Preparations 3 and 4 using Precatalyst 5 and different ones of the Kinetics Modifier Compounds (1) to (20), respectively.

Inventive Examples (F1) to (F20) (IE(F1) to IE(F20)): separately prepare twenty attenuated post-metallocene catalysts according to Preparation 2A or Preparations 3 and 4 using Precatalyst 6 and different ones of the Kinetics Modifier Compounds (1) to (20), respectively.

Inventive Examples (G1) to (G20) (IE(G1) to IE(G20)): twenty attenuated post-metallocene catalysts according to Preparation 2A or Preparations 3 and 4 using Precatalyst 7 and different ones of the Kinetics Modifier Compounds (1) to (20), respectively.

Inventive Examples (H1) to (H20) (IE(H1) to IE(H20)): separately prepare twenty attenuated post-metallocene catalysts according to Preparation 2A or Preparations 3 and 4 using Precatalyst 8 and different ones of the Kinetics Modifier Compounds (1) to (20), respectively.

Inventive Examples (I1) to (I20) (IE(I1) to IE(I20)): separately prepare twenty attenuated post-metallocene catalysts according to Preparation 2A or Preparations 3 and 4 using Precatalyst 9 and different ones of the Kinetics Modifier Compounds (1) to (20), respectively.

Inventive Examples (J1) to (J20) (IE(J1) to IE(J20)): separately prepare twenty attenuated post-metallocene catalysts according to Preparation 2A or Preparations 3 and 4 using Precatalyst 10 and different ones of the Kinetics Modifier Compounds (1) to (20), respectively.

Light-off Vial Test Method: add a mineral oil slurry of a faster-light-off catalyst supported on treated fumed silica or a mineral oil/toluene slurry of an attenuated post-metallocene catalyst supported on treated fumed silica into a dried 40 mL glass vial. To the vial add 5.5 mL or 11 mL of 1-octene, and seal the vial with a septum cap. Record addition time as $T_0$ (0.00 minute). Manually shake (not stir) the vials to prevent clumping. Then place the shaken vials in different wells of a foam block sitting on a hotplate/stirrer. Immediately insert thermocouples through the septa caps into the vials below the liquid level therein, and record temperatures (° C.) of the contents of the vials at 5 seconds intervals from $T_0$ to 300 minutes past $T_0$. Download the temperature and time data to a spreadsheet, and plot thermokinetic profiles for analysis. The results of these runs may be depicted graphically as a plot of reaction temperature of the batch reactor contents on the y-axis versus time starting from addition of Time$_0$ on the x-axis.

Inventive Examples ("IE") and Comparative Examples ("CE") made by the Light-Off Vial Test Method. Combined effective amounts of certain kinetics modifier compounds ("KMC") with certain faster-light-off post-metallocene catalysts to give inventive examples of attenuated post-metallocene catalysts. Comparative examples meet one of three criteria (1) to (3): (1) contain a hybrid catalyst but do not contain a kinetics modifier compound, (2) contain a hybrid catalyst but contain less than an effective amount of a kinetics modifier compound (e.g., CE1a), or (3) contain a metallocene catalyst and a kinetics modifier compound. Tested the light-off effects with polyoctene of the faster-light-off post-metallocenes and the inventive examples according to the Light-Off Vial Test Method tests to compare their relative activities. In separate vials, premix for 10 minutes (a) a mineral oil that is free of 1-octene, (b) an example of a post-metallocene precatalyst, and (c) a spray-dried methylaluminoxane (SDMAO) without a kinetics modifier compound to give a slurry of the faster-light-off post-metallocene catalyst that is free of 1-octene and kinetics modifier compound. In other vials premix for 10 minutes (a) mineral oil that is free of 1-octene, (b) the post-metallocene precatalyst, (c) the SDMAO, and (d) a kinetics modifier compound to give a slurry of the attenuated post-metallocene catalyst that is free of 1-octene. After 10 minutes of premixing (time in all Conditions except (B)*), add to each vial a same quantity of 1-octene. After the addition of 1-octene, observe a 5° to 120° C. increase, alternatively 10° to 110° C. increase, alternatively an increase in any temperature decade thereof (e.g., 10° to 20° C., 20° to 30° C. 30° to 40° C., 40° to 50° C., 50° to 60° C., 60° to 70° C., 70° to 80° C., 80° to 90° C., 90° to 100° C., 100° to 110° C., 110° to 120° C.), in temperature of the mixtures as evidence of activation of the respective catalyst. One of four sets of conditions is used: Conditions (A) (used in Tables 1 to 4): 5.5 mL Isopar-E; 8 μmol M; amount of SDMAO is quantity to give molar ratio Al/M=120; 0 μmol (CE) or 2 μmol (IE) kinetics modifier compound; 11 mL 1-octene; Conditions (B) (used in Table 5): 5.5 mL Isopar-E; 10 μmol M; amount of SDMAO is quantity to give molar ratio Al/M=120; 0 μmol (CE) or 2 μmol (IE) kinetics modifier compound; 5.5 mL 1-octene, wherein premixing is for 5 minutes instead of the 10 minutes*; Conditions (C) (used in Table 6): 5.5 mL Isopar-E; 20 μmol M; amount of SDMAO to give molar ratio Al/M=120; amount of kinetics modifier compound is 0 μmol (CE) or quantity to give indicated molar ratio M/KMC (IE); 5.5 mL 1-octene; Conditions (D) (used in Table 7): 5.5 mL Isopar-E; 2 μmol M; amount of SDMAO to give molar ratio Al/M=120; amount of kinetics modifier compound is 0 μmol (CE) or quantity to give indicated molar ratio M/KMC (IE); 5.5 mL 1-octene.

TABLE 1

Results of Light-Off Vial Test Method Performed using Conditions (A) and precatalyst (1) of formula

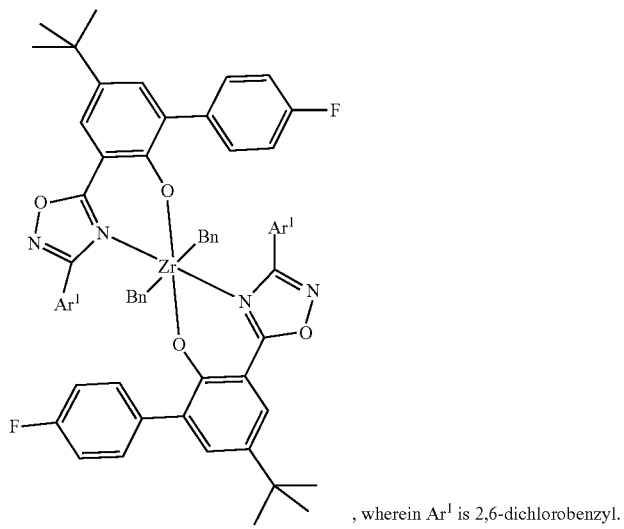

, wherein $Ar^1$ is 2,6-dichlorobenzyl.

| Ex. No. | Catalyst | KMC | M/KMC (mol/mol) | Time from add 1-octene ($Time_0$) to Peak Temperature ($Time_{peakT}$) (minutes) |
|---|---|---|---|---|
| CE1 | Faster-Light-Off Catalyst (1) | None | 1.0/0.0 | 1.6 (No KMC) |
| CE1a | Attenuated-Light-Off Catalyst (1a) | KMC1 | 1.0/1.0 | 1.8 (KMC = phenylacetylene; comparative) |
| CE1b | Attenuated-Light-Off Catalyst (1b) | KMC15 | 1.0/1.0 | 2.1 (KMC = cyclohexylallene; comparative) |
| IE1a | Attenuated-Light-Off Catalyst (1c) | KMC1 | 1.0/5.0 | 2.5 (KMC = phenylacetylene; inventive) |

TABLE 2

Results of Light-Off Vial Test Method Performed using Conditions (A) and precatalyst (2) of formula 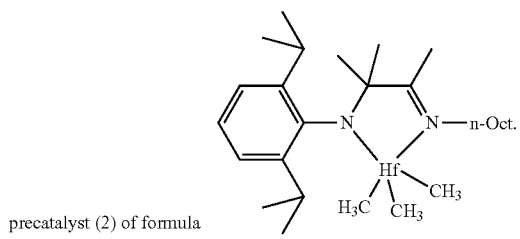

| Ex. No. | Catalyst | KMC | M/KMC (mol/mol) | Time from add 1-octene ($Time_0$) to Peak Temperature ($Time_{peakT}$) (minutes) |
|---|---|---|---|---|
| CE2 | Faster-Light-Off Catalyst (2) | None | 1.0/0.0 | 20.8 (No KMC; comparative) |

TABLE 2-continued

Results of Light-Off Vial Test Method Performed using Conditions (A) and

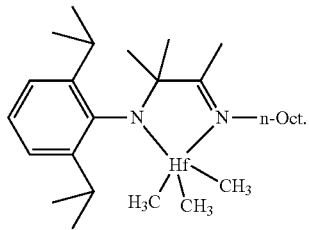

precatalyst (2) of formula

| Ex. No. | Catalyst | KMC | M/KMC (mol/mol) | Time from add 1-octene (Time$_0$) to Peak Temperature (Time$_{peakT}$) (minutes) |
|---|---|---|---|---|
| IE2a | Attenuated-Light-Off Catalyst (2a) | KMC1 | 1.0/1.0 | 23.1 (KMC = phenylacetylene; inventive) |
| IE2b | Attenuated-Light-Off Catalyst (2b) | KMC15 | 1.0/1.0 | 23.5 (KMC = cyclohexylallene; inventive) |
| IE2c | Attenuated-Light-Off Catalyst (2c) | KMC1 | 1.0/5.0 | 23.5 (KMC = phenylacetylene; inventive) |

TABLE 3

Results of Light-Off Vial Test Method Performed using Conditions (A) and

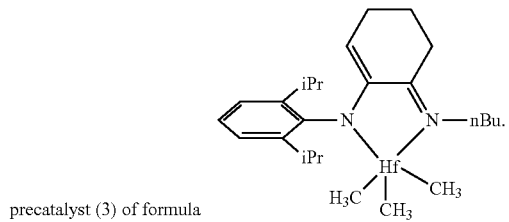

precatalyst (3) of formula

| Ex. No. | Catalyst | KMC | M/KMC (mol/mol) | Time from add 1-octene (Time$_0$) to Peak Temperature (Time$_{peakT}$) (minutes) |
|---|---|---|---|---|
| CE3 | Faster-Light-Off Catalyst (3) | None | 1.0/0.0 | 6.5 (No KMC; comparative) |
| IE3a | Attenuated-Light-Off Catalyst (3a) | KMC1 | 1.0/1.0 | 10.3 (KMC = phenylacetylene; inventive) |
| IE3b | Attenuated-Light-Off Catalyst (3b) | KMC15 | 1.0/1.0 | 15.8 (KMC = cyclohexylallene; inventive) |
| IE3c | Attenuated-Light-Off Catalyst (3c) | KMC1 | 1.0/5.0 | 50.3 (KMC = phenylacetylene; inventive) |

TABLE 4

Results of Light-Off Vial Test Method Performed using Conditions (A) and

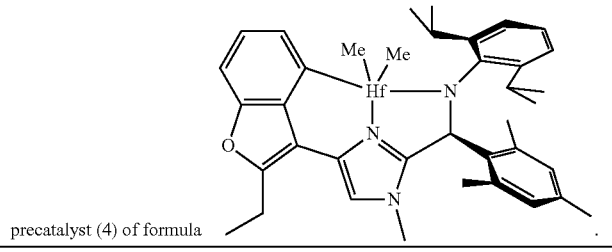

precatalyst (4) of formula

| Ex. No. | Catalyst | KMC | M/KMC (mol/mol) | Time from add 1-octene (Time$_0$) to Peak Temperature (Time$_{peakT}$) (minutes) |
|---|---|---|---|---|
| CE4 | Faster-Light-Off Catalyst (4) | None | 1.0/0.0 | 1.7 (No KMC; comparative) |

TABLE 4-continued

Results of Light-Off Vial Test Method Performed using Conditions (A) and precatalyst (4) of formula

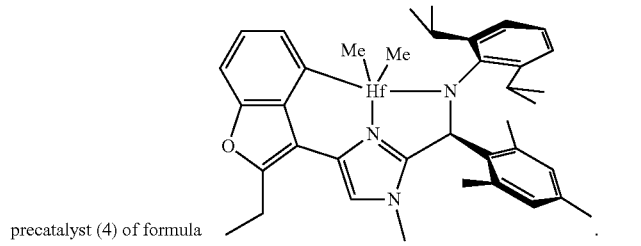

| Ex. No. | Catalyst | KMC | M/KMC (mol/mol) | Time from add 1-octene ($Time_0$) to Peak Temperature ($Time_{peakT}$) (minutes) |
|---|---|---|---|---|
| IE4a | Attenuated-Light-Off Catalyst (4a) | KMC1 | 1.0/1.0 | 2.7 (KMC = phenylacetylene; inventive) |
| IE4b | Attenuated-Light-Off Catalyst (4b) | KMC15 | 1.0/1.0 | 3.6 (KMC = cyclohexylallene; inventive) |
| IE4c | Attenuated-Light-Off Catalyst (4c) | KMC1 | 1.0/5.0 | 3.3 (KMC = phenylacetylene; inventive) |

As seen in Tables 1 to 4, depending upon the post-metallocene precatalyst and kinetics modifier compound used, greater or lesser delays in activation time were achieved.

TABLE 5

Results of Light-Off Vial Test Method performed using Conditions (B) and precatalyst (5) of formula

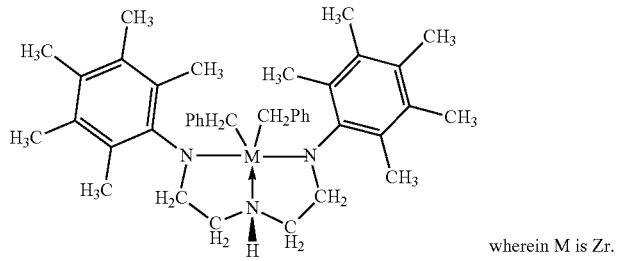

wherein M is Zr.

| Ex. No. | Catalyst | KMC | M/KMC (mol/mol) | Time from add 1-octene ($Time_0$) to Peak Temperature ($Time_{peakT}$) (minutes) |
|---|---|---|---|---|
| CE5 | Faster-Light-Off Catalyst (5) | None | 1.0/0.0 | 106 (No KMC; comparative) |
| IE5a | Attenuated-Light-Off Catalyst (5a) | KMC1 | 1.0/1.0 | 152 (KMC = phenylacetylene; inventive) |
| IE5b | Attenuated-Light-Off Catalyst (5b) | KMC8 | 1.0/1.0 | 158 (KMC = 3,4-difluorophenyl-acetylene; inventive) |
| IE5c | Attenuated-Light-Off Catalyst (5c) | KMC3 | 1.0/1.0 | 124 (KMC = 2,4,5-trimethylphenyl-acetylene; inventive) |
| IE5d | Attenuated-Light-Off Catalyst (5d) | KMC15 | 1.0/1.0 | 138 (KMC = cyclohexylallene; inventive) |

As seen in Table 5, the kinetics modifier compound has modified the structure of the faster-light-off catalyst to make an attenuated-light-off catalyst with a delayed onset to peak reaction temperature.

TABLE 6

Results of Light-Off Vial Test Method performed using Conditions (C) and precatalyst (6) of formula

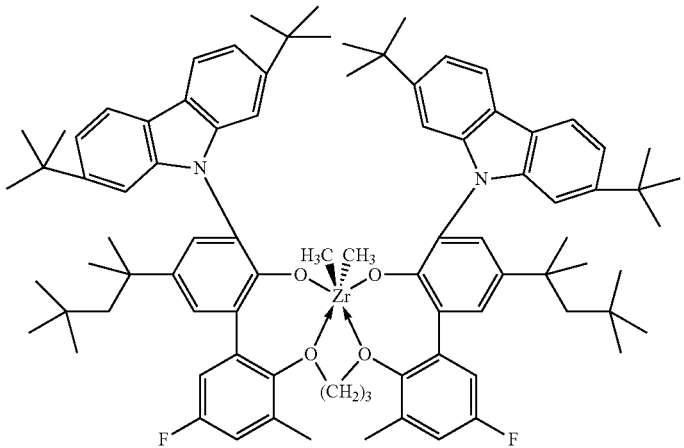

| Ex. No. | Catalyst | KMC | M/KMC (mol/mol) | Time from add 1-octene (Time$_0$) to Peak Temperature (Time$_{peakT}$) (minutes) | Max. Temp. Temp$_{max}$ (C °). |
|---|---|---|---|---|---|
| CE6 | Faster-Light-Off Catalyst (6) | None | 1.0/0.0 | 51.7 (No KMC; comparative) | 33.4 |
| IE6a | Attenuated-Light-Off Catalyst (6a) | KMC1 | 1.0/1.0 | 64.5 (KMC = phenylacetylene; inventive) | 33.2 |
| IE6b | Attenuated-Light-Off Catalyst (6b) | KMC15 | 1.0/1.0 | 75.3 (KMC = cyclohexylallene; inventive) | 31.8 |
| IE6c | Attenuated-Light-Off Catalyst (6c) | KMC8 | 1.0/1.0 | 67.3 (KMC = 3,4-difluorophenyl-acetylene; inventive) | 33.8 |
| IE6d | Attenuated-Light-Off Catalyst (6d) | KMC1 | 1.0/5.0 | 72.5 (KMC = phenylacetylene; inventive) | 32.7 |
| IE6e | Attenuated-Light-Off Catalyst (6e) | KMC15 | 1.0/5.0 | 79.0 (KMC = cyclohexylallene; inventive) | 30.2 |
| IE6f | Attenuated-Light-Off Catalyst (6f) | KMC8 | 1.0/5.0 | 71.9 (KMC = 3,4-difluorophenyl-acetylene; inventive) | 33.1 |

As seen in Table 6, depending upon the post-metallocene precatalyst and kinetics modifier compound used, greater or lesser delays in activation time were achieved and greater or lesser decreases in peak reaction temperature were achieved.

TABLE 7

Results of Light-Off Vial Test Method performed using Conditions (D) and precatalyst (7) of formula

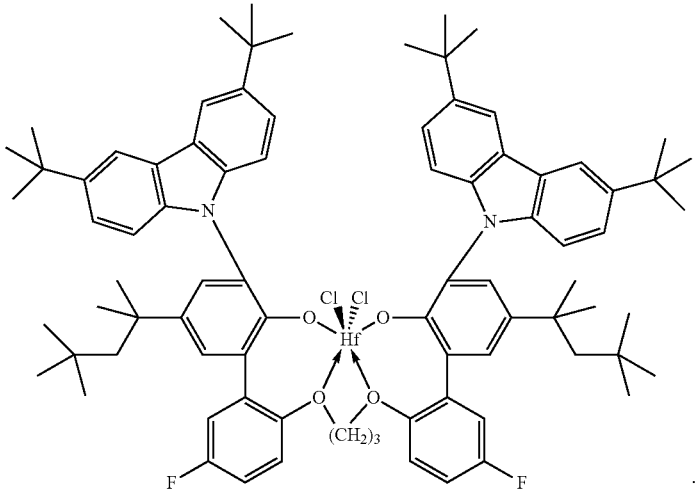

| Ex. No. | Catalyst | KMC | M/KMC (mol/mol) | Time from add 1-octene ($Time_0$) to Peak Temperature ($Time_{peakT}$) (minutes) | Peak Temp. (C °). |
|---|---|---|---|---|---|
| CE7 | Faster-Light-Off Catalyst (7) | None | 1.0/0.0 | 10.8 (No KMC; comparative) | 69.8 |
| IE7a | Attenuated-Light-Off Catalyst (7a) | KMC1 | 1.0/1.0 | 15.0 (KMC = phenylacetylene; inventive) | 66.5 |
| IE7b | Attenuated-Light-Off Catalyst (7b) | KMC15 | 1.0/1.0 | 17.7 (KMC = cyclohexylallene; inventive) | 67.4 |
| IE7c | Attenuated-Light-Off Catalyst (7c) | KMC8 | 1.0/1.0 | 13.5 (KMC = 3,4-difluorophenyl-acetylene; inventive) | 66.4 |
| IE7d | Attenuated-Light-Off Catalyst (7d) | KMC1 | 1.0/10.0 | 20.9 (KMC = phenylacetylene; inventive) | 53.6 |
| IE7e | Attenuated-Light-Off Catalyst (7e) | KMC15 | 1.0/10.0 | 293.0 (KMC = cyclohexylallene; inventive) | 41.1 |
| IE7f | Attenuated-Light-Off Catalyst (7f) | KMC8 | 1.0/10.0 | 43.6 (KMC = 3,4-difluorophenyl-acetylene; inventive) | 49.3 |
| IE7g | Attenuated-Light-Off Catalyst (7g) | KMC7 | 1.0/1.0 | 15.7 (KMC = 4-fluorophenyl-acetylene; inventive) | 67.6 |
| IE7h | Attenuated-Light-Off Catalyst (7h) | KMC2 | 1.0/1.0 | 14.0 (KMC = 4-methylphenyl-acetylene; inventive) | 67.5 |
| IE7i | Attenuated-Light-Off Catalyst (7i) | KMC3 | 1.0/1.0 | 13.4 (KMC = 2,4,5-trimethylphenyl-acetylene; inventive) | 69.7 |
| IE7j | Attenuated-Light-Off Catalyst (7j) | KMC12 | 1.0/1.0 | 13.3 (KMC = 1-pentyne; inventive) | 71.1 |
| IE7k | Attenuated-Light-Off Catalyst (7k) | KMC16 | 1.0/1.0 | 12.8 (KMC = ethyl 2,3-butadienoate; inventive) | 69.7 |

As seen in Table 7, depending upon the post-metallocene precatalyst and kinetics modifier compound used, greater or lesser delays in activation time were achieved and greater or lesser decreases in peak reaction temperature were achieved.

Light-Off Batch Reactor Test Method.

General. Observe relative kinetic profiles of faster-light-off catalysts and attenuated post-metallocene catalysts in separate polymerization runs each done in a 2-liter (L) semi-batch autoclave polymerization reactor equipped with a mechanical agitator. In the batch reactor, copolymerize ethylene and 1-hexene in the presence of hydrogen ($H_2$) in the gas phase. Analyze concentrations of ethylene ("$C_2$"), 1-hexene ("$C_6$"), and $H_2$ in the gas phase by mass spectrometry and gas chromatography. Add $C_6$ and $H_2$ components continuously throughout a 3-hour polymerization run to maintain their concentrations at steady state, but do not add more $C_2$. Measure ethylene uptake versus time to give relative representations of catalyst kinetic profiles.

Batch reactor drying and loading. Prior to each run, dry the batch reactor for 1 hour. Then charge the dried batch reactor with 200 g NaCl. Further dry the batch reactor by heating it and its contents for 30 minutes under $N_2$ atmosphere at 100° C. Then add 3 g of silica-supported methylaluminoxane (SMAO) to scavenge residuals, seal the batch reactor, and stir contents. Then charge the resulting dried batch reactor with 3.04 liters (L) of $H_2$ and 1-hexene so as to give a 1-hexene-to-ethylene ($C_6/C_2$) molar ratio of 0.004. Pressurize the batch reactor with ethylene to 1.52 megapascals (MPa). Allow the resulting system to reach steady state.

Then charge the batch reactor with a catalyst (a faster-light-off catalyst or an attenuated post-metallocene catalyst) to initiate polymerization. Record the time of addition of catalyst as Time zero (Time₀). Bring reactor temperature to 93° C. and maintain it at that temperature for from 1 to 5 hours. Cool the reactor down, vent, open, and wash the resulting polyolefin product with water, methanol, and dry it to give dried polyolefin product.

For each batch reactor run, calculate catalyst activity/polymerization productivity as number of grams dried polyolefin product made per gram of catalyst added to reactor-hour (gPE/gcat-hr). The higher the number of gPE/gcat-hr, the higher the catalyst activity/polymerization productivity. Record the amount of ethylene uptake after 0.1 hour ($C_2$ uptake 0.1 h) (6 minutes) and after 1.0 hour ($C_2$ uptake 1 h) (60 minutes), and report as a ratio of ($C_2$ uptake 1 h)/($C_2$ uptake 0.1 h). All other things being equal, the greater the ratio of ($C_2$ uptake 1 hour)/($C_2$ uptake 0.1 hour), the more attenuated is catalyst light-off.

Determine melt temperature of the dried polyolefin product using differential scanning calorimetry (DSC) according to ASTM D3418-08 using a scan rate of 10° C. per minute on a 10 mg sample and using the second heating cycle. Some embodiments of the inventive polyolefin products made by the attenuated post-metallocene catalyst may have higher melting points than the melting points of comparative polyolefin products made by its corresponding faster-light-off catalyst.

From light-off batch reactor runs with faster-light-off catalysts, a majority of ethylene uptake may occur within the first few minutes from the start of the polymerization run (e.g., within 10 minutes of Time₀). In contrast with the attenuated post-metallocene catalysts, ethylene uptake is spread out more evenly throughout the 3-hour long polymerization runs. The results of these comparative and inventive runs may be depicted graphically as a plot of reaction temperature of the batch reactor contents on the y-axis, or ethylene monomer ("$C_2$") uptake on the y-axis, versus time starting from addition of Time₀ on the x-axis.

Comparative Examples Using Metallocene Precatalysts

TABLE 8

Comparative polymerization Results of Light-Off Vial Test Method performed using Conditions (A) with the comparative metallocene precatalyst 1 ("MCN1") of formula

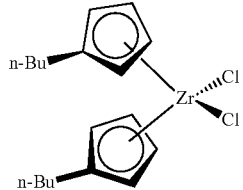

, wherein n-Bu is normal-butyl.

| Ex. No. | Precatalyst | KMC | M/KMC (mol/mol) | Light-off Performance (Time from Time₀ to Peak Temperature (minutes) |
|---|---|---|---|---|
| CE8 | MCN1 | None | 1.0/0.0 | 6.2 (No KMC; comparative) |
| CE8a | MCN1 | KMC1 | 1.0/1.0 | 6.7 (KMC = phenylacetylene; comparative) |

As shown in Table 8, the phenylacetylene had essentially no attenuating effect on the kinetics of comparative metallocene catalyst made from MCN1.

TABLE 9

Comparative polymerization results of Light-Off Batch Reactor Test Method performed using Conditions (A) with, the comparative metallocene precatalyst 1 ("MCN1") of formula

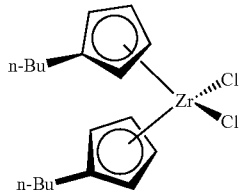

, wherein n-Bu is normal-butyl.

| Ex. No. | Precatalyst | KMC | M/KMC (mol/mol) | Cat. Charge (mg) | Dried Polyolefin Product Yield (g) | Polymerization Productivity (gPE/gcat – hr) | Tpeak (° C.) | $C_2$ Uptake ratio (1 h/0.1 h) |
|---|---|---|---|---|---|---|---|---|
| CE9 | MCN1 | None | None | 10.3 | 240.4 | 23241 | 114.8 | 4.4 |
| CE9a | MCN1 | KMC8 | 1:1 | 10 | 238.5 | 23700 | 111.3 | 4.2 |

As shown in Table 9, the kinetics modifier compound had essentially no attenuating effect on the kinetics of comparative metallocene catalyst made from MCN1.

TABLE 10

Comparative polymerization results of Light-Off Batch Reactor Test Method performed using Conditions (A) with comparative metallocene precatalyst 2 ("MCN2") of formula

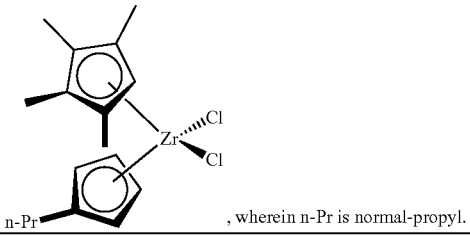

, wherein n-Pr is normal-propyl.

| Ex. No. | Pre-catalyst | KMC | M/KMC (mol/mol) | Cat. Charge (mg) | Dried Polyolefin Product Yield (g) | Polymerization Productivity (gPE/gcat – hr) | Tpeak (° C.) | $C_2$ Up-take ratio (1 h/0.1 h) |
|---|---|---|---|---|---|---|---|---|
| CE10 | MCN2 | None | None | 5.5 | 67.8 | 11964 | 101.7 | 1.8 |
| CE10a | MCN2 | KMC1 | 1:1 | 5.4 | 46.7 | 9622 | 100.2 | 1.7 |
| CE10b | MCN2 | KMC8 | 1:1 | 5.3 | 56.1 | 10294 | 100.4 | 1.6 |

As shown in Table 10, the kinetics modifier compound worsened the polymerization productivity, and had essentially no attenuating effect on the catalytic activity, of the comparative metallocene catalyst made from MCN2.

TABLE 11

Comparative polymerization results of Light-Off Batch Reactor Test Method performed using Conditions (A) with, comparative metallocene precatalyst 3 ("MCN3") of formula

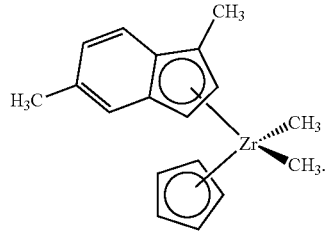

| Ex. No. | Pre-catalyst | KMC | M/KMC (mol/mol) | Cat. Charge (mg) | Dried Polyolefin Product Yield (g) | Polymerization Productivity (gPE/gcat – hr) | Tpeak (° C.) | $C_2$ Up-take ratio (1 h/0.1 h) |
|---|---|---|---|---|---|---|---|---|
| CE11 | MCN3 | None | None | 3.4 | 70.5 | 20764 | 96.0 | 3.4 |
| CE11a | MCN3 | KMC8 | 1:1 | 3.3 | 81.5 | 24545 | 95.6 | 3.5 |

As shown in Table 11, the kinetics modifier compound worsened the polymerization productivity, and had essentially no attenuating effect on the catalytic activity, of the comparative metallocene catalyst made from MCN3.

The invention claimed is:

1. A method of making an attenuated post-metallocene catalyst, the method comprising combining a faster-light-off catalyst with an effective amount of a kinetics modifier compound of formula ($A^1$) or ($B^1$): $R^5$-C≡C-$R^6$ ($A^1$) or; $(R^5)_2$C═C═C$(R^6)_2$ ($B^1$) under effective reaction conditions to give an attenuated-light-off post-metallocene catalyst that exhibits an attenuated light-off kinetics profile; wherein the faster-light-off catalyst has been made by activating a post-metallocene precatalyst of structural formula (I): $(D)_d$M(T)$_t$(Q)$_q$(X)$_x$ (I); wherein in formula ($A^1$) or ($B^1$) each of $R^5$ and $R^6$ independently is H or $R^7$; and each $R^7$ independently is a ($C_1$-$C_{20}$) hydrocarbyl, -C(═O)-O-(unsubstituted $C_1$-$C_{12}$)hydrocarbyl), a ($C_1$-$C_{17}$) heterohydrocarbyl, or a tri(($C_1$-$C_{20}$) hydrocarbyl)silyl, or two $R^7$ are taken together to form a ($C_3$-$C_6$) alkylene; with the proviso that each $R^7$ lacks a carbon-carbon double bond; wherein each ($C_1$-$C_{20}$) hydrocarbyl independently is unsubstituted or substituted with from 1 to 4 substituent groups $R^S$; wherein each substituent group $R^S$ is independently selected from halogen, unsubstituted ($C_1$-$C_5$)alkyl, -C≡CH, —OH, —$NH_2$, —N(H)(unsubstituted ($C_1$-$C_5$)alkyl), —N(unsubstituted ($C_1$-$C_5$)alkyl)$_2$, —COOH, and —COO(unsubstituted ($C_1$-$C_5$)alkyl); and wherein in formula (I): metal M is Ti, Hf, or Zr;

subscript d is 0, 1, or 2; subscript t is 0 or 1; subscript q is 0 or 1; subscript x is 1, 2, or 3; each ligand D independently is a didentate organoheteryl or a didentate organoheterylene; ligand T is a tridentate organoheterylene; and ligand Q is a tetradentate organoheterylene; each X is a monodentate group independently selected from a halogen atom, $((C_1-C_{20})alkyl)_{3-g}$—(phenyl)$_g$Si— wherein subscript g is 0, 1, 2, or 3; $CH_3$, a$(C_2-C_{20})$alkyl-$CH_2$, a $(C_6-C_{12})$aryl-$((C_0-C_{10})$ alkylene)-$CH_2$, a $(C_1-C_6)$ alkyl-substituted $(C_6-C_{12})$aryl, a $(C_1-C_6)$alkoxy-substituted $(C_6-C_{12})$aryl, a $(C_1-C_6)$ alkoxy-substituted benzyl, and a $(C_1-C_6)$alkyl-substituted benzyl; or one X is a 4-$(C_1-C_{20})$ alkyl-substituted 1,3-butadiene molecule and each of the remaining X, if any, independently is the monodentate group X.

2. The method of claim 1 wherein the faster-light-off catalyst is of formula (II): $(D)_d[M^+](T)_t(Q)_q(X)_{x-1} A^-$ (II); and wherein the attenuated post-metallocene catalyst is of formula (III): $(D)_d[M^+](T)_t(Q)_q(X)_{x-2}(R) A^-$ (III); wherein subscripts d, t, q, and x; metal M; and ligands D, T, Q, and X are as defined for formula (I); wherein $A^-$ is an anion; and wherein R is a ligand of formula (A), (B), or (C): $—C(R^5)=C(X)R^6$ (A), $—C(R^5)_2-C(X)=C(R^6)_2$ (B), or $—C(R^5)(R^7)—C(X)(R^6)(R^7)$ (C), respectively; and wherein $R^5$ to $R^7$ are as defined previously for formula ($A^1$) or ($B^1$) respectively.

3. The method of claim 1 wherein the post-metallocene precatalyst is of formula (Ia): $(D)_dM(X)_x$ (Ia), wherein metal M is Ti, Hf, or Zr; subscript d is 1 or 2; subscript x is 2 or 3; each ligand D independently is the didentate organoheteryl or the didentate organoheterylene; each X is as defined for formula (I).

4. The method of claim 1 wherein the post-metallocene precatalyst of formula (I) is of formula (Ib): $MT(X)_2$ (Ib), wherein metal M is Ti, Hf, or Zr; ligand T is the tridentate organoheterylene; each X is as defined for formula (I).

5. The method of claim 1 wherein the post-metallocene precatalyst of formula (I) is of formula (Ic): $MQ(X)_2$ (Ic), wherein metal M is Ti, Hf, or Zr; ligand Q is the tetradentate organoheterylene; each X is as defined for formula (I).

6. The method of claim 1 wherein the kinetics modifier compound is of formula ($A^1$): $R^5-C\equiv C-R^6$ ($A^1$) that is selected from phenylacetylene; a (substituted-phenyl)acetylene; diphenylacetylene; a substituted diphenylacetylene; a cycloalkylacetylene; an acetylene of formula $HC\equiv CSi(phenyl)_h((C_1-C_{20})alkyl)_{3-h}$, wherein subscript h is an integer from 0 to 3; and an acetylene of formula $HC\equiv C-(CH_2)_mCH_3$, wherein subscript m is an integer from 1 to 15.

7. The method of claim 1 wherein the kinetics modifier compound is of formula ($B^1$) $(R^5)_2C=C=C(R^6)_2$ ($B^1$) and is selected from a cycloalkylallene; an alkylallene; a dialkylallene; a trialkylallene; a trialkylsilylallene; a vinylidenecycloalkane; and an alkyl ester of an allenecarboxylic acid.

8. The method of claim 1 wherein the method further comprises making a mixture of the attenuated post-metallocene catalyst, a support material, and an inert hydrocarbon solvent and removing the inert hydrocarbon solvent from the mixture so as to give the attenuated post-metallocene catalyst disposed on the support material.

9. A method of making an attenuated post-metallocene catalyst the method comprising combining a faster-light-off catalyst with an effective amount of a kinetics modifier compound of formula ($A^1$), ($B^1$), or ($C^1$); $R^5-C\equiv C-R^6$ ($A^1$), $(R^5)_2C=C=C(R^6)_2$ ($B^1$), or $(R^5)(R^7)C=C(R^6)(R^7)$ ($C^1$) under effective reaction conditions to give an attenuated-light-off post-metallocene catalyst that exhibits an attenuated light-off kinetics profile; wherein the faster-light-off catalyst has been made by activating a post-metallocene precatalyst of structural formula (I): $(D)_dM(T)_t(Q)_q(X)_x$ (I): wherein in formula ($A^1$), ($B^1$), or ($C^1$) each of $R^5$ and $R^6$ independently is H or $R^7$; and each $R^7$ independently is a $(C_1-C_{20})$hydrocarbyl, $—C(=O)—O—$(unsubstituted $C_1-C_{12}$)hydrocarbyl), a $(C_1-C_{17})$heterohydrocarbyl, or a tri $((C_1-C_{20})$hydrocarbyl)silyl, or two $R^7$ are taken together to form a $(C_3-C_6)$alkylene; with the proviso that each $R^7$ lacks a carbon-carbon double bond; wherein each $(C_1-C_{20})$hydrocarbyl independently is unsubstituted or substituted with from 1 to 4 substituent groups $R^S$; wherein each substituent group $R^S$ is independently selected from halogen, unsubstituted $(C_1-C_5)$alkyl, $—C\equiv CH$, $—OH$, $—NH_2$, $—N(H)$(unsubstituted $(C_1-C_5)$alkyl), $—N$(unsubstituted $C_1-C_5$)alkyl)$_2$, $—COOH$, and $—COO$(unsubstituted) $(C_1-C_5)$alkyl; wherein the post-metallocene precatalyst of formula (I) is selected from the group consisting of: a post-metallocene precatalyst of formula (Ia)-1

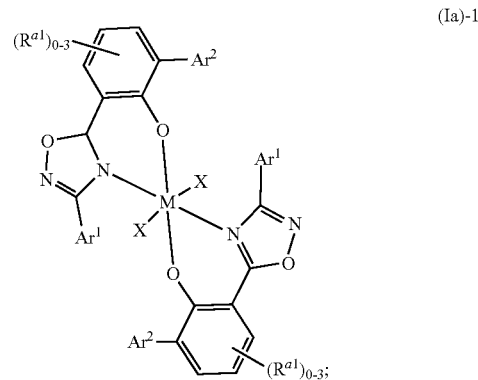

(Ia)-1 wherein each $Ar^1$ and $Ar^2$ independently is an unsubstituted or substituted aromatic group selected from phenyl, substituted phenyl, biphenyl, substituted biphenyl, anthracene, substituted anthracene, carbazolyl, and substituted carbazolyl, wherein each substituent of the substituted aromatic group independently is alkyl; each group $R^{a1}$ and $R^{a2}$ independently is H or a $(C_1-C_{20})$ alkyl; each subscript 0-3 independently is 0, 1, 2, or 3; and M and X are as defined for formula (I); and a post-metallocene precatalyst of formula (Ia)-2:

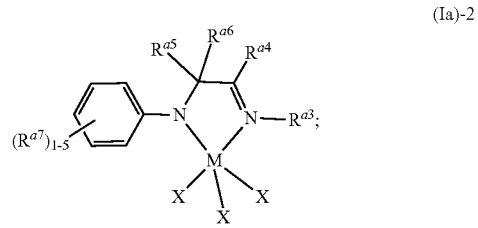

(Ia)-2 wherein M and X are as defined for formula (I); each subscript 1-5 independently is 1, 2, 3, 4, or 5; and each of $R^{a3}$ and $R^{a7}$ independently is $(C_1-C_{20})$alkyl or $(C_6-C_{12})$ aryl and each of $R^{a4}$ to $R^{a6}$ independently is $(C_1-C_{20})$alkyl or $R^{a4}$ to $R^{a6}$ are taken together to form a trivalent group of formula $=C(H)—CH_2CH_2CH_2—$.

10. A method of making an attenuated post-metallocene catalyst, the method comprising combining a faster-light-off catalyst with an effective amount of a kinetics modifier compound of formula ($A^1$), ($B^1$), or ($C^1$); $R^5-C\equiv C-R^6$($A^1$), $(R^5)_2C=C=C(R^6)_2$ ($B^1$), or $(R^5)(R^7)C=C(R^6)(R^7)$ ($C^1$) under effective reaction conditions to give an attenuated-light-off post-metallocene catalyst that exhibits an attenuated light-off kinetics profile; wherein the faster-light-off catalyst has been made by activating a post-metallocene precatalyst of structural formula (I): $(D)_dM(T)_t(Q)_q(X)_x$ (I): wherein in formula ($A^1$), ($B^1$), or ($C^1$) each of $R^5$ and $R^6$ independently is H or $R^7$; and each $R^7$ independently is a ($C_1$-$C_{20}$)hydrocarbyl, —C(=O)—O—(unsubstituted $C_1$-$C_{12}$)hydrocarbyl), a($C_1$-$C_{17}$)heterohydrocarbyl, or a tri(($C_1$-$C_{20}$)hydrocarbyl)silyl or two $R^7$ are taken together to form a ($C_3$-$C_6$)alkylene; with the proviso that each $R^7$ lacks a carbon-carbon double bond; wherein each $C_1$-$C_{20}$hydrocarbyl independently is unsubstituted or substituted with from 1 to 4 substituent groups $R^S$; wherein each substituent group $R^S$ is independently selected from halogen, unsubstituted($C_1$-$C_5$) alkyl, —C≡CH, —OH, —NH$_2$, —N(H)(unsubstituted ($C_1$-$C_5$)alkyl), —N(unsubstituted $C_1$-$C_5$)alkyl)$_2$, —COOH, and —COO(unsubstituted ($C_1$-$C_5$)alkyl); wherein the post-metallocene precatalyst of formula (I) is a post-metallocene precatalyst of formula (Ib)-1

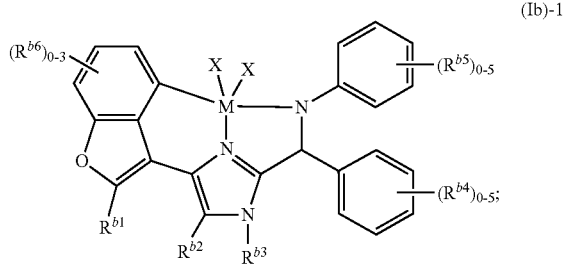

(Ib)-1 wherein M is Ti, Hf, or Zr; each subscript 0-3 independently is 0, 1, 2, or 3; each of groups $R^{b1}$ to $R^{b6}$ independently is H or a ($C_1$-$C_{20}$)alkyl; and X is as defined for formula (I).

11. An attenuated post-metallocene catalyst made by the method of claim 1.

12. A method of feeding a post-metallocene catalyst to a slurry-phase or gas-phase polymerization reactor containing an olefin monomer and a moving bed of polyolefin polymer, the method comprising making the attenuated post-metallocene catalyst outside of the reactor and according to the method of claim 1, and feeding the attenuated post-metallocene catalyst in neat form or as a solution or slurry thereof in an inert hydrocarbon liquid through a feed line free of olefin monomer into the slurry-phase or gas-phase polymerization reactor.

13. A multimodal catalyst system comprising the attenuated post-metallocene catalyst of claim 12 and at least one second catalyst selected from the group consisting of an unattenuated a post-metallocene catalyst described herein, a different attenuated post-metallocene catalyst, and a metallocene catalyst.

14. A method of making a polyolefin polymer, the method comprising contacting at least one 1-alkene monomer with the attenuated post-metallocene catalyst made by the method of claim 1 under slurry-phase or gas-phase polymerization conditions in a slurry-phase or gas-phase polymerization reactor containing a moving bed of polyolefin resin, thereby making the polyolefin polymer.

\* \* \* \* \*